(12) United States Patent
Fluhler

(10) Patent No.: US 11,589,451 B2
(45) Date of Patent: Feb. 21, 2023

(54) DENSE PLASMA FOCUS DEVICES HAVING FIRST AND SECOND DPF ACCELERATORS

(71) Applicant: Freent Technologies, Inc., Huntsville, AL (US)

(72) Inventor: Herbert U. Fluhler, Huntsville, AL (US)

(*) Notice: Subject to any disclaimer, the term of this patent is extended or adjusted under 35 U.S.C. 154(b) by 0 days.

(21) Appl. No.: 17/418,969

(22) PCT Filed: Feb. 21, 2020

(86) PCT No.: PCT/US2020/019247
§ 371 (c)(1),
(2) Date: Jun. 28, 2021

(87) PCT Pub. No.: WO2020/176348
PCT Pub. Date: Sep. 3, 2020

(65) Prior Publication Data
US 2022/0124903 A1    Apr. 21, 2022

Related U.S. Application Data

(60) Provisional application No. 62/808,429, filed on Feb. 21, 2019.

(51) Int. Cl.
*H05H 1/54* (2006.01)
*G21B 1/05* (2006.01)

(52) U.S. Cl.
CPC ............... *H05H 1/54* (2013.01); *G21B 1/05* (2013.01)

(58) Field of Classification Search
CPC .............. H05H 1/54; G21B 1/05; Y02E 30/10
USPC ........................................ 376/107, 144, 145
See application file for complete search history.

(56) References Cited

U.S. PATENT DOCUMENTS

| | | | | |
|---|---|---|---|---|
| 3,096,269 A * | 7/1963 | Halbach | .................... | H05H 1/16 376/127 |
| 3,338,789 A * | 8/1967 | Fink | .......................... | H05H 1/54 376/145 |
| 3,859,164 A * | 1/1975 | Nowak | ..................... | H05H 1/22 376/121 |
| 4,042,848 A * | 8/1977 | Lee | ........................... | H05H 1/48 250/493.1 |
| 4,601,871 A * | 7/1986 | Turner | ..................... | H05H 1/16 376/128 |
| 7,002,148 B2 * | 2/2006 | Monkhorst | .............. | H05H 1/12 315/111.41 |
| 7,679,025 B1 * | 3/2010 | Krishnan | ................. | G21G 4/02 219/121.48 |
| 2009/0213975 A1 * | 8/2009 | Sturt | ....................... | G21B 3/006 376/107 |
| 2020/0058411 A1 * | 2/2020 | Shumlak | .................. | H05H 1/06 |

* cited by examiner

*Primary Examiner* — Darlene M Ritchie
(74) *Attorney, Agent, or Firm* — Patent Grove AB; Tomas Friend

(57) ABSTRACT

A system for performing enhanced dense plasma acceleration includes two dense plasma fusion accelerators, each having two electrodes. One of the electrodes is positioned within a volume of the other. A conductive ring couples electrodes of the two plasma fusion accelerators. A plasma sheath from one accelerator and a plasma sheath from the other accelerator interact to form a portion of a cusp pinch. The plasma sheaths form portions of the cusp pinch via apertures of electrodes.

20 Claims, 25 Drawing Sheets

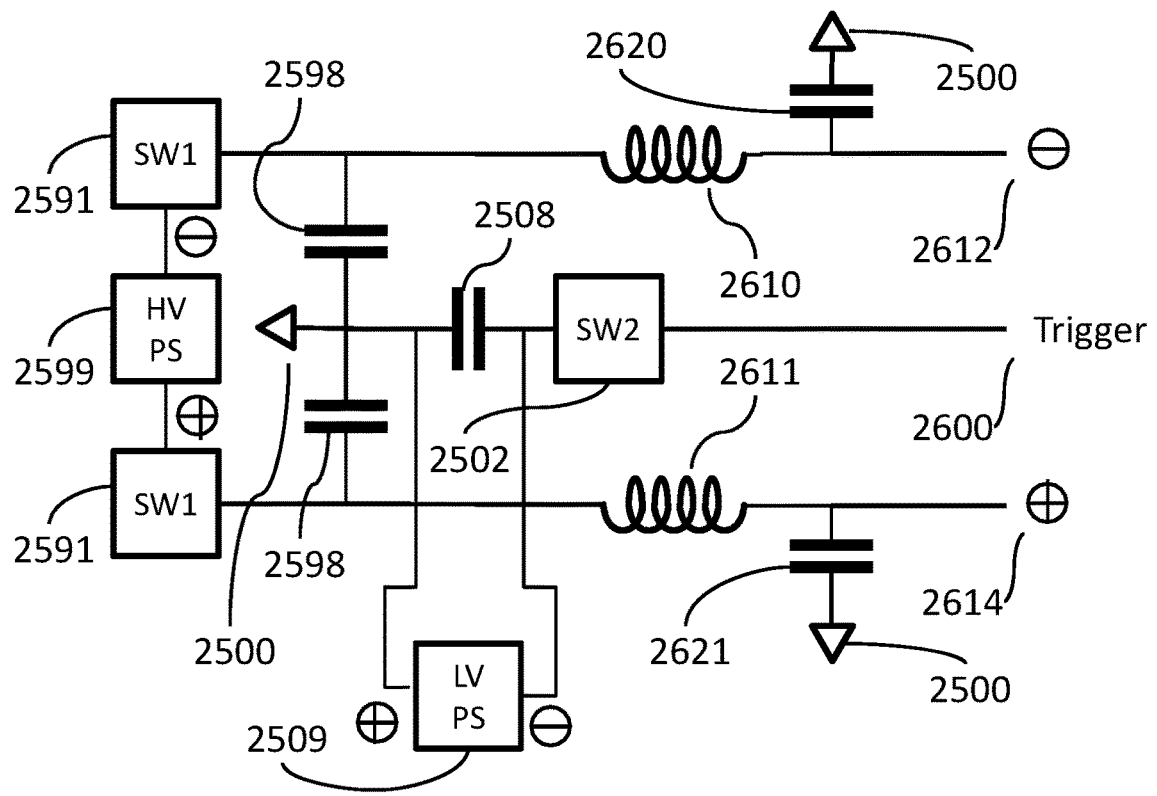
Fig. 26
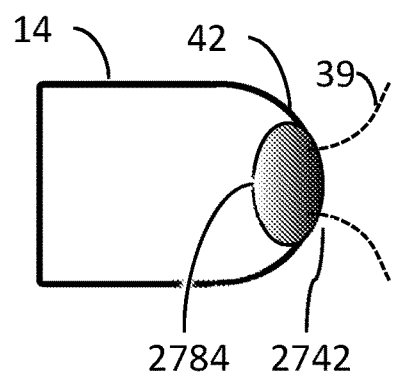
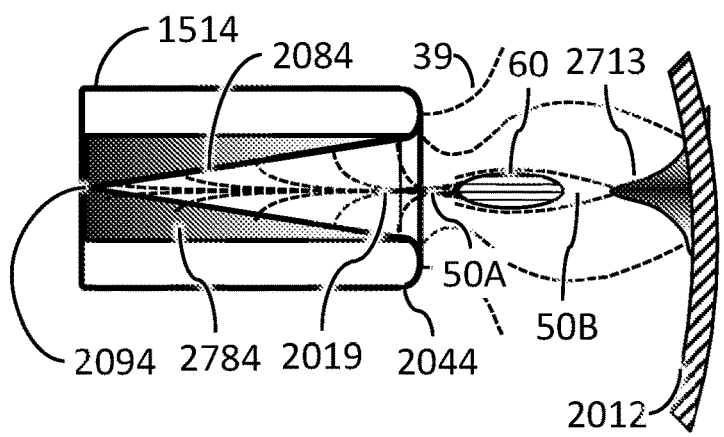
Fig. 27A
Fig. 27B

DENSE PLASMA FOCUS DEVICES HAVING FIRST AND SECOND DPF ACCELERATORS

CROSS REFERENCE TO RELATED APPLICATIONS

This application claims the benefit of U.S. Provisional Application No. 62/808,429, filed Feb. 21, 2019, and entitled "Improved Dense Plasma Focus Devices. The foregoing is incorporated by reference herein in its entirety.

FIELD OF THE INVENTION

This application relates to the improvement of a class of plasma accelerators known generally as "Z-Pinch" devices due to their common attribute of compressing plasma along the "Z" axis. Although adaptable to most Z-Pinch devices as well as other types of plasma accelerators such as those referred to as "Plasma Guns", the improvements provided herein are presented in the context of the Dense Plasma Focus ("DPF") subclass of Z-Pinch devices, and in particular to the so called "Mather" and "Filippov" DPF devices.

BACKGROUND OF THE INVENTION

DPF devices are a particular type of Z-Pinch plasma generator and accelerator which have the feature of producing a very intense "pinch" of its plasma along the axially symmetric Z-axis of the device. Z-pinch devices have long been used in research settings, and potential commercial applications abound but are not realized in widespread use in the prior art.

Prior art DPF devices come in two general variants, Filippov and Mather. The Mather DPF device is the more common of the two DPF types due to its simpler construction. Both the Mather and Filippov devices have substantially the same operating principles, to wit, (1) generating a plasma sheath, (2) accelerating the plasma sheath to very high speeds (regularly in excess of 10-100 kilometers per second), (3) crashing and collapsing the plasma sheath under magnetic compression onto the Z-Axis (i.e. pinching it), and (4) producing interesting physics and radiation products from within or about the pinched volume, to include the prospect of Nuclear Fusion (hereafter just "Fusion").

The DPF device has a number of different potential applications due to its small and compact size and operating requirements as compared to most any other type of device providing comparable capabilities and features. By suitable changes, most often to the Z-pinch region of the device, the DPF can provide an intense source of electrons, X-rays, ions (which can be selected either by the gas used in the rarefied chamber or by introduction of a target near the Z-Pinch volume, or both), and (probably most importantly) neutrons. It is known in the prior art, however, that these devices (and indeed all DPF devices) suffer from numerous limitations including low performance in the generation of the desired products, high input power requirements, short life of potentially desired plasma instabilities (for example, the m=0 "Sausage" instability, the m=1 "Kink" instability, and many others, as well as Plasmoids), and short life of high temperature, high density containment conducive to Fusion.

The present application provides improved DPF devices arguably in all areas of DPF operation. Therefore, it is a first goal of this application to provide DPF design enhancements to improve the DPF performance, both by producing more of the desired products from same sized devices, and also by producing them for less net power input. A second goal of this application is to provide DPF embodiments better suited to the production of desired both directional and non-directional radiation products from nuclear and non-nuclear high energy reactions. Said products include but are not limited to, the production of photons (in particular X-rays and Gamma Rays), and particles (Proton particles, Ion particles, Beta (electron) particles, Positron particles, Alpha particles, Neutrons, and various Isotopic species, both radioactive and non-radioactive), either isotropically or directionally. A third goal of this application is to provide DPF embodiments better suited to the practical realization of a Fusion producing device, and ultimately a commercial Fusion reactor. A fourth goal of this application is to provide a higher performance (for example, higher neutron yield) research instrument to aid in the study of Fusion reactions and associated physical processes to further the understanding of the relevant phenomenon and thereby promote speedier developments and advancements in Fusion reactor design and optimizations.

BRIEF SUMMARY OF THE INVENTION

In accordance with the forgoing, the invention provides DPF (and more generally Z-Pinch) design improvements with a multiplicity of subordinate embodiments. These improvements extend prior art DPF capabilities and performance for most, if not all, DPF potential applications to include Fusion.

In one embodiment, the application provides improvements to the discharge initiation which serves to improve the axial symmetry of the plasma sheath or filaments (if so desired) and also, the uniformity of the plasma sheath or filaments from shot to shot. These are crucial improvements, for if the plasma sheath is not uniform and consistent, it will not provide a desired perfectly symmetrical pinch, which will result in lower net compression and lower product production as well as fewer Fusions and associated neutrons.

In another embodiment, the application provides improvements to the plasma sheath (or filaments) lift off from the insulator and subsequent rotation into the acceleration tube (or in the case of the Filippov DPF, into the flat thin cylinder between the disk electrodes). The improvements herein promote a smooth contiguous lift off of the plasma sheath which reduces turbulence that can cause plasma tendrils that short the main plasma sheath (or filaments) and degrade its acceleration. For the same purpose, the invention further comprises means for reducing the ionic turbulence along the walls (more often the outer or negative cathode walls) that causes tendrils to form in the first place.

In an alternate embodiment, the application provides a tapering of the electrodes, one, the other or both, that further mitigates the formation of the aforementioned tendrils, as well as provides for additional acceleration of the plasma sheath to higher velocities, by incorporating supersonic design to optimize flow of the acceleration plasma, as well as reducing the inductance of the DPF to achieve more energy transfer to the plasma sheath. This results in higher net plasma sheath velocity and likely reduced sheath gas leakage both of which will further enhance the pinching effect.

In yet another alternate embodiment, the application provides for shaping of both the outer (and upper in the Filippov DPF) electrode and the inner (or lower in the Filippov DPF) electrode and their terminus to direct the plasma sheath in a more radially directed direction. The prior art Mather DPF relies on the discontinuity of the center electrode ending to provide a shock transition that about doubles the velocity into the radial compression direction. This is augmented or complemented by the enhanced plasma velocities and pressures obtained in the invention as well as well as by more inward directed velocity towards the pinch.

In an alternate embodiment, the application provides introducing a foreign material into a suitable position of the furnace of the Z-pinch. The material could be gas, liquid or solid that could contain Fusion fuel, or it could contain a particular material suitable for production of desired nuclear products, or enhanced X-Rays, or any number of purposes such as ion deposition.

In yet another alternate embodiment, the application provides a design employing multiple DPF devices to significantly enhance the attributes of the Z-pinch to include, near-isotropic compression of the pinch, lengthening the Z-Pinch and thence too the pinched volume, adding significantly more gas and plasma into the pinch, containing the pinch for a longer time, and producing a notably more energetic pinch with higher temperature, pressure and density. This will serve to provide higher improved performance in most any application of the DPF.

BRIEF DESCRIPTION OF THE DRAWINGS

The elements of the drawings are not necessarily to scale relative to each other, with emphasis placed instead upon clearly illustrating the principles of the disclosure. Like reference numerals designate corresponding parts throughout the several views of the drawings in which:

FIG. 26 is a differential power supply circuit schematic embodiment after FIG. 25 that adds pulse forming components to latch and sustain peak current or even add to it;

FIG. 27A is a cross section illustration of a DPR anode embodiment showing a solid center electrode (usually anode) with a high resistivity region on the tip to quench the current when the plasma sheath transits it in order to help cut off current for superior performance and instabilities formation;

FIG. 27B is a cross section illustration of a DPR anode embodiment showing a hollow center electrode (usually anode) with a high resistivity region inside its hole to quench the current when the plasma sheath transits it, as well as a cathode tip also of high resistivity material to same purpose, in order to help cut off current for superior performance and instabilities formation;

DETAILED DESCRIPTION OF THE INVENTION

For the remainder of this specification, the terms "plasma sheath", "plasma filaments" and just "filaments" may be used substantially interchangeably since they are all plasmas, are all caused by the same application of high voltage to the DPF device, and all follow virtually the same path and do virtually the same thing. The one difference being that "plasma filaments" and "filament" are understood to typically have some azimuthally differentiated structure and are usually associated with less efficient sweep up of the gas. Any of these may be experienced interchangeably on the same DPF machine, these being differentiated predominantly by the gas pressure unless invoked by a specific differentiating electrostatic prominence in the device design, since at lower pressures a more uniform plasma sheath will form and at higher pressures more structured "plasma filaments", or just "filaments" will tend to form.

Figure 1:
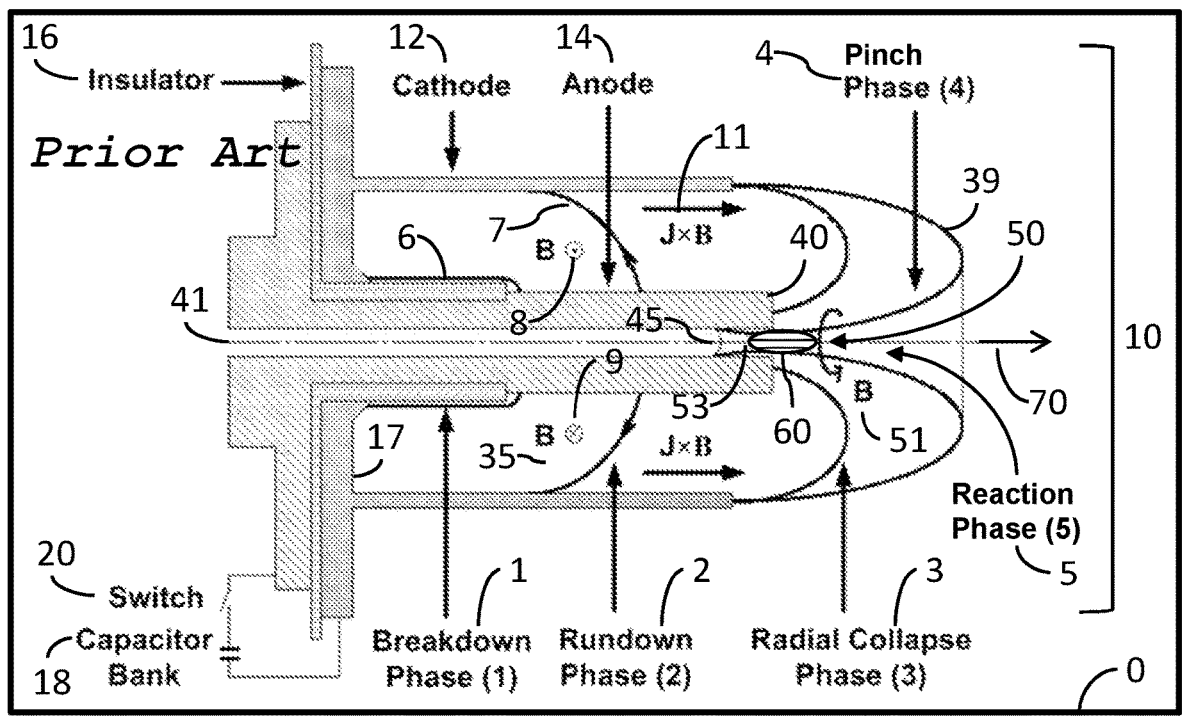
FIG. 1 is a side view illustration of a Mather type Dense Plasma Focus (DPF) device with its constituent parts and operational Phases.
Figure 2:
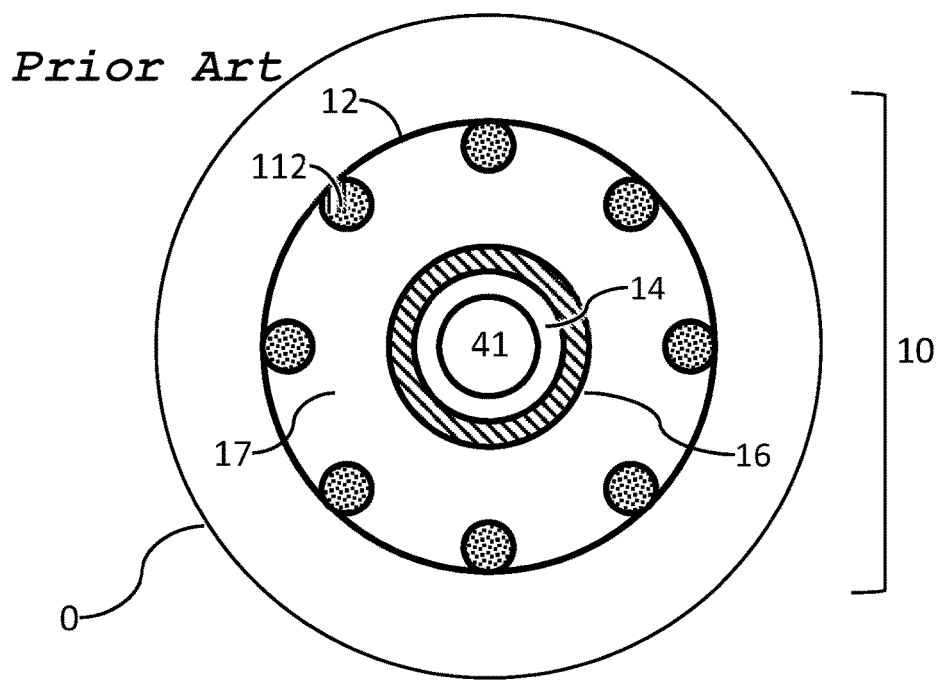
FIG. 2 is an end view illustration of a Mather type Dense Plasma Focus device design.

FIGS. 1-4 show views of prior art DPF devices such as Mather type DPF device [10] well known to those skilled in the art of nuclear and accelerator science. FIG. 1 shows a side view of a prior art Mather type DPF wherein the left side of the figure near capacitor bank [18] and switch [20] shall be referred to as the "bottom" or "closed" end of the device and the opposing right side of the figure shall be referred to as the "top" or "opening" end of the device. FIG. 2 shows a "top"/"opening" end view of the DPF device [10] looking from the "top"/"open" end down into the opening of the device (looking from the right towards the left in FIG. 1) thereby viewing the top side [17] of the "bottom" "closed" end of the device.

The DPF device is usually placed within a partially evacuated vacuum chamber [0], back filled with a preferred rarefied gas species to a designated design-to pressure in order to promote an easier to form and more uniform arc discharge and stable plasma sheath formation, retention, propagation and control; as well as to produce the desired radiation products from the DPF device at the terminus of the DPF operational cycle. The interior rarified gas species has a typical interior pressures within the vacuum chamber of about 1 to 100 Torr.

With respect to FIGS. 1 and 2, the Mather DPF device [10] comprises an inner cylindrical coaxial conductive electrode [14] and an outer tubular (hollow cylinder) coaxial conductive electrode [12] separated by a coaxial tubular insulator [16] located below and interior to the base near [17] that is disposed to resist the flow of current between [12] and [14] when a high voltage is applied between the two of them, while separated by the ambient gas resident within the evacuated chamber [0]. A high voltage potential of several tens up to a couple hundred kilo-volts (kV), or even a megavolt or more, is dropped across [12] and [14] from charged capacitor [18] when switch [20] is closed. Note that although FIG. 1 shows only switch [20] and capacitor [18] for the power supply, these elements represent what is typically a more complex and sophisticated power supply often further comprising a pulse forming network which may employ a multitude of capacitors, inductors, transformers and high power switches (to include possibly solid state devices) to provide more flexible and purposely contoured time dependent voltage and current waveforms to the DPF device. Additionally, the power supply may comprise various safety switches and discharge resistors and various controls to time and manage the high voltage power supply operation efficiently and safely.

The polarity of the applied voltage from capacitor [18] is usually selected so that the inner electrode [14] is the anode (positively charged) and the outer electrode [12] is the cathode (negatively charged). This polarity can be reversed and the specific polarity selected depends on the application and also on the detailed physics provided by the detailed design of the DPF device.

Other applications may prefer an opposite polarity, but the DPF device operates substantially similarly, albeit with some subtle differences, and with opposite current flow in plasma sheath [7]. A possible differentiator related to polarity is the pressure at which the DPF device operates at, and in particular, with that pressure and for the voltage and current used to excite the plasma, whether the plasma operates in ionic thermodynamic equilibrium (same densities of electrons and ions everywhere) or non-equilibrium (densities of electrons and ions may be locally different). One known differentiator is a Magneto-Hydrodynamic ("MHD") Hall Effect which causes electrons to creep down the anode ahead of the cathode during the Rundown Phase [2].

Upon closing switch [20] (often this is implemented as a Spark Gap in a Marx Bank) the high voltage from capacitor [18] is applied to the anode [14], across insulator [16] to cathode [12] which starts the "Breakdown" Phase [1] of DPF operation with an avalanche of electrons flowing across the exposed surface of insulator [16]. The specific electrode spacing and exposures, as well as the insulation material from which insulator [16] is made, are designed so as to ensure that an electric discharge happens first and only over the exposed surface of insulator [16], and not elsewhere in the device, which would ruin its operation were that to occur. This results in the sparking of a plasma discharge [6] across the cylindrical surface of the insulator [16], subsequently forming an initially cylindrical plasma sheath about the insulator [16] and concomitantly the anode [14].

Subsequently, the plasma sheath lifts radially off the insulator surface [16] and rotates radially outward due to a "J×B Lorentz Force" developed from the magnetic field B formed by the current density J flowing through the anode and the cathode and the plasma sheath's own current path. The lower contact point of the plasma sheath lifts and rotates radially outward across the base [17] of the cathode, across the inner corner of the cathode, and rapidly grows to form a thin substantially planar (initially convex conical) annular disk (or washer) shaped plasma sheath [7] disposed between the oppositely charged electrodes [12] and [14]. The plasma sheath [7] comprises a current of electricity flowing radially through a plasma of ionized gas particles, said particles further comprising the said gas mix of desired (potentially multiple) species contained at the desired pressure of nominally between 1 to 100 Torr inside the enclosing evacuated chamber [0].

Due to a first plasma instability, the original cylindrically uniform plasma sheath [6] near the insulator [16] may segregate into discrete filaments if the gas pressure is too high for the given voltage and if current provided to the given gas pressure by the power supply capacitor [18] is inadequate. This instability is self-promoted due to the fact that like-flowing currents attract each other. Under such unfavorable conditions, if the outer cathode electrode were completely radially smooth and uniform, this first plasma instability operating under a condition with said gas pressure too high, could cause the plasma sheath to collapse rapidly and azimuthally into a few discrete or possibly even singular arc filaments between the inner and outer electrodes. This effect can be seen in the commercially available "plasma balls" used for in-home decoration, entertainment and amusement. This singular arc filament(s) would be undisciplined, and due to the identical radial voltage potentials within the cylindrically symmetric DPF device, would wander around fairly stochastically within the space between the electrodes, resulting in no useful structure with which to construct the desired DPF device.

To discipline such arc filaments(s), one must either operate the device within a regime defined by the operating pressure (i.e. gas density) and the power supply capabilities so as to only produce a uniform sheet plasma sheath that can efficiently capture and compress the gas interstitial to the electrodes; or one must devise alternate means to discipline the arc filaments. Alternatively, (or as a safeguard) one may capitulate to the sheet current's propensity to bunch up and form filaments, by replacing what might be a smooth cylindrical tubular cathode electrode [12] with a multiplicity of uniformly, azimuthally, and symmetrically disposed discrete co-axial rod-like or tine-like subordinate collinear electrodes [112], connected physically and electrically to the base [17] of the cathode [12] as seen in open end up view of FIG. 2. This has both the advantages described immediately below, as well as some disadvantages discussed subsequently. Essentially this multiplicity of discrete rods or tines [112] form a "picket fence" or "lion's cage" or "squirrel cage" or "bird cage" of cathode rods or tines [112] circling the center cylindrical anode [14] as shown in FIG. 2.

Figure 3:
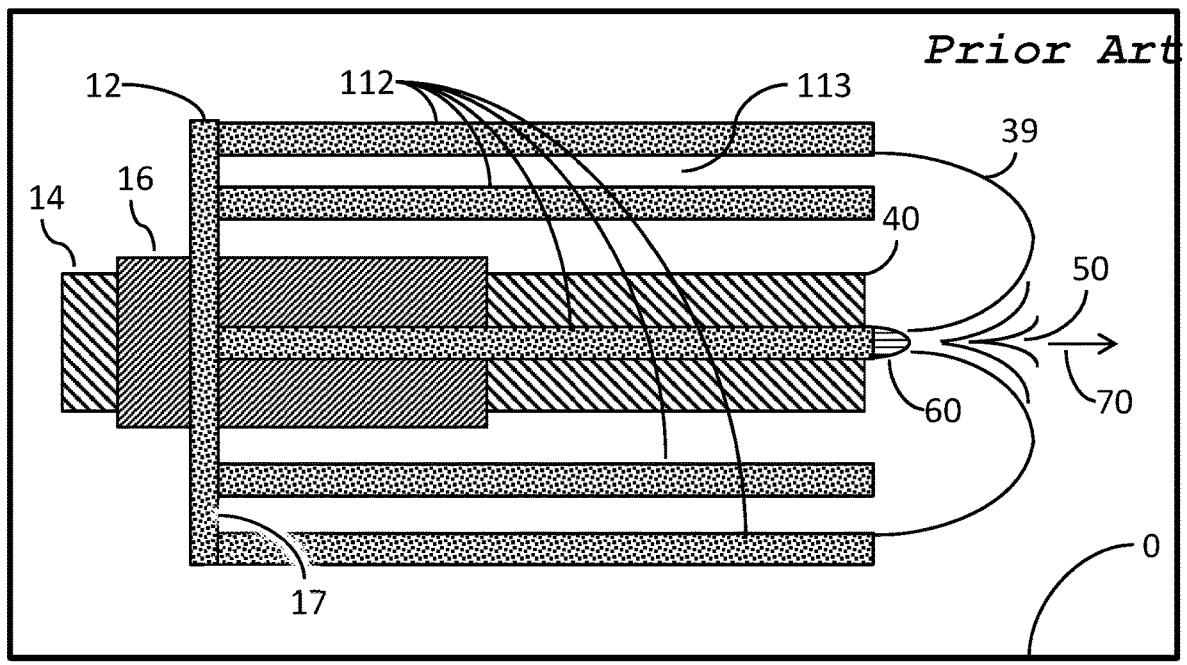
FIG. 3 is a side view illustration of a Mather type Dense Plasma Focus device highlighting the rods or tines that comprise most DPF cathodes.

FIG. 3 shows a side view of a similar DPF device as shown in FIG. 2 with same said rods and tines [112]. The sizes, spacing, voltages and currents employed are all designed mutually together with the chosen gas pressure environment to ensure that identical individual plasma filaments to each rod or tine are all evenly struck and maintained between the anode [14] and each of the rods or tines [112] in the cathode [12]. In the objective selection of these parameters, the plasma forms a substantially uniform sheath, possibly with some residual filamentary structure from the discrete rods or tines, although this is generally deprecated in most DPF designs. This then provides a substantially uniform brane of identical, uniformly moving, nearly merged, plasma filaments joined into a substantially uniform plasma sheath [7]. In the objective configuration and design, the plasma sheath is substantially uniform and non-porous so as to efficiently sweep up gas as the plasma sheath transits the axial length of the device from the "bottom" to the "top".

The rods and tines [112] are usually selected versus a solid cylindrical tube cathode to guard against "chuffing" and its associated plasma tendril formation which can result in deleterious short circuits behind the plasma sheath. However, whereas the rod and tines [112] aid in locking the plasma sheath to the device and reducing chuffing, there is compromise in azimuthal uniformity which degrades the sweep up efficiency of the plasma sheath. Therefore, the open cage design of the rods and tines [112] allow significant mass to be lost during the plasma sheath sweep.

The rods or tines [112] may also be tilted slightly in a tangent (helical) direction (not shown) in order to impart a slight twist in the resultant magnetic field. Such a twist is postulated to help impart some angular momentum to the field lines and plasma sheath which when collapsed into the pinch can help stimulate the formation of instabilities which are postulated to improve total fusion rate and yield. A similar effect may be obtained by adding a helical winding about the outside of the rods and tines cathode, and/or concomitantly inside the anode.

Due to the flow of current up the anode [14], across the plasma sheath [7], and then down the cathode [12], an annular circumferential magnetic field is formed with magnetic field vector pointing out of the page [8] and into the page [9] in the region [35] behind the arc [7] as shown in FIG. 1. This magnetic field induces a Lorentz Force F [11] given by the Cross Vector Product of the Current Density Vector J and the Magnetic Field Vector B such that $F=J \times B$. This force is always normal (or almost normal) to the plasma sheath [7] current density vector J and away from the base [17] of the cathode [12] (even if the polarity on the electrodes is reversed). This force causes the plasma sheath to accelerate quickly and move rapidly down between the anode [14] and cathode [12] towards the end of the device in what is called the "Rundown" or "Axial" Phase [2] of the device, terminating circa the corner end of the anode [40].

The plasma sheath being under continual pressure from the J×B force accelerates to great speed (10-100 km/sec) by the end of the Rundown Phase [2]. In the process, it collects ambient non-ionized gas in front of it, in what is known as the "Snowplow" model of collection and operation. The gas in front of the plasma sheath rapidly piles up, compresses and then forms a shock wave as it increases in speed and becomes supersonic in the ambient rarefied gas. This two-layer structure becomes important when analyzing the details of how the "pinch" operates. In general though, one refers usually to just the plasma sheath [7] with the understanding that there is a shock and intervening layer of compressed gas between the two.

The Rundown Phase [2] transitions into the "Radial Collapse" or "Run-In Phase" [3] upon encountering the end of the anode [40]. Due to the local magnetic (via the Lorentz Force) and electrostatic forces (via the electrode polarities) the plasma sheath wraps around the end edge of the anode [40] evolving from a substantially flat conically disc or washer-like shape [7] into a bowed half toroidal surface [39]. With the termination of the anode structure, there is then no longer anything to restrain the inner edge of the plasma sheath. The inner edge of the plasma sheath rapidly changes angle, thickness and changes shape in an attempt to enforce the MHD boundary conditions as the anode tip recedes radially at the end of the anode The inner edge of the plasma sheath attempts to stay substantially normal to the anode tip surface, and is inevitably thinned and curved trying to do so. One way this phenomenology may be thought of is that when the anode terminates, it is no longer there to support the inner edge of the high pressure plasma sheath and its preceding pressure shock, and both of them then vent radially inward starting at [40] with a high speed that has been variously measured at about twice the speed of the plasma sheath axial velocity at the end of the Rundown Phase [2]. Additionally, once the plasma sheath has rounded the anode tip [40], the magnetic field follows and now the Loretz force is directed radially inward to further accelerate the engrossing plasma sheath and associated preceding shock. This radially oriented Lorentz force increases as the radius decreases both due to the increase in the current density J as the current contact area gets smaller with ever decreasing radius to the axis, and likewise because of the progressively increasing magnetic field B which increases as $1/r$ as the radius goes towards zero on the axis. This then is a significant contributor to the final pinch upon the radial collapse.

The anode [14] is often hollow (as shown in FIG. 1) with cylindrical hole or hole tube [41] that may optionally transit the entire length of the anode [14] as shown in FIG. 1, or the hole [41] may terminate at some point between the tip of the anode at [40] and base of the device in FIG. dependent on the specifics of the design and the objectives of the DPF device. Said hole [41] may be used both to evacuate the DPF device (wherein the DPF device [10] envelope serves double duty as the vacuum enclosure [0]), as well as to back fill the DPF volume with a desired gas species, and also to introduce "gas puffs" at timed offsets from the closing of switch [20] so as to introduce a higher concentration of gas species into the pinch [50] near the tip of the anode [40]. The anode [14] may also be solid (particularly in older DPF devices) and may be made of or may contain its tip, a desired material for processing with the DPF (for sputtering, ion investigations, generation of X-Rays, enhanced production of Fusion events, etc.), or the entire anode may be of the desired material.

Whether the anode is solid or hollow, the plasma sheath attempts to retain contact with it and also attempts to be normal to the anode surface. If the anode is solid, the plasma sheath [39] at the anode end will roll over to become almost parallel to the DPF axis just before the start of the Pinch Phase [4], wherein the plasma sheath collapses into itself on the DPF Z-axis under intense pressure from the aforementioned now radially directed Lorentz Force.

The hollow anode operates substantially similarly, except that the plasma sheath adjusts to retain contact with the inside of the anode as it rounds the tip, at which point it may progress into the hole [41] and progress backwards [45] into the hole due to the aforementioned Loretz J×B force now being directed both radially and also towards the base [17] of the DPF device when inside tubular hole [41], since then the radial current flow is now outward at [45] from the DPF axis, resulting in a collapsed axial plasma sheath [53] to the inner side of tubular hole [41] within hollow anode [14].

This dynamic allows all the radial plasma sheath currents [39] to flow radially inward from the outer electrode [12], approach each other near the center axis and pinch point [50] of the DPF device, and since like flowing currents attract each other, cause all the plasma sheath current to collapse and compress inwards and merge on the Z axis, fountaining into the hollow anode [41] along the centerline axis as shown terminating at [45]. This radial collapse of the substantially axially aligned currents produces the Pinch Phase [4] for the hollow anode wherein the "Z-Pinch" effect occurs at or near [50], and the fast moving and high concentration of converging currents drives a plasma pulse of ions or other species down the centerline axis of the DPF device typically away from the anode [14] (for ions) when it is positively charged and the reverse if negatively charged.

Note that the pinch [50] actually has two independent contributions, and one may be preferred to the other (or a combination thereof) depending on the explicit design of the DPF. As described above, the plasma sheath and shock essentially make a hard inward turn at [40], from being substantially perpendicular to the axis during the Rundown Phase [2] to then being nearly parallel to the axis thereafter as shown by [39] near the Z axis. This may be thought of as the plasma sheath and shock "slipping off the end" of the anode at [40] and is paramount to encountering an over-expanded supersonic nozzle at [40]. For a supersonic nozzle, an increase in the flow cross sectional area results in an increase in the velocity, and experimentally it is found that the radial velocity after corner [40] is about twice what the axial velocity was before [40]. In this case, a first pinch contribution is substantially all radially directed from the over expanded expansion at the corner [40] of the anode. Unfortunately in this case, the majority of the rest of the plasma sheath and shock [39] are still traveling parallel to the Z-Axis and this energy is substantially lost to the pinch.

The other second possible contribution to the pinch can occur if the aforementioned majority of the plasma sheath and shock were directed in total (or a substantial part), via suitable supersonic DPF device shaping, to be directed in substantial fraction onto the Z-Axis without the intermediate discrete over expanding at the corner of the anode [40]. In this case, the contribution to the pinch [50] would be the totality (or a substantial fraction thereof) of the plasma sheath and shock [39] instead of only a small fraction of it as occurs with said first pinch contribution. In such a case, the plasma sheath and shock would not have the toroidal curved surface shown in FIG. 1 for [39], but a geometry much straighter, more conic or near cylindrical and yet radially ingressing in the ideal embodiment. How to do this, or at least how to get closer to it, is a key objective of the invention.

It should be noted that if a suitable over expansion is not realized in said second contribution, then the velocity of this second contribution may not be as high as the velocity of said first pinch contribution, leading to lower energy density in the pinch. Conversely, said second contribution will certainly provide more total mass and a larger volume to the pinch. An objective of the invention is to achieve a mix, or a compromise, or optimization of both of the best attributes of the said first and second contributions to the pinch which will result in a pinch with substantially similar or higher energy density as said first pinch contribution, but with the mass, larger volume and longer duration of pinching as said second pinch contribution, or greater.

During the pinch [50], both the plasma sheath and leading shock wave collide into each other on the Z-Axis creating a tremendous increase in temperature, density and pressure (i.e. energy density). This begins the Reaction Phase [5]. The Reaction Phase [5] proceeds in two parts, an initial radial collapse and compression first event, followed by a rarefaction second event which might be considered a "bounce" from the initial radial collapse compression event. During the initial radial collapse and compression first event, a first set of reaction products is produced. These reaction products could be electrons, x-rays or ions, or Fusion products (to include neutrons and energy) if the collapse is fed or seeded with Fusion fuels. Fusion that occurs during the initial radial collapse and compression first event is referred to as "Thermonuclear Fusion" because it arises from the raw macroscopic increase in temperature, pressure and density in the midst of the concentric colliding plasma and shock wave. Although it produces Fusion reactions, the radial collapse and compression first event is typically very short, on the order of a multiple ($10s$) of nanoseconds and, therefore, is not typically contained long enough for practical Fusion.

Interestingly, a second set of Fusion reactions is seen to happen during the rarefaction second event of the Reaction Phase [5], and the number of Fusion reactions and products is usually much larger than obtained from the said first event. This curiosity is found to be due to at least two mechanisms. The first mechanism is the acceleration of ions to very high velocities (temperatures) from instabilities created during the first event, that then collide with the ambient (for example, Fusion fuel) gas a short time later, resulting in a plethora of reaction products (neutrons and other Fusion products if seeded with Fusion fuel). FIG. 1, [70] represents the outflow of both these and potentially other reaction products, such as, but not limited to, X-Rays and electrons. Additionally, it is found that during this second rarefaction event, a variety of transient plasma instabilities [60] may be formed, and these appear to produce lingering and higher net output of Fusion reactions for a substantial period after the Pinch Phase [4] has happened, upwards of 100 nS or more. It is an objective of the invention to enhance the reactions in both the said first event and said second event, as well as potentially merge them into one continuum longer event.

The cited plasma instabilities [60] depend on the details of the specific device physics, and appear associated with the Z-axis collapsed current filaments. They have been associated with increased rates of neutron production, and thereby inferred higher rates of Fusion (see for example "Self-Organized Structures in Z-Pinch Plasmas", A. Ortiz-Tapia, Dissertation, 2001, Lambert Academic Publishing, 2012), which have been observed experimentally as well. Key instabilities of interest include the m=0 Sausage Instability, the m=1 Kink Instability, and the Plasmoid Instability, all represented by [60]. They have been promoted as a possible path to commercial Fusion with a DPF device. The origin and retention (lifetime) of these instabilities is still somewhat indeterminate, and if they are to be employed for production of Fusion energy, they must be reliably produced, and they must be retained/sustained long enough to produce enough Fusion events to return the energy invested to create them. Part of doing this is to start out with an improved highest temperature and highest density and longest lasting pinch from the DPF in the Pinch Phase [4] and first event of the Reaction Phase [5], and that is a central objective of the invention.

If the aforementioned instabilities turn out to be key to practical Fusion, they must be easily produced and sustained. In this regard then, an enhanced DPF designed that promotes the said instabilities through the reduction of Entropy can be achieved by reducing or removing the current and thence with it, its ohmic heating of the plasma, and doing this just after the said first event pinch has been achieved. This then removes the ohmic heating from the DPF current source, which allows the other heat loss mechanisms to remove more net heat from the plasma, which in turn decreases the entropy much more rapidly than might be achieved otherwise.

Note that if the anode is solid, then the same basic phenomena transpire in the DPF up to the pinch. It's just that the pinch volume now only protrudes from the front face of the anode instead of within its hollow tube interior, and so the pinch volume may be smaller, and the currents will terminate on the front face of the end of the anode flush with end corner [40], and thence also an accelerated pulse of energetic electrons will impact the anode. Assuming the anode to be of a high Z (charge) metal, this will produce copious X-Rays as part of the radiation products [70]. If the anode [14] is hollow, then obviously this X-Ray effect is notably diminished, but the aforementioned instabilities may extend longer along the Z-axis and into the hollow anode, and may live longer without the anode acting to terminate same.

With the given polarities of the electrodes, the pinch at [50] will produce high energy ions out of (towards the right in FIG. 1) the device along the centerline axis [70]. This is what enables most of the other applications of the DPF for the production of experimental and industrial ion beams to include production of other particles (to include Neutrons) when a selected target is placed in the path of the high energy ions.

Figure 4:
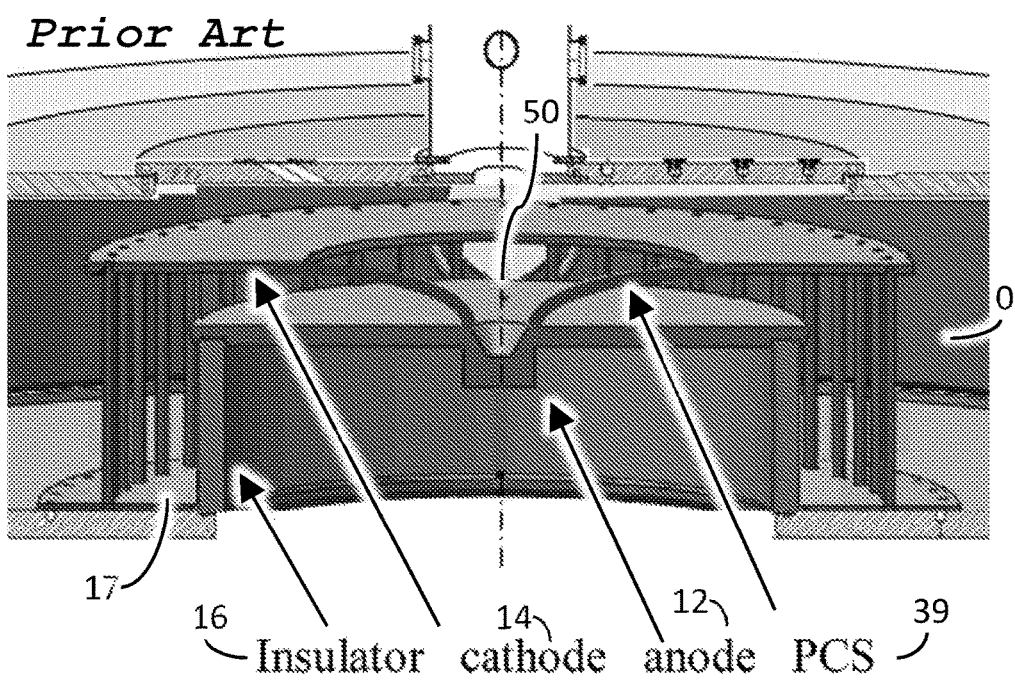
FIG. 4 is a 3D cut illustration of a Filippov type Dense Plasma Focus device.

FIG. 4 shows an example of a prior art Filippov DPF, wherein the similarities and differences with the Mather device described above are readily apparent. In the Filippov DPF, the plasma sheath [39] is likewise struck across the insulator [16], but now the insulator occupies the inner radius of a much larger radius cylindrical anode [14]. Whereas the Mather DPF device comprises two substantially parallel cylinders electrodes, the Filippov PDF device also comprises a pair of substantially parallel but short cylinders electrodes subsequently and then predominantly comprised of two parallel washer shaped disks electrodes in an analogous manner. A possible disadvantage with the Filippov DPF device is the difficulty to strike the plasma discharge simultaneously for a substantially azimuthally uniform arc, versus the smaller diameter of the Mather DPF device, although this has not appeared to be a significant detractor in demonstrated experiments with the Filippov DPF device. The struck discharge forms a plasma sheath like before, which also lifts and rotates up to the cathode in what might be called the upper gallery cathode [14] in FIG. 4. This then produces a substantially cylindrical (usually shaped as a conical annular shell) plasma sheath [39] that collapses towards the center to pinch along the Z-axis at [50]. With this direct association between the matching components of the Mather DPF and the Filipoff DPF devices, it is easy to see how improvements in one are almost universally applicable to the other with small and obvious changes to those skilled in the art of Z-Pinch and DPF devices.

Shortfalls in standard DPF performance are well known in the art and attempts have been made to improve and enhance the DPF performance. However, with few exceptions, improvement attempts have comprised mostly of changing, optimizing and tweaking existing scalar parameters of the basic core design shown in FIGS. 1-4, with very little theoretical or experimentation work made to the fundamental design of the DPF device, either of the Mather or Filippov type.

Additionally, the prior art has realized some physical limits to the operating range of some of the DPF key parameters. For example, a "current saturation" limit wherein higher currents do not appreciably improve DPF performance and/or plasma sheath velocity limitations are known.

Although such limitations may dour prospects for improvements, it must be recalled that these limitations are defined within the constraints of the assumed design implementation for DPFs, which are substantially identical to those of FIGS. 1-4. The prior art is lacking in DPF devices with different geometrical and physical configurations or different operational embodiments of the DPF device proper. Prior art DPF device designs only comprise a central cylindrical conductive anode (either solid or tubularly hollow), passing through the center of a cathode baseplate comprising a conductive circular disk; the cathode further comprising a cylindrical "birdcage" of circumferential disposed co-axial and colinear conductive rods or tines mounted on and electrically connected to the said conductive circular disk; and a tubular insulator separating the said conductive circular disk baseplate of the cathode from the said anode and providing a linear extent of insulation from the said conductive disk baseplate of the cathode to a first exposure of the anode from behind said insulator tube. There is then a high voltage power supply imposing a high voltage pulse across the anode and cathode connected at or near the said conductive circular disk baseplate. And, the power supply is almost invariably just a simple capacitor with a simple pulse forming network. This simple description hereafter referred to as the "Baseline DPF Design" substantially describes the vast majority (almost all) of the DPF devices disclosed in the literature with precious little variation between them, other than maybe bigger capacitors and higher voltages and occasionally fabrication of different materials.

It is a first objective of the current invention to disclose improvements to the Baseline DPF Design that enhance the capabilities and performance of DPF devices applied to their various useful applications. Although one application (for example X-Ray production) may differ in detail from another application (for example production of copious neutrons), enhancements to all DPF applications invariably benefit from improvements in the parameters that define the pinch at [50], since in the end, the DPF is all about producing that pinch. The fundamental pinch parameters include temperature, density, volume, and duration. These are the same parameters that define Fusion performance vis-à-vis the well-known Lawson Criteria. Since all applications of the DPF benefit from improvements in these parameters, and since Fusion is also a candidate application of the DPF, striving to achieve the Fusion requirements in a DPF device serves to benefit all DPF applications. To that end then, the DPF pinch requirements to strive for are those for (at least) "Break Even Fusion" which have been specified variously and respectively as:

Density $>=1\times10^26$ m$^-3$ to $5\times10^27$ m$^-3$
Temperature$>=10$ keV to 25 keV
Current Channel OD$>=100$ μm to 19 μm
Pease-Braginskii Current$>=1.4$ MAmp. to 1 MAmp.
Confinement Time$>=1$ μs to 100 ns
Length: Not defined to $>=9$ cm (See reference "Neutron Emission Generated During Wire Array Z-pinch Implosion On Deuterated Fiber", D. Klir et. al., Physics of Plasmas, Vol. 15, 032701, 2008, AIP; and "Fiber Z-Pinch Experiments and Calculations In the Finite Larmor Radius Regime", M. G. Haines, et. al., Lasers and Particle Beams, Vol. 14, No. 2, pp. 261-271, 1996, ATP).

Current DPF devices do not achieve these criteria necessary for Fusion. However, some DPF devices do come close and even exceed one or more of these parameters, but none all at the same time, which is what is required for Fusion. The key to Fusion is achieving ALL the criteria at the same time. For this, one requires a DPF device that can provide not just good performance in one isolated parameter, but good performance in all the parameters. This necessarily requires optimizing every part of the core design of the DPF, more so than it has been in the past.

A further objective of the application then is to provide improvements to the DPF design which enable significant improvements in all the performance criteria necessary for the achievement of enhanced Fusion performance, with a milestone goal of achieving Break Even Fusion. In so doing, all other applications of the DPF device will benefit. Although any of the many applications of the DPF device may be optimized, enhancement of the neutron generation capability of the DPF, most relevant for Fusion, will almost universally also improve the other applications of the DPF. Therefore, it is useful to attempt to achieve practical Fusion with a DPF, for even failure will improve the DPF for its other applications.

A first challenge to optimum DPF operation is starting the plasma in the device with a smooth, uniform, homogeneous, simultaneous and reproducible plasma discharge. In fact, prior art DPF design is usually compromised in order to ensure this. In addition to spatial and short term temporal uniformity of the struck plasma sheath, the DPF must also have uniformity and repeatability from pulse to pulse to include repeatability of the current and voltage temporal profiles and also jitter from pulse to pulse. When such is not the case, one or more DPF performance metrics may decline. These aspects are all dependent on the ease and uniformity with which a plasma discharge can be struck in the DPF.

Figure 5:
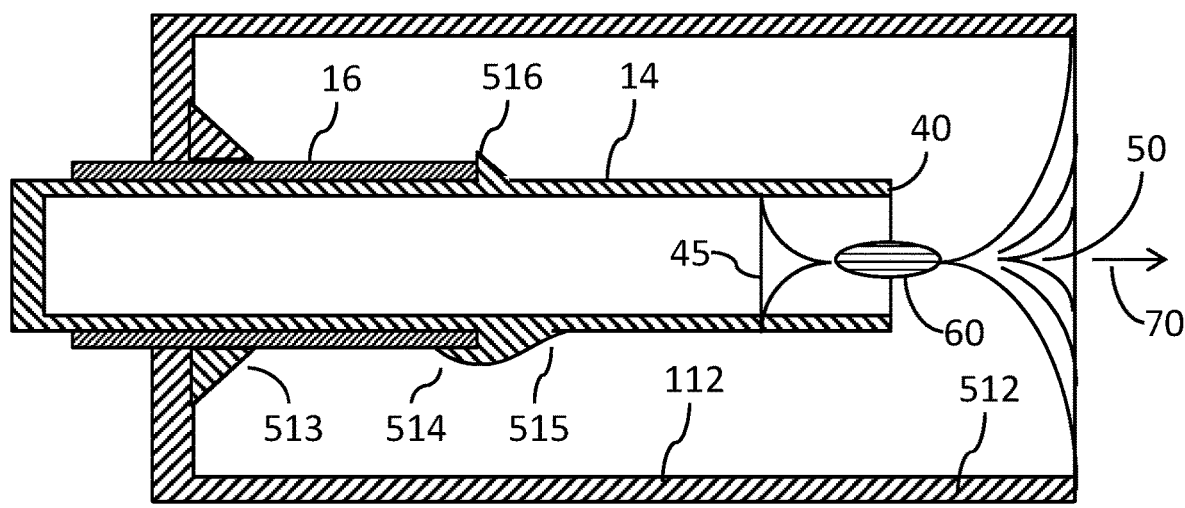
FIG. 5 is a cross section illustration of an improved DPF device embodiment with extended length cathode and knife edges bracketing the insulator to ease arc initiation and improve arc uniformity.

The present application provides an improved embodiment of the DPF device comprising a second annular "knife edge" ring [514] electrically connected to the anode immediately above the end of the insulator tube as illustrated in FIG. 5 opposing a first annular "knife edge" ring [513] electrically connected to the cathode. Such pair of edges could be expected to approximately halve the arc starting jitter versus a single edge. Additionally, it will reduce the arc starting voltage further and thereby enhance arc and plasma uniformity. Note that to achieve this embodiment in a desirably symmetric form, it may be necessary for there to be a bulge in the anode diameter between [514] and [515], where the bulge tapers gently back to the anode's cylindrical profile at [515]. This bulge might preferably be minimized in order to not disrupt the anode's behavior too much. However, depending on the specific design (determined by detailed electromagnetic simulation optimization) it could also prove beneficial to holding the plasma sheath in that location for a short period of time which might be useful for helping to level the plasma sheath (i.e. make it perpendicular to the central Z axis) between the anode and cathode, which will be discussed further subsequently.

An alternate subordinate embodiment which does not manifest the aforementioned bulge is shown by [516] wherein a corner flange protrudes from the anode in order to provide said "knife edge" for improved discharge start up due to the higher electric fields on the sharp corner edge. The exposed corner may be made flush with the insulator, but likely is preferred to protrude above the insulator surface a short distance in order to lift the arc a slight distance above the insulator to reduce insulator erosion. Note that one would not typically use both [514] and [516], their concurrent appearance in FIG. 5 being only for illustration and easy comparison. Features [513], [514] and [516] also serve as mechanical retainers for insulator [16] for additional mechanical support. Also note that in all cases the actual "knife edges" may be lifted off of the insulator by a small distance, to help prevent the discharge from burning the insulator which has been noted in some DPF experiments with higher power and many repetitive pulses. In such an embodiment, feature [516] would serve for example as a feature that improves a plasma discharge initiation and could: comprise a sharp edge for higher field strength points to aid in discharge initiation; protrude from a DPF electrode on the side facing the plasma sheath; be elevated up from an electrode to or slightly above an insulator surface of a DPF facing a plasma sheath; be disposed circumferentially about an electrode at a top or front end of an insulator; and be conductively connected to an electrode proximate to an insulator. In a similar embodiment, feature [513] would serve for example as a feature that improves a plasma discharge initiation and could: comprise a substantially similar sharp edge for higher field strength points to aid in discharge initiation; protrude from a DPF electrode on a side facing a plasma sheath; be elevated up from an electrode to or slightly above an insulator surface of a DPF facing a plasma sheath; be disposed circumferentially about an electrode at a bottom back end of an insulator; and be conductively connected to an electrode proximate to an insulator.

Figure 6:
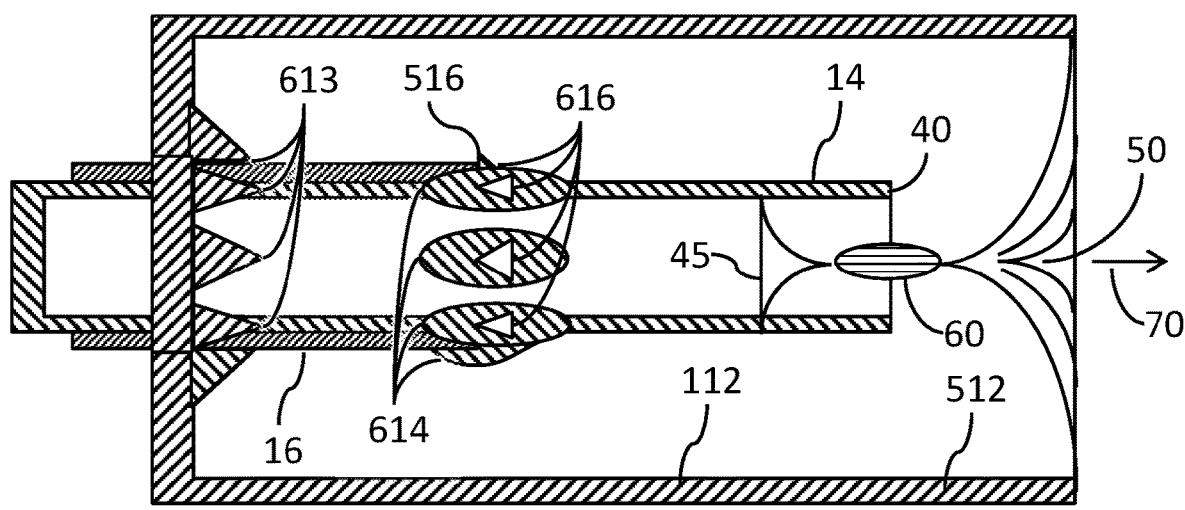
FIG. 6 is a cross section illustration of an improved DPF device embodiment with pointed knife edges bracketing the insulator to ease arc initiation and improve arc uniformity.

A further improved embodiment for both the lower and upper knife edges is to add pointed protrusions [613] to them as shown in FIG. 6 that illustrates a pyramidal point [616] added to the annular knife edge embodiment of [513], and [614] which represents a rounded point added to the annular knife edge embodiment of [514]. A similar point embodiment to that of [614] is envisioned for the corner edges [516] shown as [616], disposed circumferentially around the anode as was [614]. Each of these points on the knife edge features may take on a half conic, or half asymmetric conic (typically elliptically conic) or half pyramidal profile or combinations thereof best suited to start the discharge and then not cause shorting issues thereafter. Additionally, their fillets to the anode or cathode would ideally be rounded like described above for [513], [514], [515] and [516] to smooth the voltage potential lines and minimize arcs where not wanted. In such an embodiment, features [614] and [616] would serve for examples as features that improve a plasma discharge initiation and that could comprise pointed protrusions or discrete edges at or above an edge for higher field strength points to aid in discharge initiation.

In all cases, the said pointed protrusions [616] are best co-angular and radially opposed to the cathode rods or tines [112] or ridges (to be described subsequently) to aid in guiding new plasma filaments to these cathode plasma sheath retaining features. Alternatively, a pair of points may also be disposed azimuthally about the radial to each rod or tine in order to support pairs of filaments (a left side and a right side pair for each [616]) corresponding to a matching each rod or tine [112]. This not only further increases the local electric field upon application of the high voltage to further ease plasma sheath formation, but it also helps to localize and hold each plasma filament so that a balanced plasma sheet is struck around the whole anode as uniformly as possible.

Exact dimensions and shape and form of these features will be dependent on optimization with a detailed plasma and electrodynamics simulation in conjunction with the many design parameter degrees of freedom for a DPF. For example, it can be expected that the curves and fillets of [513], [514], [515] and [516] will likely take on semicircular, semi-elliptical, or semi-parabolic or similar shapes that smooth out and optimize the voltage potential contours around these features for electrical best performance.

In addition to enhancement with knife edges and tips, starting the plasma discharge can also be enhanced by introduction of a radioactive isotope in the vicinity of where the discharge is to be started. Adding a local isotope ionizes gas molecules providing more free electrons for easing the electron avalanche for arc formation. There are a number of subordinate embodiments by which this may be accomplished depending on design, the isotope to be used, and the discharge objectives to be achieved.

The potential isotopes that could be used are myriad, but can be grouped as Alpha emitters, Beta emitters, X-Ray/Gamma ray emitters and Neutron emitters. Others that do not fall discretely into one of these categories can be categorized by whether the emission is a charged particle (positives charges associate with Alpha emitters), and negative charges (associate with Beta emitters).

Alpha emitters will have the least penetration through materials and therefore must be placed very near the inner surface of the DPF, or be behind an Alpha ray transparent window in order to enable ionization of the ambient gas species molecules in the vicinity of the insulator between the anode and cathode. One approach is to mix an Alpha emitter isotope into the insulator [16] during its manufacture or by diffusion/deposition thereafter. Alternatively, an Alpha emitter isotope could be applied (painted or sprayed) onto the exposed surface of the insulator [16] thereby providing ionization induced free electrons right from the insulator's surface. Note that this could be a preferred embodiment since Alpha particles are one of the most ionizing radiation types (providing many ionizations of the gas near to the insulator for the least flux). For example, a 5.49 MeV Alpha particle is stopped in just under 4 cm of air. So this suggests that in the low atmospheric pressure of the DPF, the penetration depth would be further, but there still may be a fraction of ionization from Alpha particles close to the insulator. An additional advantage of this approach is that the Alpha particles are easily stopped by the metal cathode and anode and vacuum chamber materials, and do not cause creation of long lived radioactive isotopes, so handling and radiation shielding are very minimal and straight forward. What might be of concern is the case where the discharge erodes the surface of the insulator over multiple shots, either eroding away the Alpha emitter if sprayed or painted onto the insulator, and in any case vaporizing some of the Alpha emitter into the plasma, in which case any subsequent vacuum evacuation would need to be safely vented to prevent being breathed or consumed by humans.

Beta rays can penetrate some thickness of materials more so than Alpha rays but are similar to Alpha rays in the present context. X-Rays and Gamma rays can penetrate metal and other materials but still provide ionization. Neutrons will generally not interact significantly for ionization purposes. For these reasons, use of Beta or X-Ray/Gamma emitters may require some dedicated shielding depending on the design of the DPF and its enclosure and the types of radioisotopes employed. In any event, any radioactive species that has a high cross section for ionization of the ambient gas species used inside the DPF vacuum chamber may be integrated into the insulator [16] or applied to its surface to achieve the desired higher free electron density which in turn will ease and improve the sparking and uniformity of the desired discharge across the insulator between the cathode and the anode.

Figure 7A:
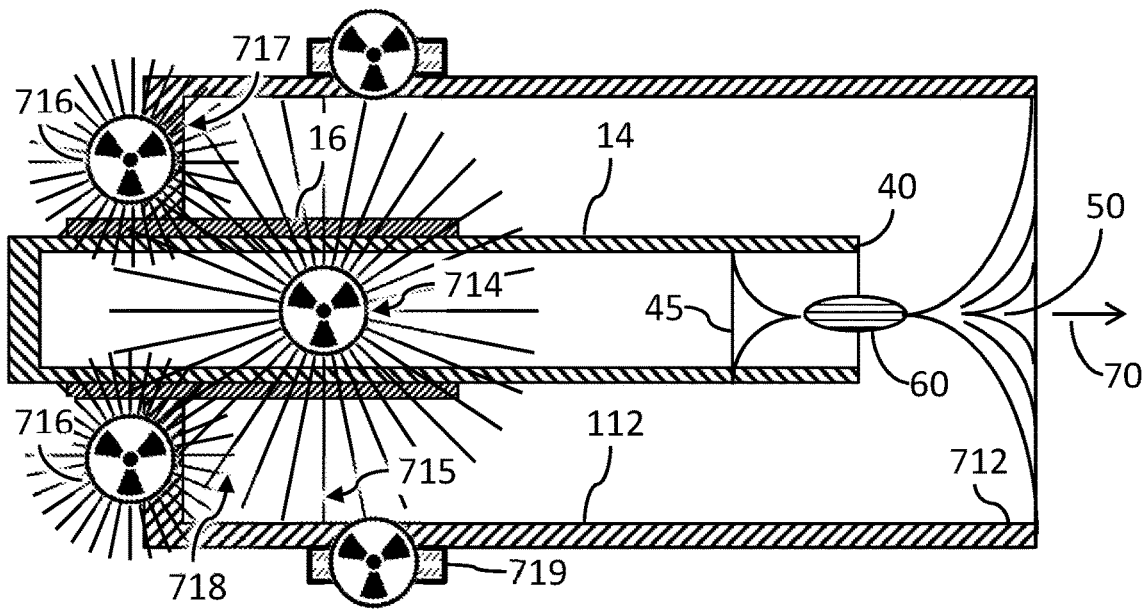
FIG. 7A is a cross section illustration of a DPF embodiment employing radioactive isotopes to help ionize the gas species in a disciplined manner and thereby ease avalanche discharge initiation.

Understanding these guidelines for ionization, a suitable gas ionization isotope can be employed in locations near the arc formation. Such isotopes may be integrated into and/or disposed between the edges and points [513], [514], [516], [613], [614], [616]. Alternatively, or additionally, isotopes may be integrated at positions within or through the cathode and anode shown in FIG. 7A. Annular positions in the base [17] such as [716] radiate ionizing radiation [718] axially and parallel to the tubular insulator surface providing very even ionization above the surface of the Insulator and around the annular dimension in order to not favor one azimuthally disposed filament formation versus another. The source may be mounted under the cathode [12] circular baseplate [17] if it can be made so the radiation can penetrate it, or inside the circular baseplate [17] (substantially as shown in FIG. 7A) or it could be mounted or coated or painted inside the DPF on the inner face [717] of the cathode circular baseplate directly exposed to the arc plasma volume (particularly if a lower penetrating form of ionizing particles is used, such as an Alpha ray emitter). In some embodiments, isotopes or sources would serve for example as features that improve a plasma discharge initiation and could comprise a radioactive isotope disposed on, in, behind, or near a base back end of a DPF. Alternatively or additionally, in some embodiments, isotopes or sources would serve for example as features that improve a plasma discharge initiation and could comprise a radioactive isotope disposed on, in, outside of, or near a base back end of an outer electrode of a DPF opposite an insulator. Alternatively or additionally, in some embodiments, isotopes or sources would serve for example as features that improve a plasma discharge initiation and could comprise a radioactive isotope inside of an inner electrode disposed near an insulator of a DPF.

Positions [716] will provide lowest arc initiation potential by forming ionization trails that substantially short the anode and cathode. However, there is no guarantee that particle emissions will be uniformly incident across all the azimuthally disposed discharge filament positions at exactly the same time, and so although this lowers the arc starting voltage it could imbalance the filaments azimuthally unless a sufficiently high flux radioactive source is used that provides a high enough rate of ionization particles within jitter times of interest for each filament (in other words so there are multiple ionizing particles within the desired jitter time variance).

Alternatively, the radioactive isotope may be located internal to the anode such as near [714] or external to or built into the cathode [719] in a ring around the cathode, either at a lateral station between about the middle (as shown by [714]) or bottom of the insulator [16]. In so doing, this provides an ionizing flux [715] primarily perpendicular to the DPF central axisymetric axis. This offers multiple potential ionization trails spread between the opposite poles of the discharge that introduce electrons for promoting avalanching, but they do not overtly short between the two ends of the insulator as did the prior embodiment. This is likely the lowest jitter and most uniform and enhancement geometry for discharge starting and thence a potentially preferred embodiment even if the discharge start potential is a little higher. A best embodiment will need to optimize between these alternatives using detailed ionization codes for the specific geometries of the DPF device.

Figure 7B:
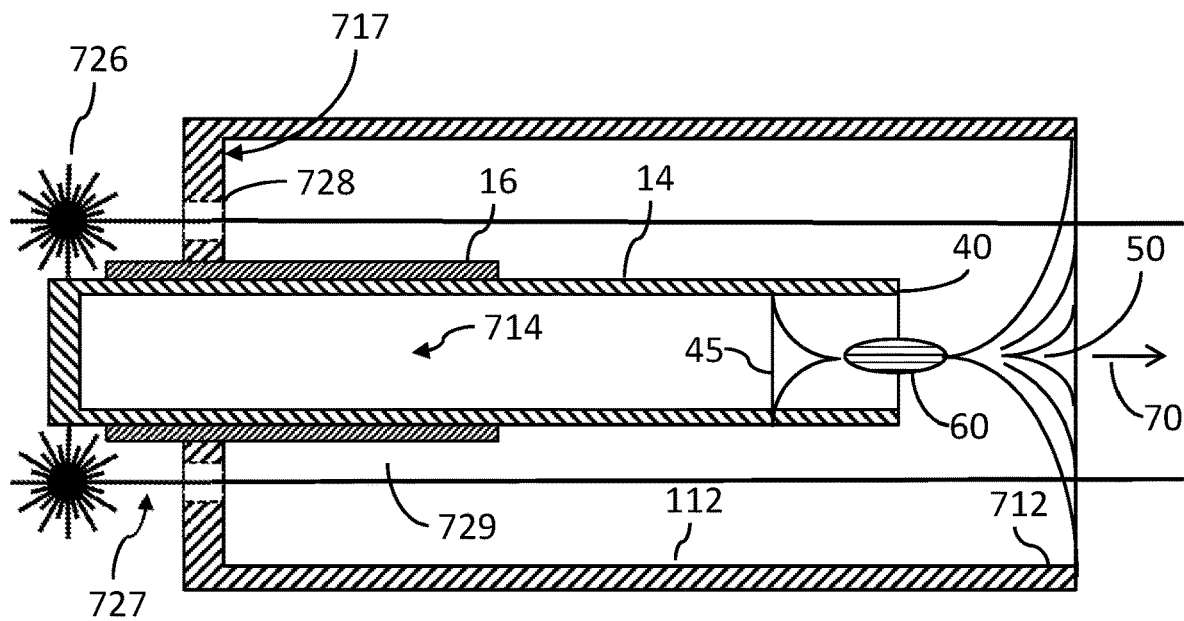
FIG. 7B is a cross section illustration of a DPF embodiment employing lasers to help ionize the gas species in a disciplined manner and thereby ease avalanche discharge initiation.

Ionizing lasers have been demonstrated to be able to guide arc discharges quite precisely, which in the present application ensures very consistent starting and uniform discharge shape and length when combined with the other innovations of the invention. Therefore, an alternate means for promoting the discharge startup is shown in FIG. 7B by employing ionizing lasers [726] located beneath (outside of) or perhaps embedded into the circle disk baseplate [717] (circa [728]) of the cathode [12], disposed to shoot its beam [727] through an aperture or window [728] a short distance [729] just above and substantially parallel to the Insulator [16] and out the DPF device opening, said laser comprising at least at one, but ideally multiple lasers, each disposed at an angular station corresponding to the rods or tines [112], or alternatively a lesser number of lasers located at symmetrically opposing angular positions to help strike a balanced discharge, or alternatively a larger number of lasers located interstitially azimuthally between said rods and tines [112], said symmetrically opposing angular positions preferred for creating as azimuthally uniform a discharge and plasma sheath density distribution as possible. It should be apparent that the azimuthal positions need not be fed by independent lasers but by one or few lasers with beam splitters to feed the more numerous azimuthal positions. In some such embodiments, ionizing lasers [726] or beams [727] would serve for example as a feature that improves a plasma discharge initiation and could comprise at least one laser disposed a short distance above an insulator of a DPF to stimulate ions for easier discharge formation. Also, given sufficient laser power, a singular laser or combination of lasers could be made to form one tubular shell laser beam that transits all of aperture [728] as a contiguous singular beam of annular donut/ring cross section.

The lasers are placed ideally at a distance [729] that is as close as possible to the insulator [16] without causing laser or ionization damage to it, and also as close as possible without the triggered discharge causing erosion to the insulator. The design could be angled such that the laser beams [727] hit and terminate on one of the anode knife edges [514] or [516], or tips such as [614] or [616], which has the advantage of terminating the lasers so they cannot interact with the rest of the DPF operation. The lasers are either pulsed immediately before the high voltage is applied between the anode [14] and cathode [12] or are turned on before the high voltage is applied and turned off after the discharge will have started, or the laser could be left on continuously, creating a continuous ionization channel for the arcs, under the assumption or demonstration that said ionization channel will not disturb or degrade operation of the DPF in an unacceptable manner (this likely could be an issue though pending specific analysis for the specific DPF design). In this manner, extremely consistent, uniform and highly controlled discharges may be triggered, making the whole DPF device operation very consistent and maximizing performance.

Returning to FIG. 1, it will be noted that the plasma sheath field lines at [39] are significantly extended beyond the rods and tines [112] wherein they bend around to the inside of the anode [14] at [50]. This means that both the field strength and plasma density for a given plasma arc filament is less at [50] than it is before exiting the annulus gap between the anode [14] and cathode [12] circa [40]. The fountaining filaments into [50] still produce an effective Z-pinch at [50] due to the convergence of all the filaments and the associated strong circumferential magnetic field [51] near the Z-Axis that applies a strong Loretz force to pinch the plasma and shock radially, but it is not as intense (not as high temperature or density) as it could be were the plasma sheath filament [39] straighter and disposed with a shorter distance to carry the current across. When the current geometry comprises longer path lengths, the current encounters a larger net ohmic resistance to bridge the longer path, and this has the effect of consuming more electrical power and reducing the current when the plasma sheath experiences these effects, resulting in a lower net energy density in the pinch with smaller pinch volume, lower pinch density and shorter pinch duration, all of which are disadvantageous to DPF performance.

The cause of this reduced pinching performance is inherent in the basic DPF device design, wherein a majority of the plasma sheath [39] and its associated preceding accumulated mass slug are effectively shot out of the DPF without ever contributing (at least directly) to the pinch performance. Additionally, when the plasma sheath filaments [39] are bent out as shown, they manifest a longer path length without directing any overt acceleration of the mass slug towards the pinch proper, meaning also that their effective inductance increases. This is bad for DPF performance, because just as the radial phase starts, where ideally one might want to "stomp of the gas" (so to speak), the operational physics increases the inductance significantly and reduces the applied current instead of at least maintaining it, or ideally increasing it.

Therefore, a means for improving the temperature and density of the DPF device pinch is desired. One such means is to lengthen the cathode [12] beyond the anode [14] by a distance of approximately the radial distance between the cathode [12] and anode [14] as shown by the extended cathode [512] in FIG. 5. Note that the actual amount of this extension will depend on the details of the DPF design and physics in order to optimize the plasma sheath filament densities and currents at [50]. So the said extension may be being somewhat shorter or longer than the length of extension described above. Such optimization requires specific information on the details of the device and its operation with detailed electromagnetic plasma codes known to those skilled in the art of plasma and accelerator physics. Note that this extended cathode [512] may inherit any azimuthal tilt of its rods or tines and may also accommodate the helical electromagnet with same or similar functionality and purposes in the end vicinity of the end of rods and tines [512], as opposed to midway down the axial extent. In some embodiments, an extended cathode [512] may serve for example as a feature that directs the plasma sheath in a more radially inward direction near a terminus and could comprise an outer electrode longer than an inner electrode.

Figure 8:
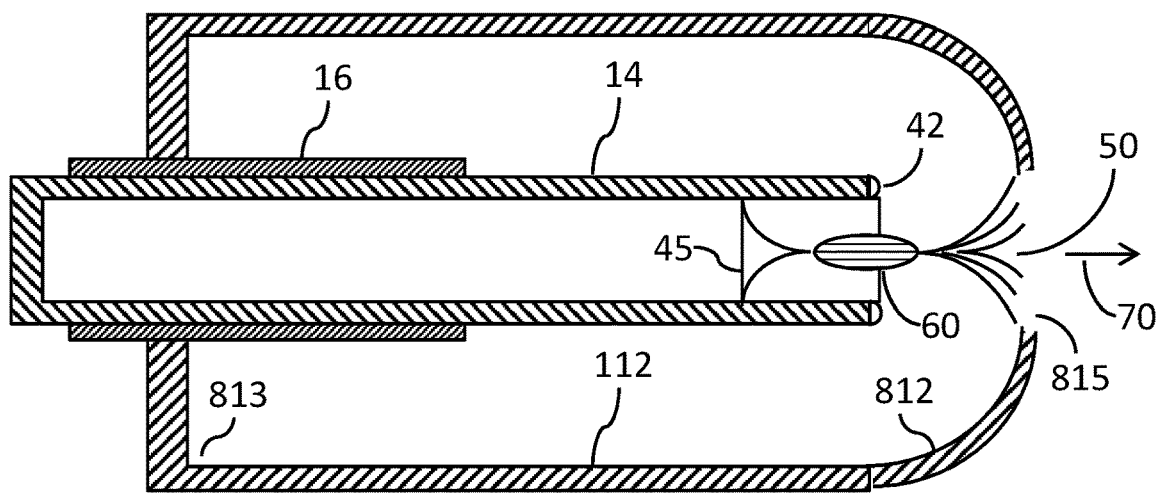
FIG. 8 is a cross section illustration of a DPF embodiment with an inward curved directing end to better contain, shape and direct the arc plasma for stronger and more intensive z-pinch.

A next possibility for improving the temperature and density of the DPF device is to roll the lip of cathode [712] in FIG. 7A or 7B over at the open end such that the cathode rods or tines end with a shape similar to an inward pointing hockey stick, as illustrated in FIG. 8 at [812]. The arc of the rods or tines [812] terminate by leaving an open aperture [815] through which the radiation products such as accelerated species ions, electrons or X-rays from the Z-Pinch may pass. Therefore, depending on the angular divergence of the ions, the open aperture [815] may be made smaller or larger to trade passage of the desired ion products versus the improved plasma sheath geometry and current thusly obtained (or alternatively to provide blockage thereof if desired). In some embodiments—for example those embodiments incorporating a curved cathode tip [812]—an aperture [815] could be a converging taper, rolled lip, or end cap that comprises an opening on an axis to allow an exit of DPF process products.

Note that by modifying the geometry of the DPF outer electrode, the plasma filament field lines are shortened and the density of the field lines at the pinch convergence [50] is increased, both of which are related to an increase in the field strengths, the current densities and resulting Z-pinch with higher net plasma temperatures and energy densities to feed a hotter and more dense Plasmoid at [60]. It should be noted that the rolled-in cathode end [812] will likely increase arc filament stability and uniformity both because it enforces a conductive voltage potential surface onto the end of the DPF, but also because it helps to shield the end of the DPF from external fields which could perturb the plasma filaments, and finally because it delays the radial phase of the plasma current profile, allowing the plasma sheath current to increase further. Additionally, arcs tend to become unstable as the arc distance is longer (lightning and Tesla Coil arcs being potential examples) and so the curved cathode tip [812] also serves to stabilize the plasma sheath filaments. In such an embodiment, a curved cathode tip [812] could serve for example as a feature that directs a plasma sheath in a more radially inward direction near a terminus and could comprise a converging taper, rolled lip, or end cap of smaller radius towards a top front end of an outer electrode near a terminus of an inner electrode inducing a plasma sheath to turn conically inward towards—and collapse onto—a DPF axis.

Returning to FIG. 3, regarding the stability of the plasma sheath filaments [7] (which is very important to a high power DPF Fusion device which requires very high precision in all its constituents), the isolated rod or tine design [112] of the cathode [12], be they tilted or not, may not be the ideal embodiment. Because of their isolated separation, each rod or tine [112] could stochastically, or from an environmental influence, develop an electric potential difference with respect to the others, thereby causing a different filament current to flow with a resultant asymmetry in the plasma sheath and subsequently suboptimal non-symmetrical pinch [50]. Additionally, significant plasma leakage past the cathode rods or tines [112] has been reported in the prior art, which in turn measurably reduced the plasma density and mass uptake fraction during plasma sheath transit down the anode and cathode length, with a corresponding reduced power density at the Z-pinch focus [50]. This is completely lost input power and energy which cannot be tolerated if one is to achieve improved performance and in particular for an objective practical Fusion power source. It is therefore a key objective of the invention to increase the mass fraction that actually contributes to and participates in the pinch.

Figure 9A:
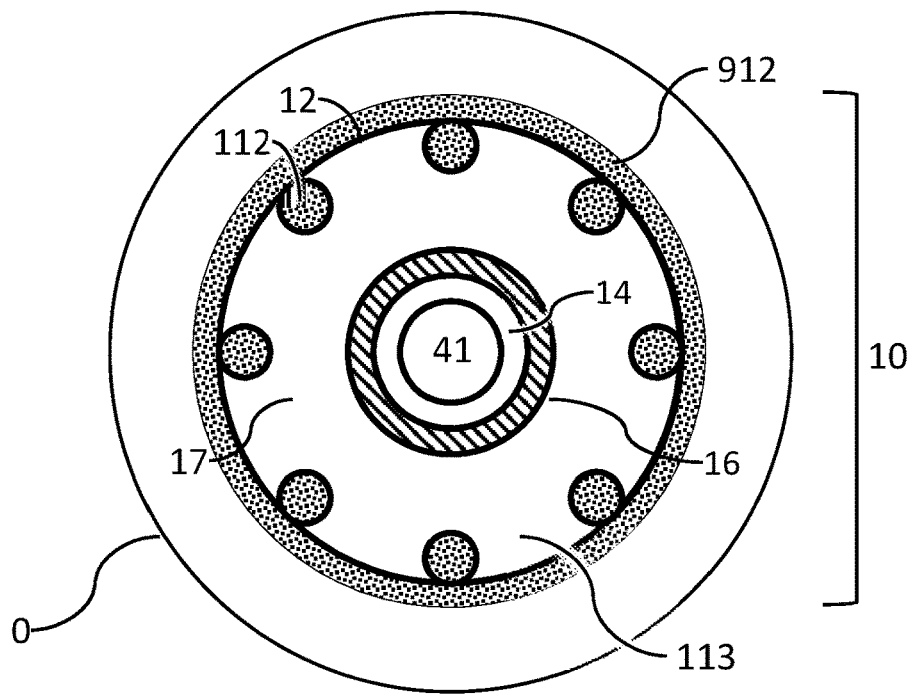
FIG. 9A is an end view illustration of a DPF embodiment of the invention employing a substantially cylindrical solid or perforated conductive shell shield or conducive cloth shell shield around the cathode rods or tines in order to reduce gas loss during sweep up Rundown Phase, reduce chuffing and associated short circuit arcing, and damping azimuthal disturbances that could cause undesirable variations to the arc filaments.

Ideally, one might therefore prefer to employ a smooth conductive cylinder such as that illustrated by [912] only in FIG. 9A, around the co-axial anode [14] instead of the bird cage of rods or tines [112]. Unfortunately, it was found that the plasma sheath experienced "chuffing" [46] in FIG. 9B wherein puffs of ionized plasma would trail just below the plasma sheath [7] to cathode surface [412] interface, and then cause tendril arcs [47] to form under the plasma sheath [7], thereby shorting out the plasma sheath. This issue must be addressed in order to allow the plasma sheath to continue to accelerate and propagate down the "Rundown" Phase [3]. The means chosen in the past has been to simply allow the chuffing plasma puffs to escape outside of the device by opening the cylinder up in the form of a birdcage arrangement of rods or tines [112].

This application provides an alternate manner to mitigate the chuffing and resultant tendril shorting behind the plasma sheath issues, thereby resulting in higher mass fraction swept by the plasma sheath which in turn provides more density and mass for an improved pinch. One embodiment for improved mass fraction is shown in FIG. 9A wherein a cylindrical shell [912] of substantially the same length as the rods or tines [112] is disposed circumferentially around the rods or tines [112] as shown. In so doing, the currents for the plasma sheath are still carried predominantly by the rods or tines [112] because they are close to anode [14], and the chuffing can still partially escape into the voids [113] between the rods and tines. However, the chuffing is restricted from unfettered escape out of the DPF Rundown volume by the cylindrical shell [912]. The radial thickness of the gap volume [113] is likewise selected to permit sufficient radial egress of the ionized chuffing puffs [46] such that they are radially further from the anode [14] than the plasma sheath [7], wherein the current will preferentially flow through the plasma sheath [7] due to a lower potential difference and shorter radial distance than the distance from the anode [14] to the ionized chuffing puffs [46].

Preferentially, the inner radius of the cylinder [912] is selected jointly to provide an acceptable reduction in chuffing that sufficiently mitigates tendril arcs, while maximizing the mass fraction swept up by the plasma sheath [7] during the Rundown Phase [3]. This cylinder [912] serves to prevent the plasma from leaking excessively past the open rods or tines. The key difference in this embodiment is the inclusion of the said cylindrical conductor [912] integral with and conductively connected to both the base of the cathode and also the rods or tines of the cathode [112].

Figure 9B:
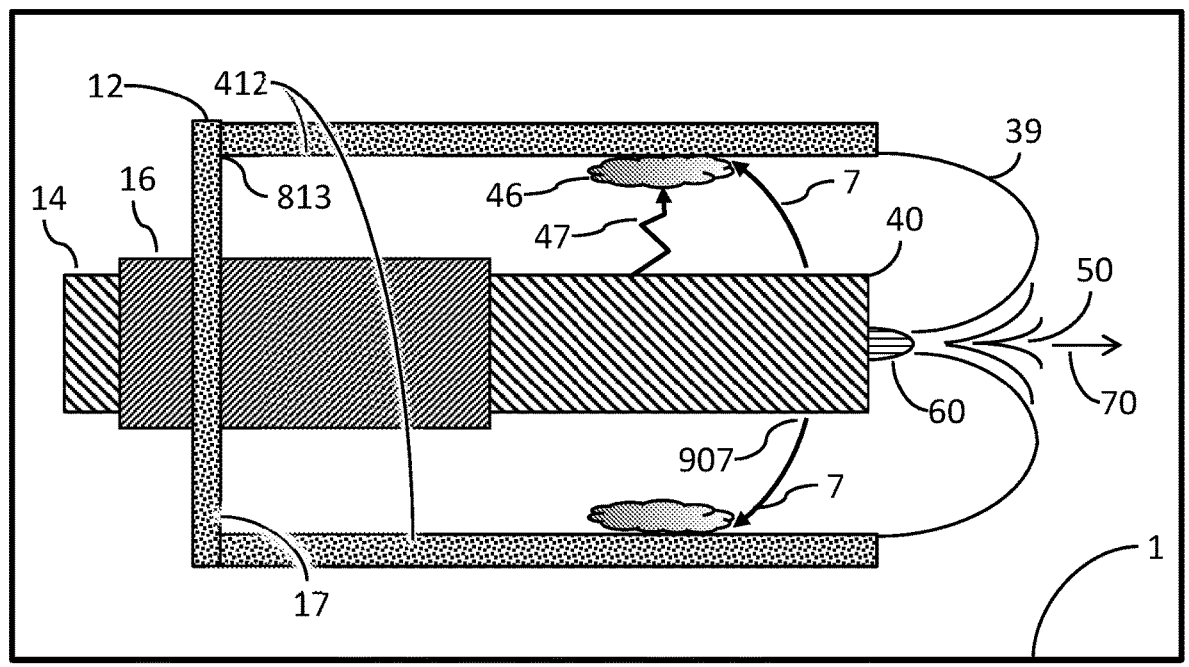
FIG. 9B is a cross section illustration of a DPF showing chuffing and short circuit arcing behind the plasma sheath.

The cylindrical shell [912] may be conductive or non-conductive, and even porous (for example a screen material) or nonporous. It also may touch the outer most radial extent of the rods or tines [112] as shown in FIG. 9B, or it may be of a larger diameter to offer additional radial backset from the rods or tines [112] or of a smaller diameter to overlap part of the rod or tines. The degree of conductivity, porousness and offset is determined by analysis with detailed plasma and electrodynamic simulation codes.

As may be appreciated, there are many subordinate embodiments which could achieve the same objective of giving the ionized chuffing puffs [46] a place to go that lures them away from forming the deleterious tendril arc short circuits to the anode under the plasma sheath. The cylinder [912] might comprise a cylinder with some holes to further allow the ionized chuffing puffs [46] to escape partially outside the DPF cathode, while still improving the mass fraction retained in the plasma sheath. The said cylinder [912] could alternatively comprise a pillow of a multiplicity of overlapping screens which give the puffs somewhere to go and become entrained and less associated with the gas inside the cathode. Alternatively, the cylinder [912] could comprise a composite of packed fibers or wool similar in appearance and operation to steel wool or sound deadening absorptive panels. In this way, the puffs may permeate the pack, and be sufficiently locked into it that it cannot participate in tendril arc formation. The cylinder [912] may also be comprised with a corrugated structure like corrugated cardboard, with the corrugations disposed either radially or azimuthally to again allow avenues for the chuffing puffs to escape to and be entrained, without allowing total freedom to depressurize the plasma sheath and its driven piston of air slug.

The cylindrical conductor [912] may also be extended azimuthally and curved over the curved rods or tines [812] of FIG. 8, providing a spherically/toroidally shaped dome-like end cap surface with a center circular hole [815] exposing the anode. Note that in a similar manner, the surface of the end of the anode [40] may also be rounded such as [42] in FIG. 8, substantially paralleling the inner curve of end cap [812], and that the inner and outer diameters of the hollow anode may be optimized along with the anode tip curved radius and curve shape at [42] to optimize the transition of the plasma sheath or filaments [7] over the anode edge [42] to produce a more focused and intensive arc current plasma fountain and Z-pinch [50] in the most optimum manner for Fusion or the desired application.

A potential issue with cylinder [912] is that it closes off the space between the rods or tines [112] of the cathode which could prevent new Fusion fuel or desired gas species from entering the DPF from the sides, and this may then impede clearing spent Fusion fuel or gas species from the volume and replenishing new fuel or gas species to feed the pinch volume near [50] and the plasma instability [60]. One means to address this issue is to cut holes in the cathode cylinder [912] to allow gas to pass through into the plasma sheath region between the anode and cathode. Another approach would be to replace the nominally solid cylinder [912] with a wire mesh or screen as cited earlier.

In any of the above embodiments for the cylindrical conductor [912], although they may serve to short out any potential differences between individual rods or tines of the cathode [112], it also may support resonant modes into what is then a potentially high Q resonant cavity between the anode [14] and the cathode cylinder [912]. Such resonant modes could easily be excited by the plasma sheath and then distort the arc behavior. Therefore, it may be necessary to make cylinder [912] out of some slightly resistive material that would substantially damp any resonant mode formation. The remaining issue may be engineering a material that can perform this way and also not outgas and contaminate the gas mixture, a challenge for the material scientists to solve. Beryllium alloy has been used or contemplated for such uses in the past.

Figure 10:
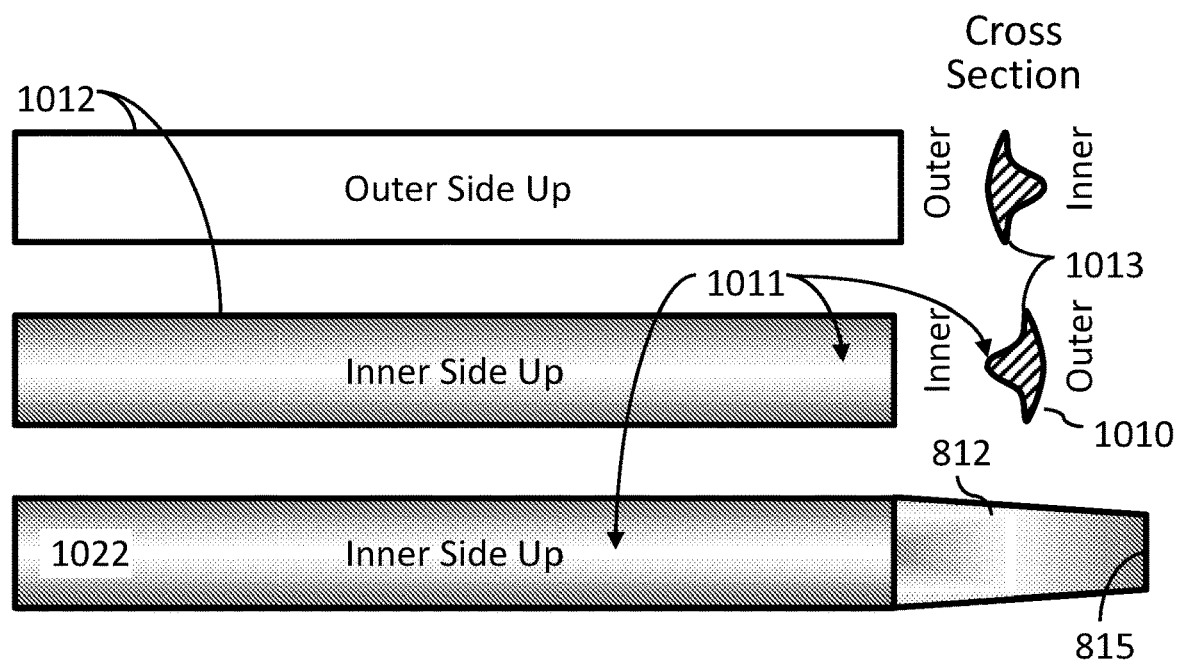
FIG. 10 is an illustration of an improvement provided by contoured ridged cathode rods or tines to promote plasma filament localization, control and stability, while also reducing chuffing and increasing gas mass fraction of sweep up.

An alternative likely preferred embodiment for the cylinder [912] is to design the rod or tines [112] of the cathode as illustrated in FIG. 10 to be integral to and conformal to [1012] the cylinder [912]. Herein the rod or tines have been azimuthally widened and converted in shape to have ridges [1011] on the inside facing the anode [14], with an arched section [1010] back profile matching the outer radius of the cathode cylinder assembly [912], mimicking the radius of the cylinder [912]. The ridge [1011] has a peaked but smoothed contour as shown to provide an eletrodynamically (largely electrostatic) optimum voltage potential profile that has a higher field strength longitudinally (axially aligned when installed) along the centerline of the ridge on the inside facing the anode [14] than elsewhere, thereby holding the plasma sheath filament from straying or extinguishing, this provided by a lower voltage potential presented to the filament from the anode [14] to said ridge [1011]. At the same time, the aforementioned ionized chuffing puffs may partially escape azimuthally, thereby decreasing their likelihood of creating tendril arcs and shorts. It should be noted that the ridge need not be pronounced and in fact should be made as subtle as possible in order to minimize non uniformity in the plasma sheath, just tall enough to ensure reliable and stable filament support while also alleviating the chuffing issue. Its height could be as little as a few millimeters. This allows the filament to spread as uniformly azimuthally as possible into a uniform plasma sheath. The optimized device will have related parameters selected to maximize mass fraction uptake into the plasma sheath while minimizing the deleterious effects of chuffing. In such and similar embodiments, a cylinder [912] could serve for example as a feature that increases a plasma sheath mass fraction, reduces turbulence and tendrils, or both and that could comprise enclosing outer electrode rods or tines with a substantially cylindrical conductive shell (which could for example comprise either solid or perforated material). In such embodiments, a ridge [1011] could as a feature that increases a plasma sheath mass fraction, reduces turbulence and tendrils, or both and could comprise an outer electrode which could comprise rods or tines having a resistive element azimuthally disposed between them along a length of the rods or tines in order to suppress undesired modes and currents.

It should be mentioned that the chuffing seems to occur predominantly (perhaps always) on the cathode electrode and seldom (if ever) on the anode. This phenomenon and reason for it is not discussed extensively in the literature, but may be due to an inverse (or lack of) Hall Effect on the cathode versus the anode, thereby not sealing the plasma sheath against the cathode wall as it does for the anode wall. This issue might be addressed by reversing the polarity of the DPF, but then it's not clear that there is an advantage to be had if chuffing now occurs on the anode instead of the cathode. This could be worse as far as tendril arc formation is concerned due to the smaller anode radius of curvature with its higher electric field, but might be easier to implement mitigation as described for the cathode but now into the anode.

In the case when the cathode rods or tines have a rolled tip as described for FIG. 8, [1022] of FIG. 10 illustrates how the rolled tip [812] would taper in the rolled section due to the smaller radius at [815]. Also illustrated is how the ridge [1011] might taper down in height so that it has little or no height at the very end [815]. This serves to promote the plasma spreading out evenly circumferentially into a most uniform sheet before collapsing into the Z-pinch at [50]. The more uniform the plasma sheet collapsing into the pinch, the less mass fraction lost and the stronger the net compression and pinch will be.

Figure 11:
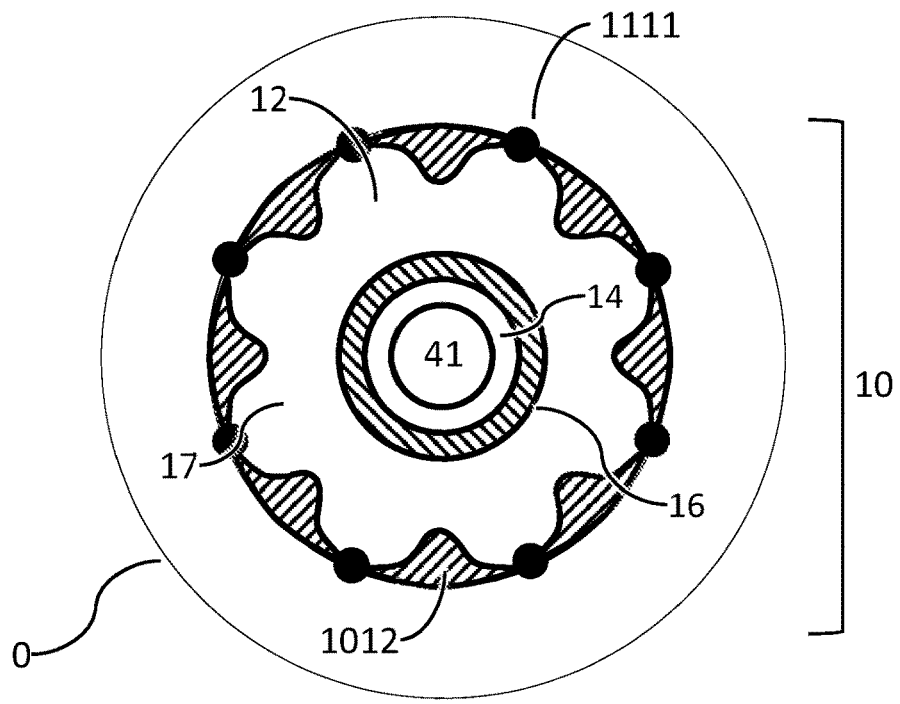
FIG. 11 is an illustration of a DPF employment of contoured ridged cathode rods or tines and their use for shielding the device and damping modes by use of resistors interstitial to the rods or tines.

The wide curved outside radius [1010] also provides a degree of shielding against stray electric fields. In a further embodiment, the curved width of the individual arc electrodes [1012] may be made large enough to either touch each other (physically and electrically), or almost touch each other along the circumference of the cathode [12], substantially mimicking the shape and attributes of the solid cylinder [912]. Furthermore, to provide damping of modes, the ridged rods or tines [1012] may replace [912] by being electrically connected to each other at their edges [1013] either conductively (for example soldered or made whole in similar manner), or with resistors or resistive material [1111] as shown in FIG. 11. This helps to short out any stray voltage difference across cathode ridges as shown by the end on view of the cathode in FIG. 11. Suitable separations may be used between the ridged rods or tines [1012] or holes may be drilled through them radially with respect to the whole cathode in order to admit gas as it's used up in the device. This configuration will not allow the plasma to escape nearly as freely as the isolated rods and tines of [112], thereby enhancing the mass fraction taken up by the plasma sheath, and increasing the focused plasma density and energy density. The height of the ridges [1011] will need to be optimized for best performance but as stated previously an optimum embodiment does not anticipate them being as relatively tall as shown in the Figures. In such embodiments, rods or tines [1012] could serve for example as a feature that increases a plasma sheath mass fraction, reduces turbulence and tendrils, or both and that could comprise an outer electrode comprised of rods or tines which could include an axially aligned ridge on an inward facing side facing an inner electrode.

Figure 12:
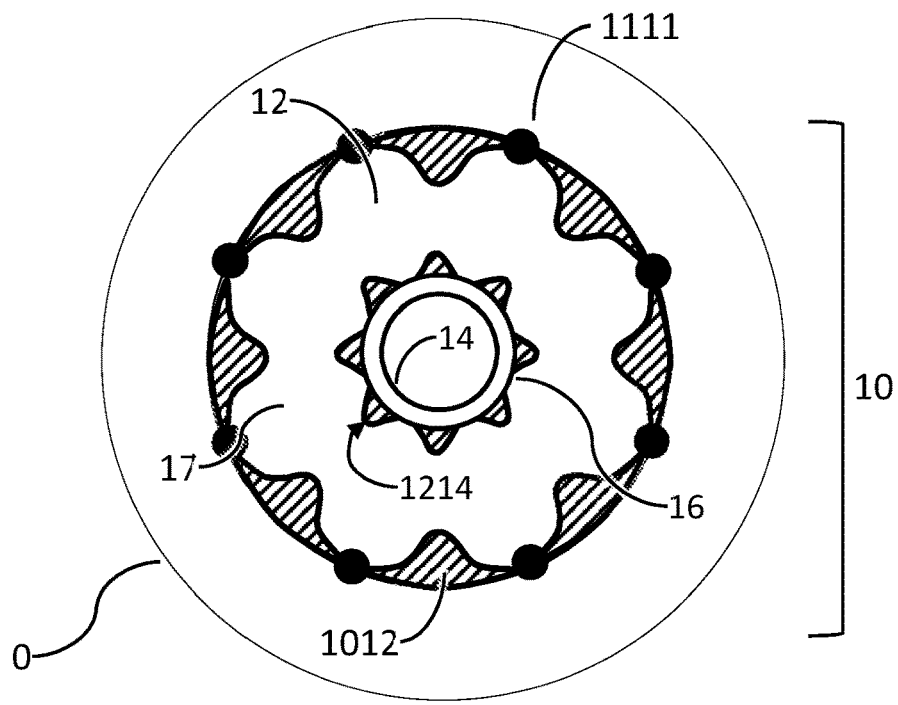
FIG. 12 is an illustration of the use of axially aligned ridges on both the cathode rods or tines and on an anode of a DPF in order to localize the arc filaments.

FIG. 12 shows a further embodiment of this approach, wherein a smaller version of the ridges of [1012] are aligned axially but distributed circumferentially onto the anode as [1214]. The anode ridges [1214] directly oppose the cathode ridges [1012] so that the potential is minimized in the azimuthal position where plasma sheath filaments are to be held and travel. Again, these ridges are likely of much less physical height and prominence than suggested in FIG. 12, as their only purpose is to guide and stabilize the plasma.

Alternatively, the ridges [1214] could be disposed azimuthally between the ridges of the cathode rods or tines [1012] thereby supporting pairs of filaments. With suitable contouring, this would serve to even out and equalize the radial potential and field in the azimuthal dimension. This both makes the plasma sheath more uniform azimuthally, and it also minimizes the potential of ionic chuffing puffs to develop tendril arcs, as well as help to fixate the plasma sheath.

In a further refinement of the embodiment, angular momentum may be imparted into the plasma sheath by tilting the ridged rods or tines [1020] all in the same chirality with respect to the axis of the DPF. Likewise, the ridges [1214] on the anode [14] may also be so disposed to taking the form of helical ridges running up the substantially cylindrical anode. In a like manner then, the cathode ridges [1022] may, instead of being tilted, be disposed into helical ridges impressed on the inner surface of a substantially solid or porous cylinder cathode [912]. Gaps or resistive terminations between ridges [1111] may then also still be employed, taking an axial shape essentially the same as the helix (pitch and radius). In these ways then, angular momentum may be imparted in a manner that also minimizes tendril arc formation while maximizing mass fraction retention for maximized pinch performance. In such embodiments, ridges [1214] would serve for example as a feature that increases a plasma sheath mass fraction, reduces turbulence and tendrils, or both and could comprise an inner electrode which comprises azimuthally aligned ridges.

Figure 13:
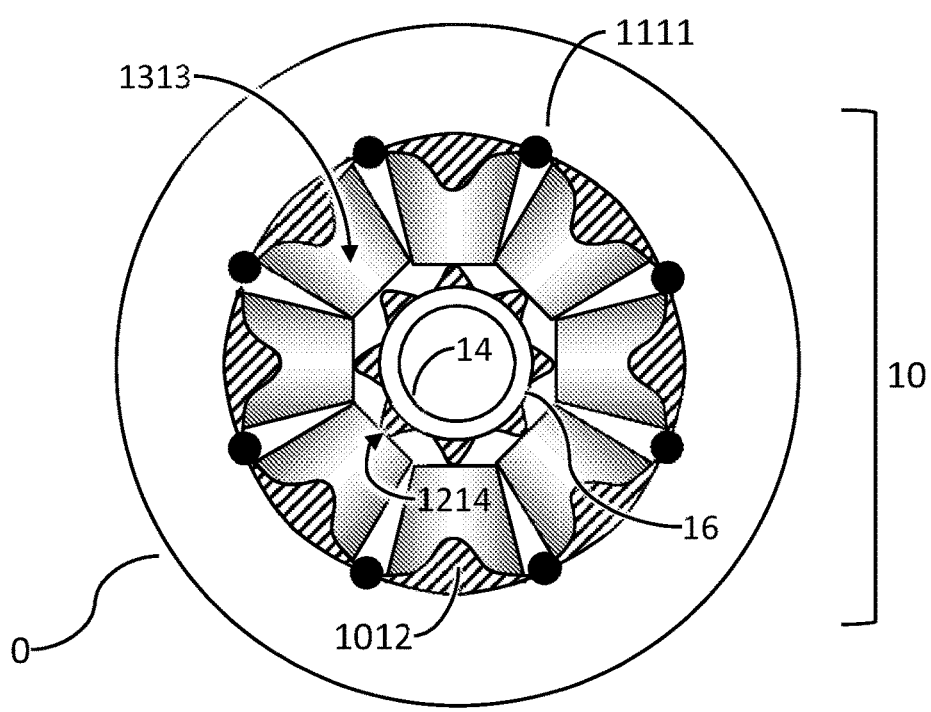
FIG. 13 is an illustration of the use of ridges also on the circular disk baseplate of the cathode to help guide and direct plasma filaments.

FIG. 13 shows a final embodiment of this approach, wherein ridges [1313] run along the bottom of circular disk baseplate [17] of the cathode [12], connecting the anode ridges [1214] from the anode to the cathode ridges [1012] of the cathode ridged rods or tines [1012] in a smooth contiguous manner that minimizes excessively concentrated electric fields but helps to guide plasma sheath filaments smoothly from the discharge formation over the insulator [16] into the gap between the anode [14] and the cathode [12] in a smooth and graceful and azimuthally symmetric and uniform manner. Again, these ridges likely have much less physical height than suggested in FIG. 13, as their only purpose is to guide and stabilize the plasma sheath filaments. In such embodiments, ridges [1313] would serve for example as a feature that increases a plasma sheath mass fraction, reduces turbulence and tendrils, or both and that comprises a bottom back end electrode which comprises radially aligned ridges on a side facing a plasma sheath.

Another approach to help stabilize the plasma sheath filaments is to exploit the previously referenced resonant modes to that purpose. Specifically, the rod or tines [112] being conductively connected to the inside of the cathode cylinder [912] turns them into circumferentially disposed ridges. This in turn resembles the geometry of a magnetron resonator with its associated field. One skilled in the art of electromagnetic could design the details of the interior between the anode and cathode to provide an RF standing wave filter that promotes good plasma sheath propagation while damping other resonant modes through use of anti-resonant modes in the structure design.

Another issue confronting conventional DPF devices is the rather discontinuous "corner" voltage potential imposed by corner [813] in FIG. 8. As can be seen in many of the DPF simulations, once the discharge strikes over the insulator [16], the discharge contact point on the cathode must navigate an extended additional distance across corner [813] until it catches up axially with the axial contact point station [907] (see FIG. 9B) of the plasma sheath on the anode. This is part of what causes the lagging of the plasma sheath cathode contact point near [35] in FIG. 1, which then manifests as an acute angle at the anode contact point [907] in FIG. 9B. This acute angle is often less than 45 degrees and can be 30 degrees or less. Such an acute angle produces a wedge snow plow action pushing the gas radially away from the DPF axis and out past the cathode rods or tines [112], thereby essentially ejecting the gas out of the DPF rather than sweeping it up into the pinch. Such an acute angle changes the behavior of the plasma sheet, and in particular the timing of the arrival of the sheet and its filaments at the ends of both the anode and the cathode, which in turn determines partially but significantly the extent of both the necessary axial length needed for DPF and its associated performance in producing the pinch.

Note that in the presence of the predicted terminal velocity of the Rundown Phase [2], there may be little opportunity for the plasma sheath to modify tilt angle [907] to level off into the ideal perpendicular orientation to DPF axis. This is further exacerbated by a predicted Hall Effect phenomena which promotes the plasma sheath crawling up the anode ahead of the plasma sheath's axial contact point station on the cathode, thereby predicting a tilt even if the prior discussed tilting effect did not manifest.

What is needed is a method(s) for leveling the conic tilt angle [907], or even pre-biasing the tilt of the plasma sheath as early as possible so that the plasma sheath can be substantially normal to the DPF axis through most of its Rundown Phase [2]. This will promote a much improved mass fraction sweep up by the plasma sheath, since the gas mass will not just be shed and thrown radially out through the cathode rods or tines [112] straight away during acceleration. In addition to increasing the mass fraction, it may also allow the whole DPF device to be shortened since at least now the plasma sheath's axial extent would be a few millimeters instead of several centimeters in a typical device, and a shorter device will require less energy to achieve same performance.

Figure 14:
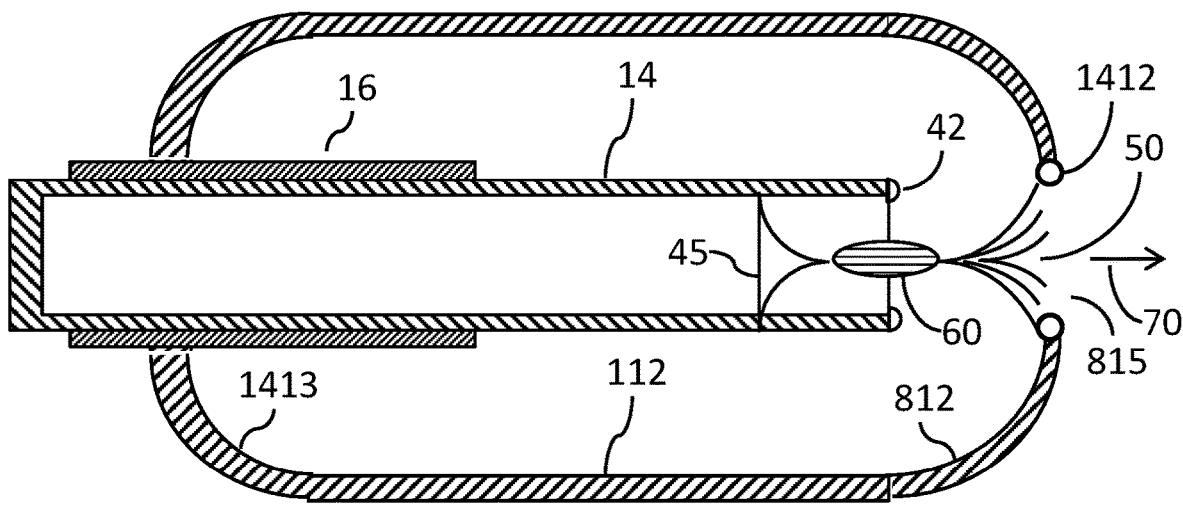
FIG. 14 is a cross section illustration of a DPF embodiment showing a rounding of the cathode base corners to shorten the plasma sheath path taken and also a rounded cathode end cap to direct the plasma sheath inward.

One manner of doing this is to shorten the total distance around the corner [813] by short cutting the corner into a radius turn as shown in FIG. 14 at [1413]. The radius [1413] allows the discharge [6], when struck across the insulator [16] to gracefully pivot from an axially alignment into a radial alignment with a shorter net transit distance through the arc [1413] than by having to circumnavigate through the corner [813]. This allows the arc to be more stable, stronger, and for it to be closer to level (i.e. perpendicular to the DPF Z-axis) between the axial contact point stations on the anode and cathode. This rotates the plasma sheath into an angle more perpendicular to the axis than with the corner [813], and it achieves this better tilt angle orientation sooner in the device operational timeline and so may allow shortening of the DPF with enhanced pinch performance. In some embodiments similar that shown in FIG. 14, rounding out the corner between an annular back base of a DPF and a substantially cylindrical outer electrode could improve a plasma sheath liftoff.

Also shown in FIG. 14 is a shorting ring [1412] in the case of multiple independent rod or tines [112] or ridges [1022], comprising a rounded end terminus of the cathode end [812] were it an annular toroidal shell, and this serves to equalize voltage potentials azimuthally and also to best shape the field lines for optimum plasma pinch at [50]. This is done by electrically joining all the converging tips [812] of the rods and tines [1022] together at the end of the cathode [815]. Although shown as a circular ring in an axial-radial cross section, this ring could have a rectangular cross section or an elliptic cross section or a parabolic cross section or a knife edge cross section or other shape that promotes the best plasma current and net DPF performance once optimized with an electromagnetic or plasma code together with all the other myriad parameters defining the DPF device.

A further improvement to the DPF performance can be obtained with suitable global tapering and/or contour shaping of the anode and the cathode. The reason for such limited success (if any) in the prior art in obtaining performance improvements with tapered experiments is because the tapering has been done with little or no regard for the underlying physics which might provide said improvement. True optimized performance will depend not only on the anode but also on the cathode as well in joint operation, and they each have a degree of freedom in the case of linear tapers (one each for the taper angle of the anode and another for the taper angle of the cathode), and then too, the taper angle may be continuously varied so as to achieve a curvilinear shaped body of revolution, one such curvilinear shape for the anode and one such curvilinear shape for the cathode, that together could have many degrees of freedom (for example, a shaped hour glass contour). A reason for considering such curvilinear shapes is their impact on and modulation of the supersonic flow of the plasma sheath [7] for true optimized performance. This will depend not only on the anode shape but on the cathode shape as well and further on their individual and mutual radii down the axial dimension of the DPF device. Because of the nonlinear operation of the physics in the DPF, only significant numerical simulation can provide the ideal optimized contour for both the anode and the cathode, and these too will vary depending on the specific parameters of the DPF as well as the performance parameters and levels sought. But some first order approximations may be surmised with simple consideration of the basic physics, and then too with slightly more involved modification of a code such as the Lee code to model and simulate the first order effects of more differentiated anode and cathode bodies of revolution contours.

Figure 15:
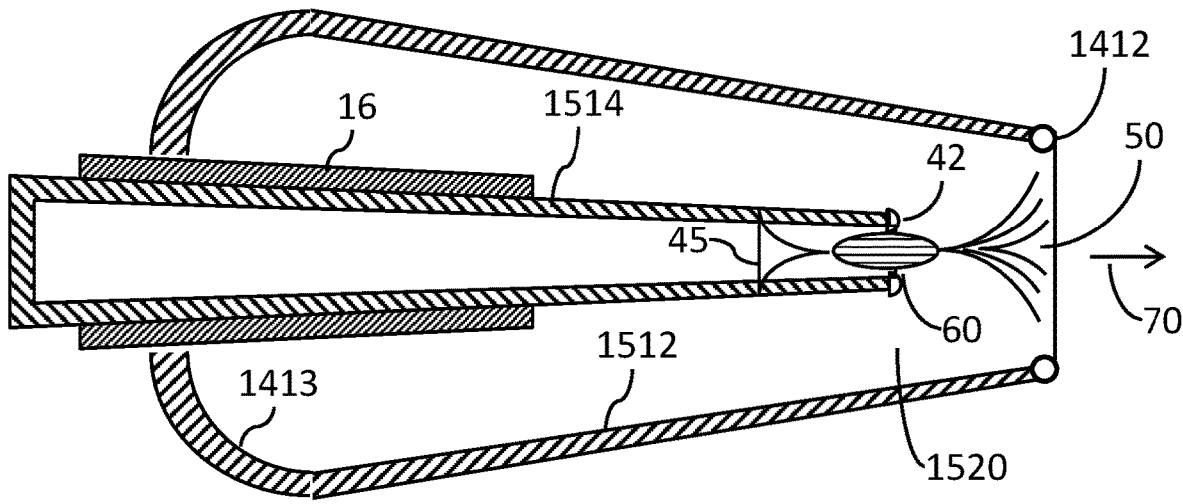
FIG. 15 is a cross section illustration of a DPF embodiment showing an inward tapered hollow anode and inward tapered cathode with extended cathode length.

An optimum tapering (and thereafter shape contour) of both the anode and the cathode will exist for a given set of conditions that provides an optimum performance of the DPF device. FIG. 15 illustrates the application of this principle to the overall design of the DPF. Either the anode [1514] and/or the cathode [1512] may be tapered radially inwards towards the end of the DPF device as shown, or the taper could be broken into more than one tapered sections, each with different taper angle and these may be further smoothed to provide a curved shape along the axis and radius dimensions, then lathed into a circularly symmetric body of revolution. In a highly optimized variant, the tapers would become smooth contiguous curves with associated smooth bodies of revolution. In some embodiments, an anode, cathode, or both of a DPF device may have either an expanding or narrowing taper along its length: that is, a diameter of the anode, cathode, or both may either expand or narrow along its length in the Z-direction. An end of the anode, cathode or both may be either larger or narrower than an front. Conversely a front of the anode, cathode or both may be either larger or narrower than an end.

Figure 16A:
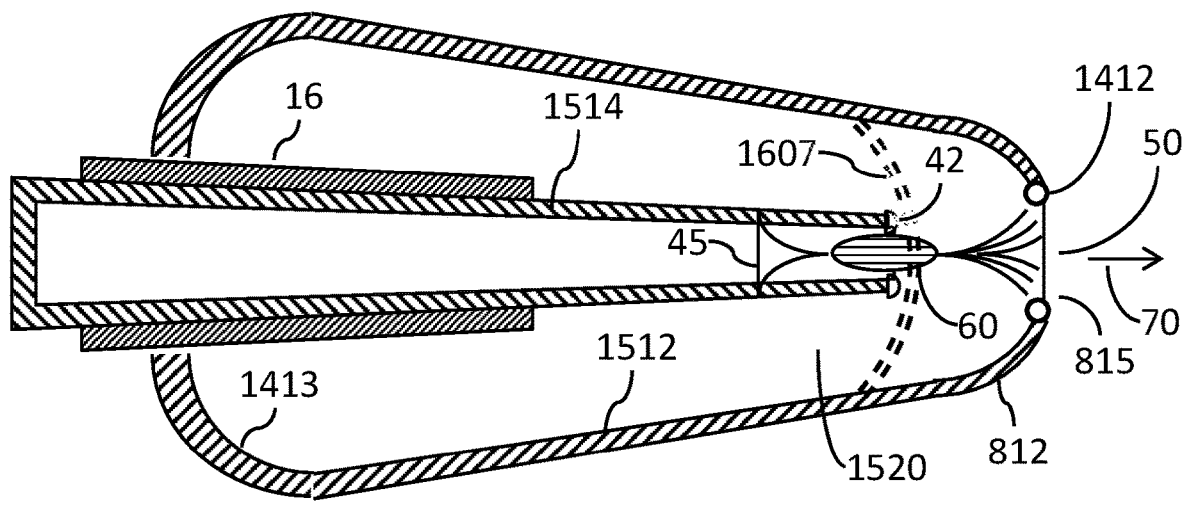
FIG. 16A is a cross section illustration of a DPF embodiment showing an inward tapered hollow anode and inward tapered cathode with extended cathode length and an end cap to direct the plasma sheath inward, with a reduction in cross sectional area that increases the plasma sheath speed to supersonic velocity with a Mach Disk placed where desired by the taper design, and with a desired ratio of cathode and anode radii to optimize inductance and/or DPF performance.

Note also that optional shorting ring [1412] may be employed across the rod or tine tips to ensure a precisely symmetric potential for the pinch that follows immediately after the plasma arrives at [1412]. Additionally, the optimum performance is not likely obtained from a straight taper terminus, but a curved taper for the anode and cathode as shown by the addition of the curved semi-toroidal shell cap [812] and optionally a shorting ring [1412] as shown in FIG. 16A. Likely an end cap curvature like [812] will be part of the optimum design. Again, explicit shapes are predicated on a total system optimization with detailed electromagnetic and plasma simulations to optimize all the plethora of DPF parameters with the tapering of both the anode and the cathode all targeting a set of predetermined device performance objectives. In some embodiments—for example, in embodiments incorporating a curved cathode tip [815]—a converging taper, rolled lip, or end cap could further comprise a shorting ring—for example, shorting ring [1412]—on a terminus, which could equalize any azimuthally disposed potential differences, particularly if an outer electrode is comprised of azimuthally discrete sections, rods, or tines.

Several competing physics phenomena are in play when designing the optimum DPF anode and cathode shapes and sizes. The inward tapering promotes a smaller anode diameter at [42], thereby concentrating plasma sheath currents and concentrating the magnetic field inwards towards the tip annulus near [1520], both of which increase the J×B Lorentz force that increases the plasma sheath speed and energy for higher DPF performance. Lee and Auluck (see references) have discussed a DPF "Neutron Limit" with its associated "Velocity Limit". Lee found that this limit, which manifests near the end of the Rundown Phase [2], is related to an increase in the device's net Inductance "L" such that the derivative of this inductance is proportional to the power transferred to the plasma sheath. With the Inductance (L) proportional to "ln(b/a)z", where "ln( )" is the natural logarithm function, "b" is the outer cathode radius, "a" is the inner anode radius, and "z" is the axial position of the plasma sheath. Minimization of L then increases the terminal speed of the plasma sheath and is obtained if the ratio of "b/a" is increased. It is not overtly desirable to increase "b" because that then degrades the pinch angle geometry of the outer most plasma sheath filament lines [39] folding down into the pitch at [50]. Therefore, both "b" and "a" should be reduced, but more importantly, the ratio "b/a" should increase, meaning simply that "a" needs to get smaller faster than "b" gets smaller, leading to a geometry similar to that shown in FIGS. 15 and 16A. With the ratio of "b/a" at the terminus of the anode larger than at the base circa [1413], the DPF of FIGS. 15 and 16A may provide a higher terminal plasma sheath velocity than other DPF designs.

Other embodiments may employ divergent tapers in either the anode and/or cathode or both to suite particular device performance objectives. A key consideration is to design the inner and outer tapers of the anode and cathode for optimum supersonic flow and minimization of shocks (except where desired for pinching). Supersonic flow considerations in conjunction with the consideration of the forced flow from the Lorentz force and the power available from the power supply (a highly non-linear system that must be solved simultaneously, and for the objectives and constraints of the DPF system sought, and likely also numerically), will produce an optimized design comprising continuously varying axisymmetric curvilinear tapers and associated shells of revolution for the anode and cathode similar to those known in the art of supersonic aerodynamics. Conically shaped anode [1514] and cathode [1512] and cathode tip [812] are approximations to the expected optimum shape which will likely take on more of an hour glass (or portion thereof) or rocket engine "bell" contour when fully optimized for the desired parameters space.

For example, it is well known in supersonic flow (Mach Number>1) that an increase in the cross sectional area of such a flow will result in an increase of the flow velocity. Commensurate with this, the pressure and density will decrease. Conversely, a decrease in the cross sectional area of the flow will result in a decrease in the flow velocity. Commensurate with this alternative, the pressure and density will increase. Where this becomes important is when choosing or matching such fluid dynamics to the particular mechanism of pinch compression.

Recalling the previously discussed said first and second contributions to the pinch, if one wishes to design the DPF to maximize the aforementioned said first contribution to the pinch, then the velocity may be inwardly high radially from the over expansion when transiting the anode corner at [40], and so one might favor the plasma sheath and shock to have a higher density at anode end corner [40], wherein a decreasing cross sectional area of the plasma sheath [7] when nearing the anode end near [1520] might be preferred in order to increase the pressure at [40] before it over expands and experiences the resultant high radial ingressing velocity.

In this regard, it will likely prove advantageous to design the anode and cathode contours in conjunction with the thermodynamic and flow properties of the plasma sheath so that the plasma sheath achieves a condition of "Choked Flow" [1607] in the plasma sheath [7] at or beyond anode corner [40] in order to provide a highest pressure and density starting state for the radially ingressing compression. The Choked Flow is in direct analogy with optimum rocket engine conditions in the throat of the rocket engine nozzle. The Choked Flow is a region where the plasma sheath achieves a terminal Mach=1 flow velocity condition in the local ambient gas, with higher pressure and temperature before the Choked Flow is encountered when traveling in the direction of flow which is advantageous to the first contribution to the pinch. Since the plasma sheath flow [7] is not strictly isentropic flow, deviations from this ideal situation will need to be modeled and simulated for optimum performance.

Conversely, if one wishes to design the DPF to maximize the aforementioned said second contribution to the pinch, wherein the plasma sheath itself is redirected in substantial fraction to be parallel to the Z-Axis, then there is less overt or significant contribution from the aforementioned over expansion at [40], and instead one may favor to increase the cross sectional area of the flow up to the terminus of the pinch, wherein the velocity will be increased at the expense of density and pressure, which should not cause a large degradation to net performance since density and pressure subsequently may increase significantly during the radial ingress towards the Z-Axis. In this case, the aforementioned Choked Flow [1607] may be preferred, and may occur before or proximate to anode corner [40] wherein the flow downwind will be higher velocity if allowed to expand, and assuming isentropic flow. Again, since the plasma sheath flow [7] is not strictly isentropic flow, deviations from this ideal situation will need to be modeled and simulated for optimum performance.

Based on the above, the dual convergent tapered anode and cathode design of FIG. 16A would reduce cross sectional area up to anode tip [42], which may increase axial velocity in trade for increased density and decreased pressure at [42] if under pseudo-isentropic flow up to the formation of Mach Disk equal to the speed of sound (which is not entirely the case given the Lorentz force acceleration of the plasma sheath). This arrangement would therefore favor use with emphasis on said first contribution to the pinch which is nearly pure radial collapse compression. The curved cathode nozzle [812] then serves mostly to optimally feed the current filaments, by minimizing current path distance and by enforcing plasma boundary conditions to orient the filaments to advantage, in the most advantageous manner to maintain and maximize the current particularly at the terminus just before the pinch. Note that since the current through the plasma sheath applies the Lorentz force continually throughout the operation of the device, the actual flow is almost assuredly guaranteed to not be purely isentropic which would incur variations to the design just stated.

Figure 16B:
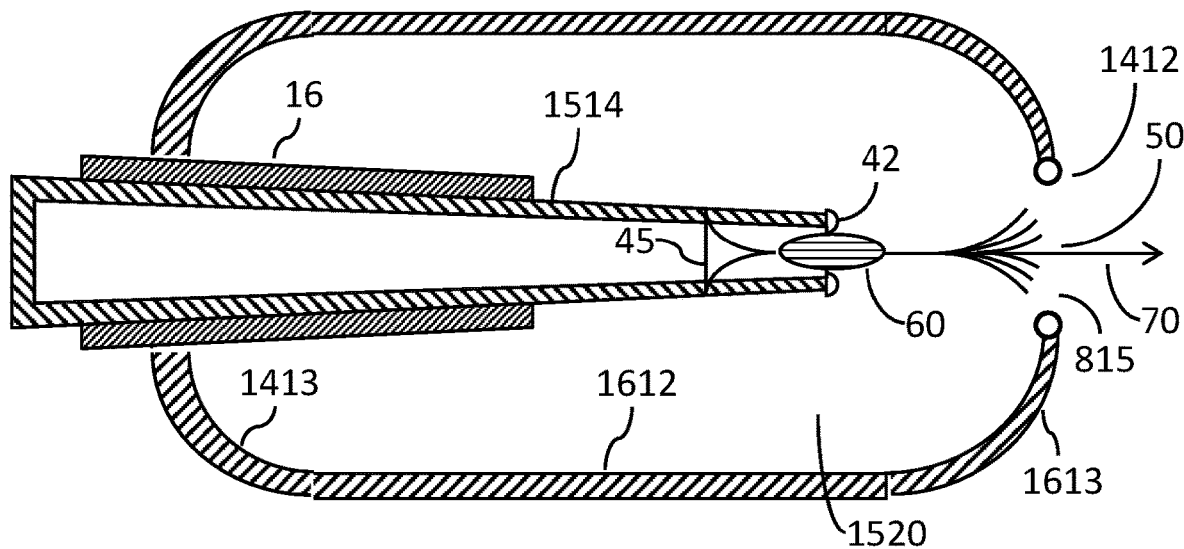
FIG. 16B is a cross section illustration of a DPF embodiment showing an inward tapered hollow anode and an un-tapered (or potentially outwardly tapered) cathode with extended cathode length and an end cap to direct the plasma sheath inward, with an increase in cross sectional area to decrease supersonic velocity but increase pressure and density, and with a desired ratio of cathode and anode radii to optimize inductance and/or DPF performance.

FIG. 16B shows a complimentary design with a convergent tapered anode [1514] and a straight cathode [1612] (which could optionally be divergent) which results in an increasing cross sectional area up to anode tip [42], which would increase axial velocity in trade for decreased density and pressure at [42] if under isentropic flow. This arrangement would therefore favor use with said second contribution to the pinch which relates to radial collision compression versus radial collapse compression. The curved cathode nozzle [1613] then serves mostly to redirect the flow towards and becoming parallel to the Z-axis so as to direct a substantial fraction of the entire plasma sheath into a lengthy pinch along and onto the Z-axis. To the extent that cathode nozzle [1613] can be made to also enlarge the cross sectional area during the turn inwards towards the Z-Axis, the flow is isentropic. But again since the current through the plasma sheath applies the Lorentz force continually throughout the operation of the device, the actual flow is almost assuredly guaranteed to not be purely isentropic which would incur variations to the design just stated.

It should be noted that shocks are not normally isentropic except in cases like when the flow is diverted while also expanding its cross sectional area. Such could be the case in the second instance of FIG. 16B discussed above with increasing cross sectional area while also diverting the flow towards the Z-Axis in order to instantiate a pinch of the said second contribution kind. Without this design teaching, the flow becomes more non-isentropic, with more complex design, modeling and simulation requirements. Note that in general, the flow inside the DPF is likely non-isentropic most of the time because of the continual application of the Lorentz force during operation which is effectively adding energy (and heat) to the system. Therefore any properly designed DPF will require detailed plasma, MHD and supersonic/hypersonic modeling to design the flow ducts and nozzles properly for the type of pinch contributions desired. In such embodiments, an electrode—such as for examples [112] or [1612]—would serve for example as a feature that supports and optimizes a plasma sheath supersonic flow and could comprise a subsonic duct. Additionally or alternatively, in some embodiments at least one electrode—such as for examples [14], [112], [1512], or [1514]—would serve for example as a feature that supports and optimizes a plasma sheath supersonic flow and could comprise at least one convergent or divergent (or both) conical outer or inner (or both) electrode of a DPF, selected to optimize supersonic flow of a plasma sheath for a device for given system requirements and device design parameters. Additionally or alternatively, in some embodiments, such an at least one electrode could further comprise axially curved bodies of revolution instantiating optimized supersonic flow channels for a plasma sheath for a device for given system requirements and device design parameters.

Figure 16C:
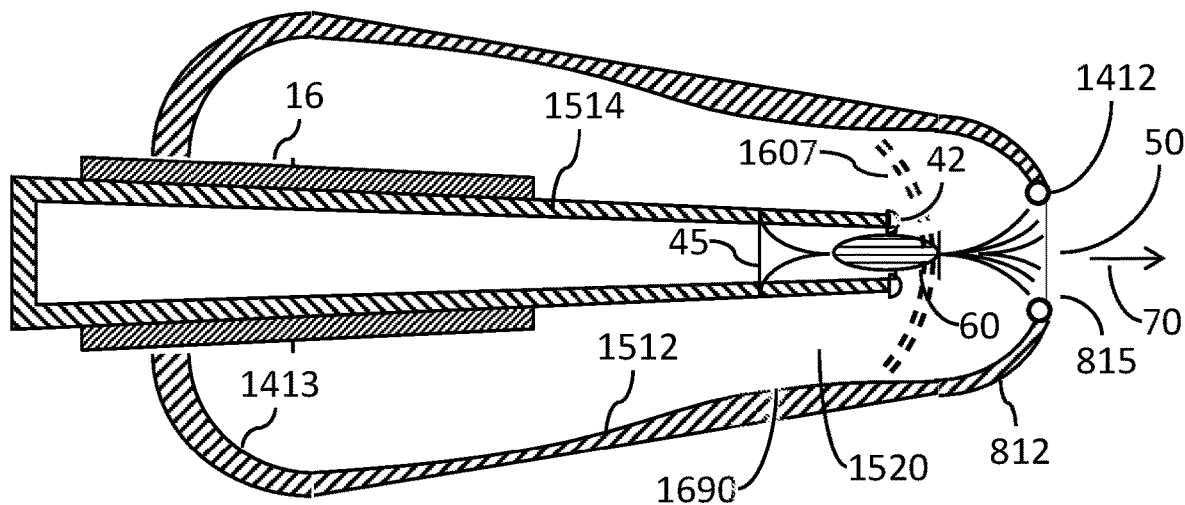
FIG. 16C is a cross section illustration of a DPF embodiment showing a curved inward tapered cathode with extended cathode length and an end cap to direct the plasma sheath inward, an inward tapered hollow anode which could also be curved, said outer (cathode) and inner (anode) electrodes defining a suitably curved supersonic duct that optimizes supersonic flow and with a reduction in cross sectional area that increases the plasma sheath speed to supersonic velocity with a Mach Disk placed where desired by the taper design, and with a desired ratio of cathode and anode radii to optimize inductance and/or DPF performance.

An optimized DPF may then comprise a shape [1690] given also by supersonic flow considerations, and in particular the DPF will comprise a body of revolution resembling a rocket engine's De Laval style nozzle as illustrated in FIG. 16C. Note that the exact shape may not be exactly the contour of a De Lavel nozzle which is an example approximately optimum nozzle for strict isentropic flow, whereas the continual application of electric current to the plasma sheath and the associated magnetic field and Lorentz force comprise a non-isentropic system. However, the optimized DPF shape may be approximated by a De Laval nozzle. Using a supersonic contour, optimized for the first pinch contribution is likely near optimized when the Mach Disk (M=1) of the accelerating and contracting plasma sheath flow, which also corresponds to the point of Choked Flow, is arranged to reside near the edge of the anode [40]. The Mach Disk, comprising a high density of sonic hot plasma provides an ideal source for radial collapse and compression. Conversely, using a supersonic contour optimized for the second pinch contribution is likely near optimized when the Mach Disk (M=1) of the accelerating and contracting plasma sheath flow, which also corresponds to the point of Choked Flow occurs before the end of anode [40], and the contour provides for an expansion thereafter. This results in operation much like a rocket engine with a plasma sheath velocity Mach>1, i.e. supersonic, which provides higher kinetic energy to the plasma sheath to promote the second pinch contribution via higher velocity. Both the first and second pinch contributions may be coordinated to operate together with a contour which places the Mach disc at a compromise position between the above two extremes.

Returning to the striking of the plasma discharge over insulator [16] upon application of high voltage across anode [14] and cathode [12], it has been observed that the optimum energy density in the pinch is achieved by adjusting the length of the insulator [16]. This may be alternatively expressed as increasing or decreasing the distance that the initial plasma arc must bridge across an axial length of the inductor. This in turn determines the length of the initial plasma arc, as well as the time it takes for the initial arc to lift off the insulator [16], circumnavigate the corner of the base of the cathode ([717] or [1413] in the drawings), accelerate up the rods and tines [112] and then finally become level (substantially perpendicular to the Z-Axis) at some point with the plasma sheath contact point on the anode [14].

Figure 17:
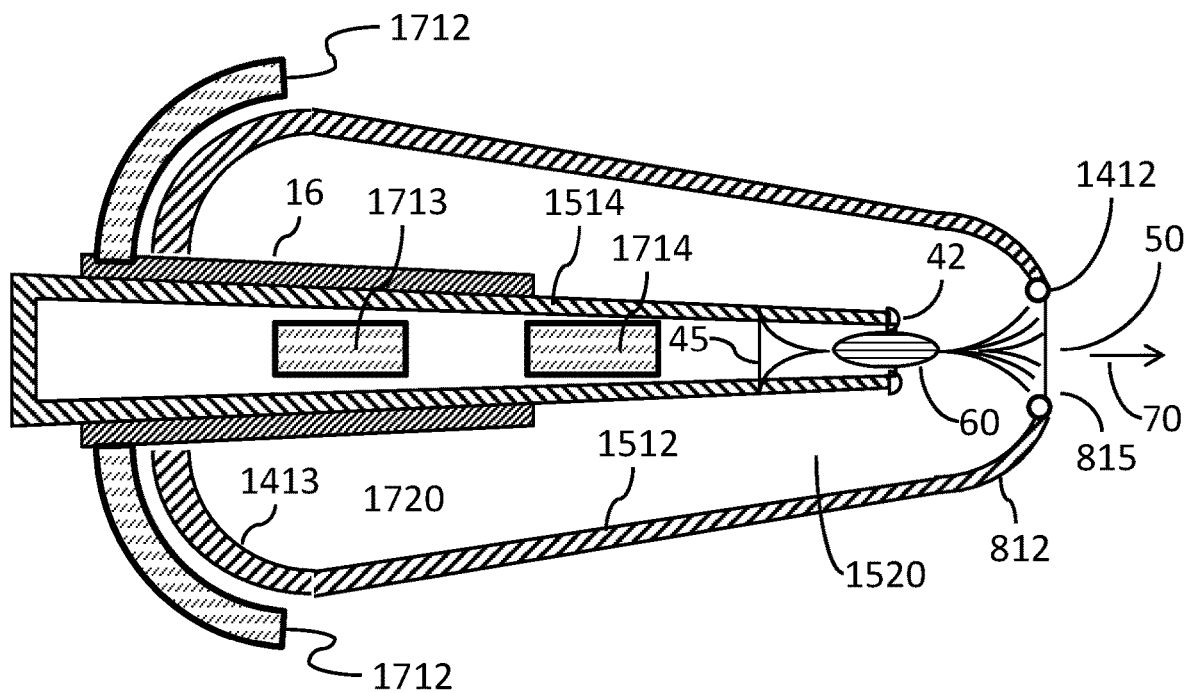
FIG. 17 is a cross section illustration of a DPF embodiment showing the placement of magnets to increase the speed of the plasma contact point on the cathode and decrease the speed of the plasma contact point on the anode via the magnetic field and its local Lorentz force applied to the Plasma sheath proximate to the magnets.

Rather than adjusting the length of the insulator [16] to tune the DPF for objective performance, an alternative method shown in FIG. 17 is to add magnets, either electromagnets or permanent magnets [1712] to the outer side of base [717] or [1413], or to the lower portion of the rods and tines [112]. In all cases the magnetic field lines of these additional magnets are chosen to substantially add to and reinforce the natural azimuthal magnetic field inside the DPF plasma arc current loop, thereby strengthening the magnetic field on the inside of the cathode [12] near base [117] or [1413], which is along the longest initial path of the cathode filament after initiation, and thereby increasing the resultant Lorentz force and hence speed of the contact point of the filament on the cathode in order to make said contact point become rapidly level with the contact point on the anode started earlier on the down stream side of the insulator the axial dimension than without said magnets. This thereby provides a means to tune for optimum performance independent of just the insulator length, and even offers the possibility of dynamically tuning the operating point of the DPF if said magnets are electromagnets. If the magnets are selected to be Electromagnets, they would likely be shaped to provide the most optimum magnetic field contribution inside the DPF cathode volume near the base [717] or [1413] as shown. If the magnets were of the permanent magnet type, they would likely be of Halbach design to provide a uniform additional magnetic field inside the cathode volume near the base [717] or [1413]. A set of simple magnets with less optimum contouring or design could prove sufficient in certain cases. In such an embodiment, magnets [1712] could serve for example as a feature that improves a plasma sheath liftoff and could comprise a magnet exterior to or substantially conformal to a bottom back end of a DPF with magnetic field selected to help steer a lifting plasma sheath off an insulator and into a main DPF channel. Specific magnet and associated field geometry again require detailed MHD, fluid and electrodynamic modeling and simulation for particular optimization against a set of requirements.

Whereas the magnets [1712] increase the azimuthal magnetic field induced by the plasma sheath current, which then increases its Loretz force, thence speeding of the cathode contact point towards a level plane with the anode contact point, another at least one magnet [1713] could be placed inside of the anode [14] or [1514] near the center of the insulator [16] and designed and aligned to increase the azimuthal magnetic field to help lift the new arc off the insulator and help launch it quickly. In such an embodiment, magnets [1713] would serve for example as a feature that improves a plasma sheath liftoff and could comprise a magnet interior to or substantially conformal to an inner electrode of a DPF and proximate to an insulator with azimuthal magnetic field selected to help lift a new arc off an insulator and help launch a new arc quickly.

In a similar manner, magnets could be placed inside the anode [14] or [1514] further along the anode near the anode arc contact point at [1714] to counter, subtract from, or weaken the induced azimuthal magnetic field in the vicinity of the anode contact point [1714] near the insulator [16]. This then would slow the plasma sheath contact point on the anode from migrating as fast up the anode near the exposure of the anode from the Insulator, thereby giving the plasma sheath contact point on the cathode time to catch up with it to form a level arc across the anode and cathode. In this way too, the plasma sheath shape and arrival time may be modified electrically or statically by the addition of or control of said electric or non-electric magnets. In some embodiments, an anode contact point [1714] could serve for example as a feature that directs a plasma sheath in a more radially inward direction near a terminus and could comprise a magnet within or conformal to an inner electrode—the field of which could be selected to counter, subtract from, or weaken the induced azimuthal magnetic field in a vicinity of an anode contact point—in order to optimize a plasma sheath cant angle. Additionally or alternatively, in some embodiments, an anode contact point [1714] could serve for example as a feature that directs a plasma sheath in a more radially inward direction near a terminus and could comprise a magnetic external to or integral to an outer electrode to strengthen and shape an azimuthal magnetic field from optimum or desired plasma sheath flow.

Figure 18:
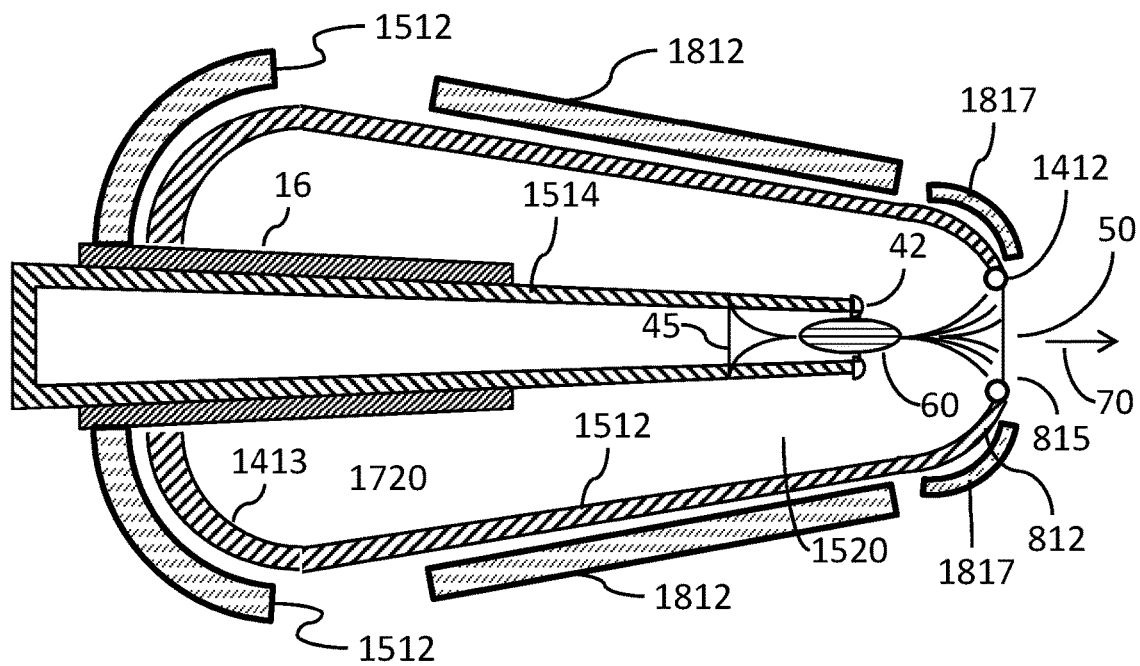
FIG. 18 is a cross section illustration of a DPF embodiment showing the placement of other magnets to increase the speed of the plasma sheath contact point of the cathode and its cap, as well as induce angular momentum to the plasma.

FIG. 18 also shows that either electromagnets or permanent magnets, the latter likely of the Halbach type, may be employed to both the outside [1812] of the cathode [12] or [1512], to strengthen and shape the azimuthal magnetic fields between the cathode [12] or [1512], and the anode [1514] if its tip [42] is between [1720] and [1520]. Additionally magnets [1817] may be added outside the cathode's capped end tip [812] to likewise strengthen and shape the azimuthal magnetic field between the cathode capped end [812] and the anode [1514], optionally with its rounded or contoured tip [42], to help accelerate and guide the plasma sheath to the pinch point [50] most optimally. This enhancement with magnets has significant potential to provide a pronounced improvement to the DPF performance both by accelerating the plasma just before the pinch, but also by directing the plasma for optimum pinch in the tip volume under [812]. In some embodiments, an electrode—such as for example [1514]—would serve for example as a feature that supports and optimizes a plasma sheath supersonic flow and could comprise a transonic duct. Additionally or alternatively, in some embodiments, an electrode would serve for example as a feature that supports and optimizes a plasma sheath supersonic flow and could comprise a supersonic duct. In some embodiments, magnets [1812] applied at an outside of a cathode [12] would serve for example as a feature that directs a plasma sheath in a more radially inward direction near a terminus and could comprise a magnet external to or integral to an end cap tip of an outer electrode, the field of which could be selected to help accelerate and guide a plasma sheath to a pinch point most optimally. Additionally or alternatively, magnets [1812] applied at an outside of a cathode [12] would serve for example as a feature that directs a plasma sheath in a more radially inward direction near a terminus and could comprise a magnet external to or integral to an outer electrode, the field of which could be selected to strengthen and shape an azimuthal magnetic field for optimum or desired plasma sheath flow.

It should be noted that this scheme of reinforcing (or degrading) the azimuthal magnetic field strength can also be implemented with the addition of magnets (again either electromagnetic or permanent) inside the anode. This likely would employ magnets to retard the plasma advancement near the anode-Insulator junction near [1714] of FIG. 17, since the plasma contact point on the cathode has invariably a longer distance to traverse. For this reason, anode hosted magnets may be less attractive since they are not adding energy to the plasma pinch as a whole, whereas the cathode based magnets are.

The net objective of the DPF improvements above are to further concentrate the plasma at the pinch [50]. Using the teachings above, with an optimized shaping and tapering of the cathode and anode electrodes, as well as the addition of specifically designed rods and tines, as well as properly placed, aligned and designed magnets, the plasma is inhibited from escaping radially through the rods and tines at the base of the cathode near station [1720], it is accelerated and further concentrated by converging magnetic fields as it propagates up the DPF device past station [1520], is then similarly restrained from escaping and further concentrated by the curved semi-toroidal annulus conducting cathode shell [812], resulting in a substantially imploding conical or cylindrical shell of plasma collapsing at the pinch [50]. By the improved virtues of the invention, this plasma pinch is expected to be of higher density, more energetic, and geometrically more tightly focused and directed resulting in notably higher pinch mass density, higher pinch energy density, and a corresponding longer total pinching duration, all of which will contributed to higher performance of the DPF for producing Fusion as well as the other applications of the DPF.

An indication of how large this improvement could be can be inferred by noting that the direction of a majority of the circumferentially disposed plasma arc at [39] in FIG. 1 for a conventional DPF is directed away from the pinch [50] outwards (towards the right in FIG. 1) and escapes into the surrounding environment loosing with it both the energy and mass that was invested in its creation and acceleration, as well as losing its potential for contributing to higher plasma densities and energies in the pinch [50]. By employing the teachings of the invention, this plasma, or at least some non-trivial fraction of it, is now not lost, and further, it is directed with concentrating focus and additional terminal velocity and force into the pinch [50], thereby enhancing the performance of the DPF device in a direct and significant manner.

Figure 19A:
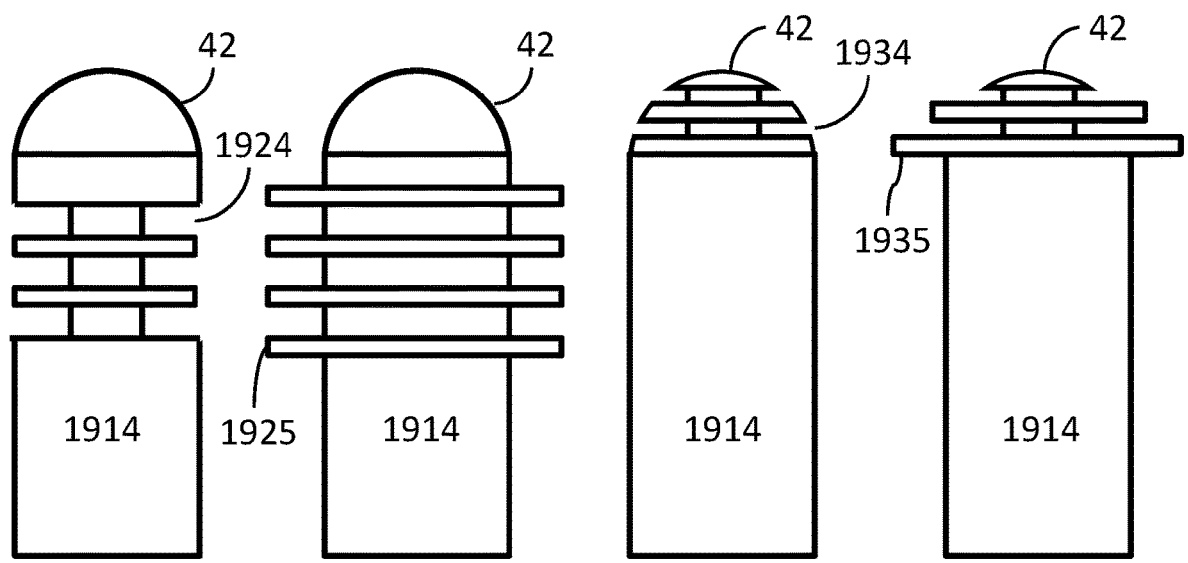
FIG. 19A depicts cross sectional illustrations of DPF anode embodiments showing the application of ridges and groves to the anode tip and possibly cathode to add inductance.

Although the above improvement embodiments will likely provide most of the sought after improvement in DPF performance, other improvements can be applied to further improve performance and also to add robustness and consistency to that performance. A first improvement is illustrated in FIG. 19A, wherein circumferential grooves [1924] are milled into the outer surface of the shaft of solid anode [1914], which is a particular embodiment of general anode [14] or hollow anode [1514], or alternatively annular ring ridges [1925] are employed in a similar manner, either one of which is used to increase the local inductance on the anode. The grooves or ridges should have separation sufficient to ensure the arc does not simply short across the grooves or from tip to tip of the ridges. Both the grooves and ridges may have their corners rounded and filleted to reduce corner field discontinues and field concentrations. Although FIG. 19A illustrates a solid anode [1914] the grooves [1924 or ridges [1925] are equally applicable to hollow anodes, and most any pseudo cylindrical or tubular anode. These structures could also be applied to the cathode if a reason arose to increase inductance in the cathode, or they could be useful for suppressing the aforementioned chuffing of ionized gas past the plasma sheath that happens most often on the cathode. Similar statements apply if the polarity of the electrodes is reversed with suitable adjustment for the polarity.

The groove or ridge geometry operates similar to a corrugated quarter wave high impedance ground plane/ surface (similar to those used in some GPS antennae), delaying and impeding the flow of current across it in the axial direction by its longer conductive path length to the current, which is paramount to adding inductance (in this context, just adding a propagation delay to the current is also equivalent to adding inductance as well as a corresponding delay). This delay and inductance increase serves to slow down the axial progress of the plasma sheath contact point on the anode which aides in pivoting the arc around the tip of the anode and through the curve of the cathode end radius [812]. Such a corrugated structure can also be applied to either the body of the anode [14] or [1514] or the tip [42] of the anode [1914] in order to manage both the plasma sheath [7] contact point on the anode, as well as the inductance of the system as a function of the axial station of the contact point on the anode. Annular grooves in [1934] and annular ridges as shown in [1935] again function to a same or similar purpose but the timing of their influence would be later in the plasma sheath progression timeline.

Note that although the grooves [1924] and [1934] and ridges [1925] and [1935] are illustrated for a solid anode, they apply equally to a hollow anode or most any type of anode. Additionally, in the case of a hollow anode, either grooves or ridges may also be employed on the inside edge (not shown) of the tip [42] or on the inside (not shown) of the hollow tube in an anode such as [1514], predicated on detailed electromagnetic simulation indicating the need for a delay and added inductance in the phase of operation when the current and arc contact point reaches said grooves or ridges.

Figure 19B:
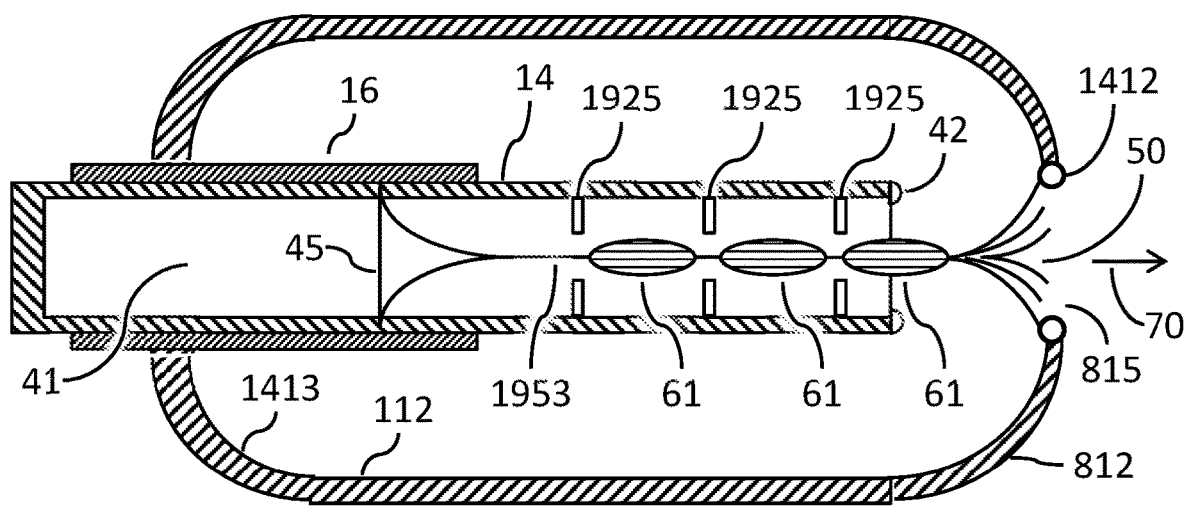
FIG. 19B is a cross section illustration of a DPF embodiment showing the placement of ridges inside the hollow anode tube to excite and induce the formation of plasma instabilities with higher reaction rates.

An intriguing aspect of the invention is the employment of said grooves [1924] or [1934] and ridges [1925] or [1935] in one or more locations on the anode, and/or possibly the cathode, to induce instabilities in the plasma through a sharp change in radial current profile on the surface of said anode or cathode, which in turn would cause a sharp change (most likely a pinch) in the annular magnetic field. This applies most specifically to the hollow anode embodiment but could be applied much more generally. By example with a hollow electrode, experiments have shown the pinch to collapse into a singular axial filament [1953] as shown in FIG. 19B propagating into the coaxial hole [41] of the anode in an opposite direction (towards the left and towards cathode base [17]) after the plasma sheath has rounded the anode tip [42] and collapsed into a pinch. Additionally, high levels of neutron generation have been observed in discontinuities [61] along said axial filament, said discontinuities having been identified as various plasma instabilities to include but not limited to the m=0 "Sausage" instability, the m=1 "Kink" instability and the Plasmoid instability among potentially others. Although these instabilities (by virtue of being "instabilities") will typically form on their own, it may be found advantageous to induce or stimulate the instabilities on purpose and in specific ways and at specific stations along the axis in order to purposely form them in the most energetic manner for Fusion reactions.

For example, the m=0 sausage instability is thought to be responsible for much high energy ion production in DPFs. The instability has a certain natural length and a certain set of conditions most conducive to producing the instability which will accelerate the ions of interest given by MHD of the plasma properties. By judicious placement of a ridge or groove (or both) [1925] together with design of the ridge or groove (height and width and periodicity if multiple) this structure can be used to induce the m=0 sausage instability [61] at most optimum positions in the axial filament to maximize the instabilities and the resultant production of said accelerated ions. Other such instabilities might be coerced to manifest with desirable DPF performance properties using ridges and grooves or other simple shapes such as rings, or discrete bumps, or helices or axial vs annular ridges and grooves, etc. Essentially the detailed specific embodiments are numerous and would generally follow similar principles as developed for electron tube amplifiers (TWT, Klystron, etc.) albeit for a different purpose of inciting instabilities which is usually the opposite of design goals for electron tube devices. In such embodiments, any ridges or grooves—for example ridges and grooves [1924], [1925], [1934], and [1935]—would serve as features that reduce anomalous resistance and reduce an increase of inductance and could comprise at least one circumferential ridge or groove disposed on or into at least one electrode facing a plasma sheath, located on at least one electrode and selected in design to manage an anomalous resistance and inductance to desired levels and in time.

Although the majority of the invention disclosed to this point applies equally well to either solid or hollow anodes [14], solid and hollow anodes will have some differences both in operation and for applications. In general, solid anodes are more often used for materials processing applications and hollow anodes are more often used for neutron generation and associated Fusion research. Whether to use solid or hollow anodes is a choice made by selecting the best option for specific DPF applications and associated performance metrics computed from detailed electromagnetic plasma simulation codes.

In regards to all anodes and cathodes, it is well known that higher frequency alternating currents (AC) travel on the surface of conductors within what is known as the Skin Depth of conductors. Transient signals also tend to flow on the surface of conductors. The impulsive application of high voltage power to the DPF certainly would appear to qualify as a transient signal. However, transient is only defined within the context of the dimensions of the device being considered (here the DPF) and perhaps the speed of light and its transit time across the device. Within that context, it is not inconceivable that at least some of the current applied to the DPF terminals may not choose to obey the skin depth rule, and might conduct in a Direct Current (DC) modality through the DPF device components. This would be of fairly small concern regarding the outer electrode (usually cathode), since the cathode is thin by comparison with its height or total spanned width, and the currents would have no recourse but to flow down the cylindrical shell of the DPF outer electrode, be that within the outer electrode metal proper or on its surface particularly since the plasma sheath contact point only ever goes one way (up to the end of the device). The same can be said for the center electrode (anode) if it is solid. In this way then, there is little ambiguity of the direction and circuit path taken by the current that flows through the plasma sheath.

Figure 19C:
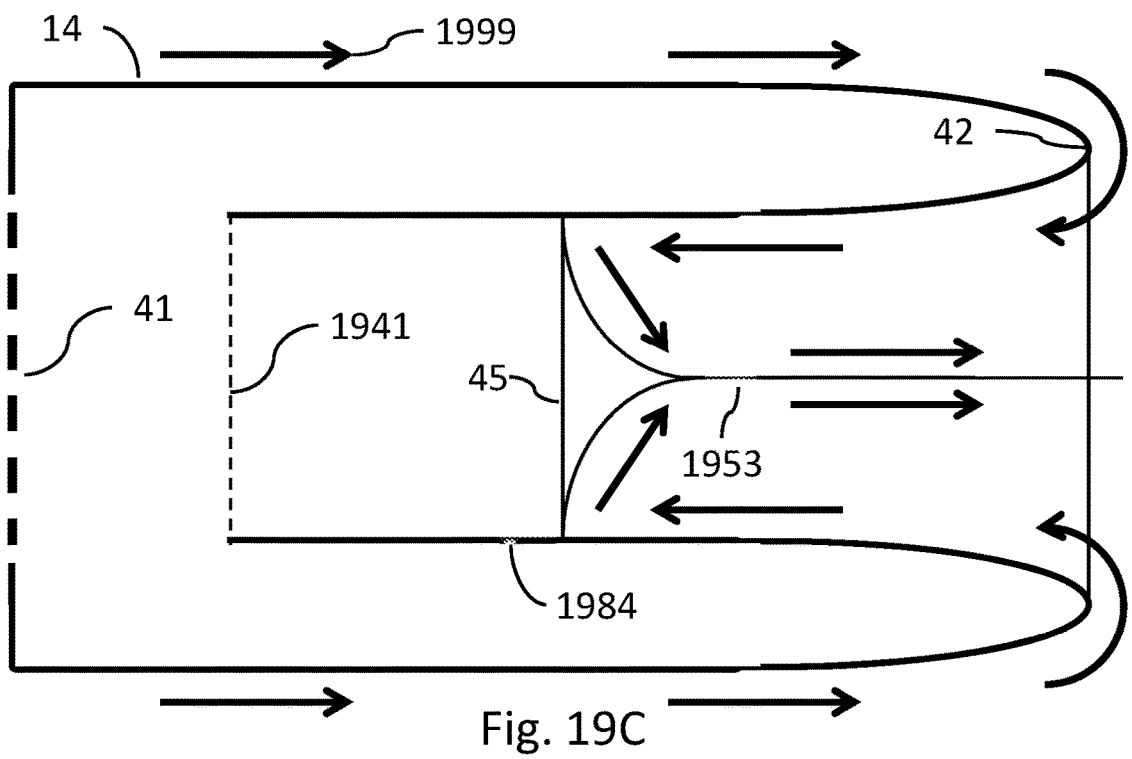
FIG. 19C is a cross section illustration of a DPF embodiment showing a preferred shell construction of the anode to guarantee that currents flow only on the surface and always in the direction sought.

However, if the anode is not solid, but has a hole tube [41], then the plasma sheath could round the tip of the anode and migrate into the hole as was shown in FIG. 19C (and others) with plasma sheath contact point [45] inside of hole tube within the sides of the hole tube [1984] and with direction of movement towards the base [17] of the device inside of that hole tube. But in this case it may not be guaranteed that all of the current flows along the inside surface [1984] of hole tube [41] up to the tip at [42] and then along the outside surface of the center (usually anode) electrode [14]. In a solid anode, the current could take a path through the inside of hole tube [41] to the bottom side in order to meet up with the power supply connection at the base of the center electrode, and in so doing still be an AC skin current. Or, the current (or a part of it) could potentially short through the conductor material to the power supply connection at the base of the center electrode. In either case, current would have avoided taking the desired long path of up the hole tube [41], around the tip [42] and down the outside of the center electrode [14], which is the path needed to keep the compressive B field in place to drive the plasma sheath as desired down the middle of the hole tube [41].

Therefore, an improved embodiment is shown in FIG. 19C wherein the inner electrode (usually anode) is hollowed leaving only a shell corresponding to the outer surfaces desired for the conduction of the current. Additionally, the hole tube opening in the base at [41] is not connected to the end of the inner surface of the tube from the tip [42], meaning that it ends at [1941] without any electrical connection to the rest of the electrode or any other electrode except by connection to and with the electrode tip [42]. In this way then, the currents [1999], shown as arrows, are forced to flow on the desired surfaces of the electrode and in the desired paths and in so doing are guaranteed to provide the annular magnetic field that drives the plasma sheath ever deeper into the hole tube [41]. In such an embodiment, then, an inner electrode comprises a thin skin shell corresponding to all exposed electrode surfaces without any filled interior material between any of the shell portions, so as to force current paths to travel only on the electrode shell surface. Note that although FIG. 19C shows the inner tube surface [1984] ending at [1941] before and to the right of [41] in FIG. 19C, the end 1941 may be extended towards the device base (i.e. to the left in FIG. 19C) and through the base as long as it does not create any conductive contact that supports a reverse surface current or a through material current that degrades the intended current flow as indicated by the arrows [1999]. Being able to do this may prove useful for connecting the DPF device to an energy converter, or a gas recycler, or just for diagnostic viewing advantage. This embodiment also prevents potentially undesirable arcs and discharges out the back side of the DPF device towards the later stage of its operation.

In regards to all anodes, a tapered anode such as that shown for [1514] has been demonstrated experimentally to provide superior performance as mentioned earlier. This enhanced performance is due to two complimentary causes. The first cause is due to the taper angle proper which orients the plasma sheath and the associated shocks on each side of the anode more inwards towards each other, producing a slightly more inward collision at the pinch [50]. A more direct collision will increase the pinch pressure, temperature, density and net energy density, which invariably leads to higher net DPF performance.

However, an inward (convergent) tapered solid anode can also be made to result in a smaller effective diameter anode tip [42], which can have the added effect of increasing the electric field at the tip to better repel and accelerate positive ions away from the tip when they are pinched directly in front of said tip. The higher electric field repels the ions axially forward out of the DPF device for a more energetic ion beam emerging axially from the pinch. However, the tip radius also aids in rotating the plasma sheath filaments around the tip to collide in the pinch [50], and so a balance between these two phenomena will provide an optimum radius for the tip. Finding that ideal radius for the many independent parameters definable for a DPF device will once again require a detailed electromagnetic and plasma code. Detailed shaping of the tip cap can also aid in providing some improvement, again, guided by results of detailed electromagnetic and plasma codes.

Unexpectedly, a tip that tapers outward (divergent) has also been shown to provide superior performance in some cases. However, the phenomenology is different and refers back to the prior discussed about said first and second contributions to the pinch. Whereas the inward tapered anode tip benefits from a stronger magnetic field and some inward momentum from the plasma sheath inward velocity, the outward tapered anode tip relies on producing a more pronounced over-expanded condition at the anode edge [40] which enhances the inward velocity from the outset of the radial collapse and compression phase [4]. This highlights the need for the previously mentioned computational simulation codes and analyzing the entire design with all contributing phenomenon.

Figure 20A:
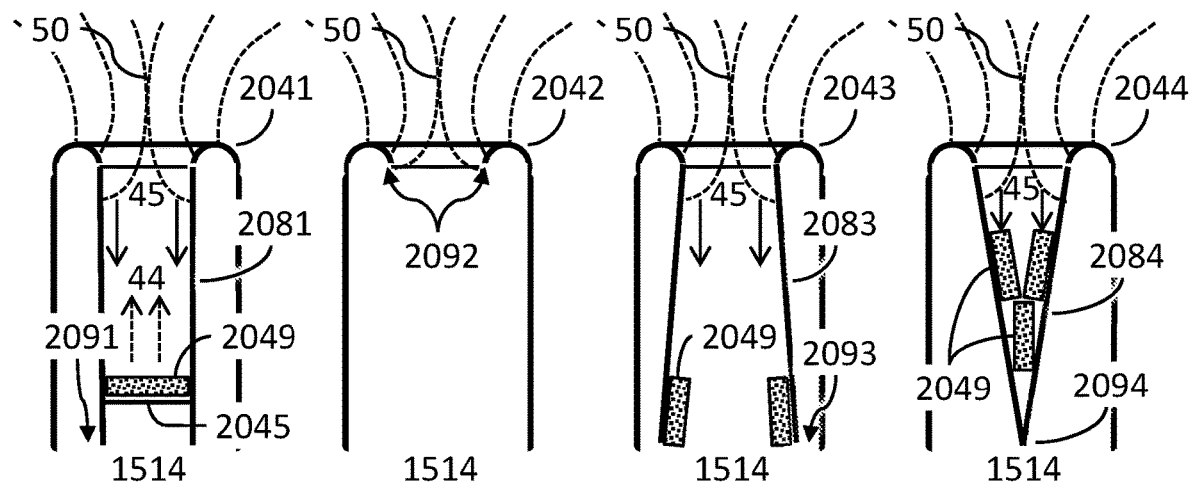
FIG. 20A depicts cross sectional illustrations of DPF anode tips showing preferred embodiments of a hollow anode tip for specific purposes.

In the case of any hollow anode such as [14] or [1514], specific variations of the terminus can provide benefits to the DPF performance depending on the explicit physics occurring in the tip region for a given DPF design, the parameters selection and the objectives of the DPF device. FIG. 20A illustrates some different potential alternative termini of the hollow anode [40] or [1514] along with approximate plasma sheath current filament lines (dashed lines) the use of which depends on the termination performance dictated by detailed electromagnetic and plasma codes and the DPF requirements. Although a hollow anode may have a straight flat cylindrical tip as shown at [40] in FIG. 1, FIG. 20A shows a rounded tip [2041] (also [42] in FIG. 19 for example) which promotes the plasma sheath bending more smoothly and substantially tangentially to the anode surface (as required by electromagnetic and MHD boundary conditions), and into the tube, from which they may continue to propagate inverted down into the inside of the hollow anode tube until well after the pinch has occurred as shown by downward pointing arrows [45], eventually terminating at some point [2091] nominally at or before the end of the inside the anode.

Optionally, the inner hollow tube opening may be terminated at a conductive bottom [2045] located a distance from the tip and/or alternatively a Magram electromagnetic absorber bottom [2049] to increase or reduce reflections [44] respectively if desired to promote better performance. The conductive bottom can be tuned by its depth into the hollow tube to reflect a current pulse [44] back out the hollow anode which could be useful for DPF operation, such as (for example) to promote or reinforce the development of instabilities to increase the Fusion yield, or by helping to sweep the DPF products away after the pinch, or if the pinch is still on-going, may contribute to enhancement of the pinch. Alternatively, the Magram absorber serves to terminate the residual pulse energy to prevent it from producing disturbances that might cause malfeasance in the DPF.

Alternatively, the tip of the anode may truncate at about the end of the curvature [2092] of the rounded tip [2042] such as shown in FIG. 20A which introduces a discrete discontinuity to the currents which may induce them to either stick to the end [2092] or break off from the anode or at least to delay before any subsequent progression jumping to the inside and down the tube inside surface. This too would reflect part of the pulse which may play a role in defining the pinch or its evacuation of gas from the pinch volume thereafter. Such a discontinuity may be conducive to instability formation under proper conditions.

Alternatively, the hollow anode [2043] may employ an enlarging inner diameter taper down into the hollow tube, reducing the resistance to current with a larger contact area and associated higher capacitance during the late period of the pinch. The end of the outward tapered inner hole at [2093] may be made a specific length as described for [2041] that can be tuned for best operation, either ending the tube with an edge like at [2092] or reaching a bottom [2093] like shown for [2091]. The optional Magram absorber [2049] affords the ability to terminate the current pulse with a tapered impedance that absorbs remaining pulse energy and inhibits back reflections that could result in deleterious current reflections.

Another hollow anode [2044] provides an embodiment with a converging tapered hole [2084] also provides the capability to reflect the current pulse at a prescribed distance [2094] into the anode with an associated delay to the conic apex, optionally with magram absorber [2049] to damp the reflected pulse. In the past art, any such conic depressions were typically no deeper than the radius or the diameter of the anode tip. In the present embodiment, the conic hole has a depth [2094] significantly in excess (at least once or twice) of the radius or diameters of the anode tip.

In some embodiments, a hollow anode—for example a hollow anode [2041], [2042], [2043], or [2044]—would serve for example as a feature that reduces anomalous resistance and reduces an increase of inductance and could comprise a substantially tubularly hollow inner electrode end tip with rounded circumferential annular corner and lip symmetric about an axis. In some embodiments, a hollow anode—for example a hollow anode [2042]—would serve for example as a feature that reduces anomalous resistance and reduces an increase of inductance and could comprise an inner electrode end tip with rounded circumferential annular corner and lip discretely transitioning into a cylindrical recess axially symmetric dip on an axis. In some embodiments, a hollow anode—for example a hollow anode [2041], [2042], [2043], or [2044]—could further comprise a substantially cylindrical hollow hole, for example a hole [2081]. In some embodiments a hollow anode—for example a hollow anode [2041], [2042], [2043], or [2044]—could further comprise a substantially convex conic hollow hole, for example a hole [2083]. In some embodiments a hollow anode—for example a hollow anode [2041], [2042], [2043], or [2044]—could further comprise a substantially concave conic hollow hole, for example a hole [2084]

Figure 20B:
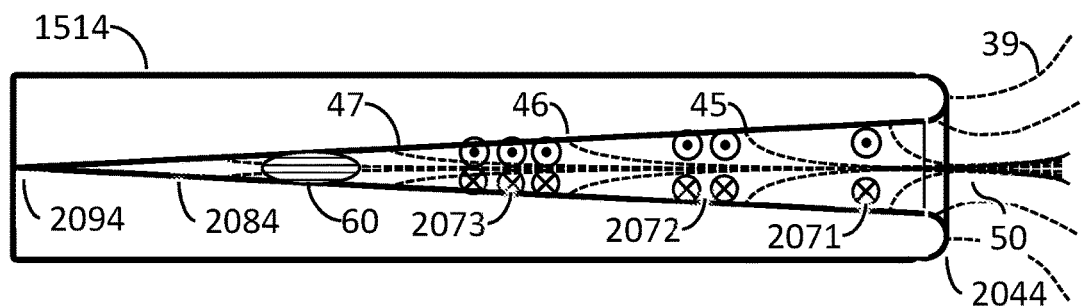
FIG. 20B is a cross section illustration of a DPF hollow anode embodiment showing instantiation of a magnetic mirror within the conic hole of an anode.

Additionally, this conic hole serves another potential very important function when integrated into the total design as illustrated in FIG. 20B, wherein the conical tapered hole [2084] has been axially disposed to its apex [2094] into the anode, which may or may not extend to the end of the anode [1514], or may go through the end of the anode and even leave a hole at apex [2084] through the anode. When the terminating plasma sheath filaments [39] arrive and form the pinch at [50], the currents [45] continue into the tapered anode hole where the magnetic field has collapsed to fit therein at [2071] because of the flow of the currents on the now inside surface of the anode conductor. As the current is still driven by the aforementioned J×B Loretz force into the tapered hole, the current first progress inward to [46], and because the radius of the hole is now smaller, the magnetic fields [2072] are stronger than they were near the opening [2071]. The current continues to progress into the tapered hole [47], with a subsequently smaller radius, again resulting in a subsequently larger magnetic field [2073], and so on and so forth until the current terminates at apex [2094], all the while increasing the magnetic field as the current progresses towards the base of the anode.

The net effect of this design is to create an intense azimuthal magnetic field which due to the J×B Loretz force crushes the now axial plasma filaments substantially radially even after the pinch at [50]. However, as will be appreciated by those skilled in the art of magnetic confinement, the azimuthal magnetic field strength progressively increasing in the direction of the apex [2094] comprises a "magnetic mirror" which serves to entrap and reflect the plasma back along the axis of the anode from which it came. At some point, most likely where the ions coming into the tapered hole meet with ions reflected from the magnetic mirror, the confluence of these two flows will increase the temperature and density of the local ion cloud and form plasma instabilities [60], most ideally one or more plasmoids, of sufficient intensity to promote a higher rate of Fusion. This then becomes a substantially cylindrical, high temperature and high density magnetically constricted reactor for Fusion type reactions until the plasma dissipates. Note that due to the high currents and crushing magnetic fields, the required temperature for Fusion may be obtained, and since the magnetic field pinches the plasma so intensely, the density should be much improved over other means, potentially promoting Fusion reactions. The density is promoted by the fact that gas is also trapped in the end of the tapered hole, so as the plasma sheath collapses onto the axis, it also compresses the trapped gas near the apex [2094] to provide a rich high pressure source of gas molecules for enhanced high pressure/density and larger volume plasmoids. The physical length of this compressed plasma filament is limited only by the length of the anode, which is appreciably longer than the initial pinch, thereby providing a large increase to the reaction volume. The whole transit time for the plasma sheath filament is many times longer than the initial pinch, suggesting an effective confinement time at least an order of magnitude or greater than just the initial pinch. In some embodiments, an apex [2094] or conductive bottom [2045] would serve for example as a feature that enhances reaction-improving instabilities or pinch and could comprise at least one conductive terminus within a substantially tubularly hollow inner electrode and located and selected in design to maximize production of reaction-improving instabilities or pinch. Additionally or alternatively, in some embodiments, an apex [2094] or absorber [2049] would serve for example as a feature that enhances reaction-improving instabilities or pinch and could comprise at least one electrical absorber or terminator within a substantially tubularly hollow inner electrode and located and selected in design to maximize production of reaction-improving instabilities or pinch.

It should be pointed out that as the smaller radius of the apex is approached it provides for a progressively smaller enclosing physical volume and associated smaller surface area within the hole, which will aid in retaining radiated heat and other radiated energy, to keep the plasma hot for as long as possible. Note that although a straight tapered (conic) hole into the anode is shown in FIG. 20B, the dynamics of the physics may dictate another profile for the change of the radius versus depth versus that of a strict linear-linear dependence, such as an annular cusp for example. Also, the tapered hole may have an average slope of either greater or less than that shown, suggesting possibly a more shallow or deeper tapered hole than suggested by FIG. 20B. Again, detailed electrodynamic and plasma physics simulations are needed to define the detailed quantitative parameters of the embodiment tailored to the parameters of the DPF and objectives of the device.

Figure 20C:
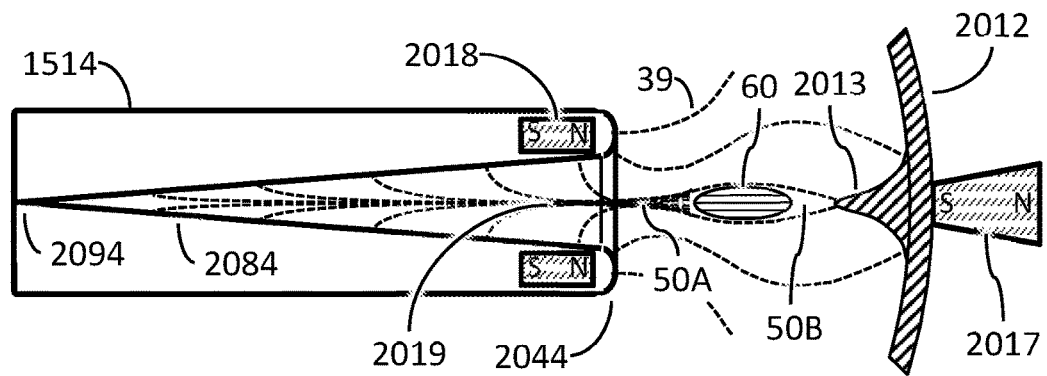
FIG. 20C is a cross section illustration of a DPR anode embodiment showing a magnetic mirror hollow anode with a concentric cathode tip to coerce the plasma sheath to provide two collinear pinches while also better contained axially with coaxial magnetic fields.

FIG. 20C shows a further development of the embodiment of FIG. 20B, wherein the curved cathode cap [812] is extended to substantially cover over the anode tip as shown by [2012], almost or even fully enclosing the anode. The cathode enclosing cap [2012] may optionally have an electrode tip [2013] that permits the plasma sheath [39] near the anode tip to smoothly traverse a contact point on the cathode [2012], across the tip [2013], to a second pinch point [50B] close to the apex of electrode tip [2013]. Through suitable design of the DPF to shape and time the arrival of the plasma sheath in the vicinity of the anode and cathode tips, an inward focused pinch [50B] may be provided. Additionally, said inward focused pinch [50B] may be counterpoised against an outward focused pinch [50A], providing opposed traveling compression regions between them, and thereby providing a significant increase in effective temperature, density, and containment time. In some embodiments, a cathode enclosing cap [2012] could be a converging taper, rolled lip, or end cap and could further comprise a closed end on an axis to inhibit an exit of DPF process products. Additionally or alternatively, an electrode tip [2013] could be a converging taper, rolled lip, or end cap and could further comprise a closed end and an inward and rearward disposed coaxial electrode tip to: help complete a plasma sheath current circuit; reduce inductance and anomalous resistance during a trans pinch period; help form productive instabilities; and provide a plasma pinch from two ends.

FIG. 20C also shows a further means to improve the pinch [50A] and [50B] and their merger into a fully collapsed pinch [50] and the production of instabilities [60], by the introduction of axial magnet [2017] (which may be either a permanent magnet or an electromagnet) or an annular magnet [2018] (also which may be either a permanent magnet or an electromagnet) disposed inside the tip [2044] of the anode [1514] with a hole, or both. As indicated by the North (N) and South (S) Pole designations on magnets [2017] and [2018], the magnetic field provided is substantially axial and most intense on the axis between the vicinity of the anode tip [2044] to the cathode tip [2013]. This causes the ions and electrons in the plasma sheath [39] to orbit the axis, which serves to further heat the plasma and contain it within the pinch. In some embodiments, a converging taper, rolled lip, or end cap—for example a cathode [2012]—could further comprise an on-axis magnet to help shape a plasma sheath trajectory and promote stronger axial pinch.

In fact, this configuration has most of the features of and substantially comprises a Penning Trap. The anode and cathode electrodes may be further shaped to provide a closer approximation to the ideal quadrupole electric field of the ideal Penning Trap, and a close approximation to the ideal transverse magnetic field of the Penning Trap may likewise be realized with suitable modifications to the magnets [2017] and/or [2018]. Even if the result is not perfect, the resultant pseudo-Penning trap will provide additional plasma steering and shaping for the promotion of enhanced pinching and confinement that is not available otherwise.

Note that in this regard, the magnetic field may be made stronger near cathode tip [2013] in order to afford a degree of magnetic mirroring from the converging axial magnetic field lines therefrom, which will enhance pinching at [50B]. Similarly magnet [2018] may be lengthened and potentially also tilted towards the apex [2094] or end of the hole [2091] in the anode [1514] to both provide a field for inducing angular rotation and momentum to the plasma along the axis inside [2084], and also potentially to bring the left most pole of magnet [2018] (the South Pole "S" in FIG. 20C when the magnets are thusly disposed) to the end of the anode or apex [2094], which serves to also expel the magnetic fields at this pole behind the DPF plasma Breakdown [1] or Rundown Phases [2], so as not to disturb the plasma sheath formation or rundown.

In a solid anode embodiment, annular magnet [2018] may be replaced with a singular on-axis magnet quite similar to [2017] but with the same poles orientation as [2018]. This too disposes a substantially homogeneous magnetic field between the anode tip [40] and the cathode apex [2013].

Figure 20D:
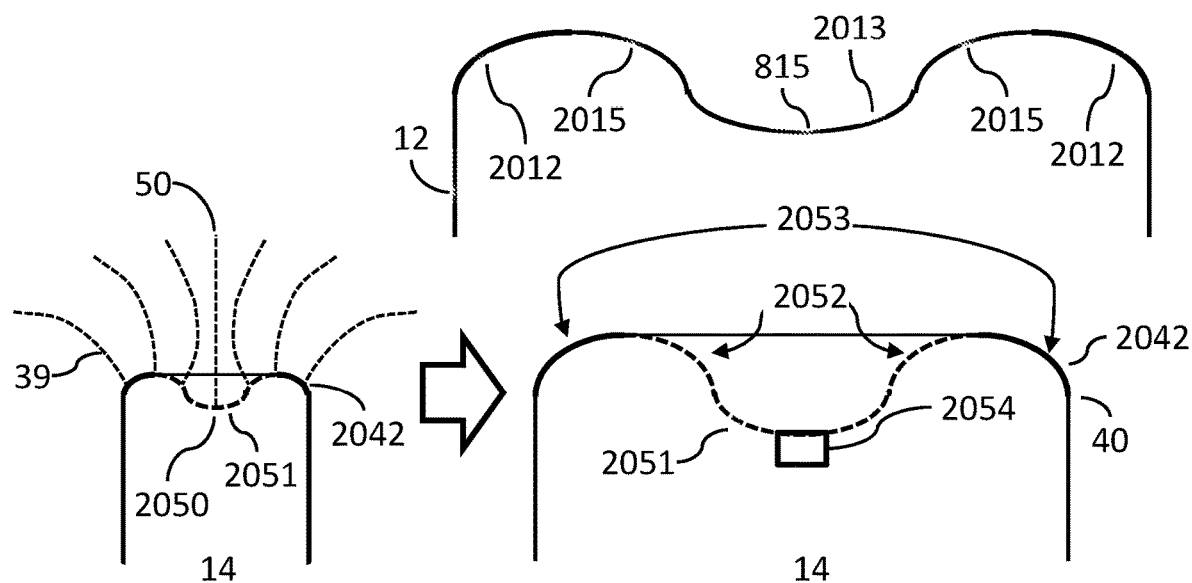
FIG. 20D is a cross section illustration of a DPR anode embodiment showing the curvilinear profile of a solid anode tip to approximately maximize current flow just prior to pinch, and an matching cathode end cap.

The teachings herein can also be applied to a non-hollow solid anode 14 as in FIG. 20D. A persistent observation in the DPF literature is the precipitous drop in current when the plasma sheath reaches the end of the anode at [40] or [42] and starts to execute the pinch [50]. This is undesirable at this point because ideally the start of the actual pinch should ideally correspond with a maximum application of current to power the pinch to maximum energy density. The root cause of this rapid current drop right after completing the Rundown phase [2] has been variously described as due to "anomalous resistance". This term is really just an admission that its source is not known or unproved. However, as is well known in the art of RF transmission line theory and practice, when there is a physical discontinuity in an RF transmission line, it will manifest an associated discontinuous change in impedance. This temporal change in impedance may be witnessed and measured through the technique of time domain reflectometry. As the DPF employs a short pulse, it too replicates and manifests such time dependent impedance, and a physical discontinuity such as the end of an electrode will certainly produce a time dependent impedance discontinuity, which may be measured specifically as an increase in impedance at a time coincident with the arrival of the plasma sheath at the location of the discontinuity.

Without suitable attention to the RF transmission line behavior of the collinear DPF electrodes (specifically, the time dependent impedance down the electric path of the electrodes), the end of the anode will surely manifest an impedance discontinuity and in the standard DPF design this discontinuity will be largely inductive due to the removal of capacitance as the anode pulls physically and rapidly away from the cathode, and said increase in inductance at the end of the Rundown phase [2] has been observed in copious experimental DPF measurements. Therefore, the joint contours of the anode and cathode, must be treated as an RF transmission line even as they transition from the Rundown phase [2] to the Radial Compression and Collapse phase [3], and beyond, or else deleterious reactive impedance discontinuities will reduce the transfer of power into the final pinch, and potentially starve it from desired fruition. This consideration is reflected in the graceful curved design of the cathode end [1412], but an optimized contour of anode [1514] and associated tip such as [2044] must all be contoured together to make the impedance versus time (or distance when the plasma sheath propagates) profile smooth and contiguous to minimize electrical reflections and maximize power transfer to the pinch [50].

Although some of the "anomalous resistance" is really reactive impedance as described above, some is also truly resistive in nature. The increase in actual resistance can come only from an increase in true ohmic losses. One such ohmic loss occurs from the higher resistance presented when the plasma sheath current is geometrically stretched to progressively longer distance between the end of the anode and end of the cathode at the end of the anode and end of the cathode in most DPF designs. Therefore, a good DPF design should strive to keep the arc length of the plasma sheath substantially constant as the plasma sheath travels down the Rundown Phase [2] and likely enforce a shorter arc length near the terminus of [2].

Another ohmic loss can occur where the plasma sheath contacts the anode (and also possibly the cathode) wherein the current cannot retain good electrical contact with the electrode as it is being torqued around the anode tip corner [40] or [42]. This occurs if there are discrete physical discontinuities in the electrode shape or surface such as sharp corners, sharp ridges and sharp grooves. In these cases the plasma sheath must stretch or "jump" such geometrical obstacles, and this causes the effective resistance to increase, and the sheath thickness to decrease, which further increases the resistance. To some extent an impedance discontinuity is unavoidable since at some point the anode must "end". But many DPF designs completely ignore this source of performance degradation and incorporate sharp corners and other discrete discontinuities without much consideration of their potential impedance effects.

A final source of the "anomalous resistance" occurs as the plasma sheath undergoes the Radial Collapse Run-In Phase [4], wherein as the plasma sheath contact point progresses radially inward, its contact point on the anode tip end, being radially symmetric, experiences a progressively smaller and smaller contact area as the radius to the Z-Axis gets smaller and the contact "point" (which is actually an annulus)

circumference gets shorter. Given an anode with even a good conductivity, as the area through which the current must flow gets smaller, so too will the net resistance increase for a given resistivity of the anode material. This decrease in area may be mitigated by geometric modifications to the anode as a function of radius from the Z-Axis.

By way of example, the sloped (conic) rounded annulus surface between [2052] and [2051] in FIG. 20D affords some additional surface area at that radius near to the Z-axis, providing some temporary relief from otherwise continually decreasing contact area as a function of radial position. A suitably designed cusp shaped tip or hole/depression into the anode end, can thereby be expected to enable higher current after the plasma sheath rounds the anode end corner [40] or [42], thereby providing a maximized current to the collapsing plasma sheath for as long as possible before and into the pinch at [50].

A best anode tip design is illustrated in FIG. 20D wherein a smooth curvilinearly contiguous (no discontinuous derivatives in the curves) recess [2050] is centrally disposed at the center on the Z-Axis in the middle of the solid anode [14] end face and corner [40] between rounded annular edge [2042]. By not having any sharp corners, this profile presents no discrete discontinuities to interrupt current flow and therefore provides less additional "anomalous resistance" beyond that manifest in the transmission line impedance characteristics between the anode and cathode conductive shells, and the relatively unavoidable reduction in plasma sheath contact point area.

As shown in FIG. 20D, the smooth tip curvature comprises a concave recess [2050] centrally symmetric about the Z-axis that defines the center of the anode tip end surface. Circumferentially about this circular concave surface [2051] is a convex partial annulus surface [2052] extending to [2053] with its surface normal pointed inward towards the DPF axis, and which joins tangentially to [2051] along its circumference. In turn then too, another convex partial annulus surface [2053] with its surface normal pointed outward away from the DPF axis, and which joins tangentially to [2052] along its inner circumference, and then too tangentially to the anode outer radius surface at [2042] on its outer circumference. In some embodiments, such a tip design would serve for example as a feature that reduces anomalous resistance and reduces an increase of inductance and could comprise an inner electrode end tip with rounded circumferential annular corner and lip conformal to a recessed axially symmetric dip on an axis.

In this manner a "wavy" brane is formed over the end of the anode [14]. This wavy brane serves to provide support to plasma sheath current filaments that are substantially normal to the brane at all points during the radial collapse of the plasma sheath to its conclusion at the pinch [50]. In so doing, the plasma sheath always has better electrical contact to the anode during the entire Radial Collapse and In-Run phase [3], thereby minimizing the aforementioned "anomalous resistance" to keep the current strong as long as possible into the pinch [50]. Additionally, the specific radial dimensions and radii of curvature of the curved brane annular surfaces comprising the tip of [14] are selected with the aid of an accurate electromagnetic and MHD plasma simulation to specifically help direct and guide the geometry of the plasma sheath and filament contact angles (through their boundary conditions on both the conductive cathode and the conductive anode surfaces, being substantially perpendicular to those surfaces), to maximize the pinch geometry for maximum pinch performance. In this way an optimized electrically and mechanically smooth and continuous brane surface contour for the anode tip is provided for best DPF performance.

Although the wavy brane on the anode tip serves to reduce the "anomalous resistance" and improve performance, this improvement is hampered if it is not also supported by concomitant contours on the outer electrode (usually cathode). Consequently, assuming a desire to retain a substantially similar plasma sheath annulus width between the anode and the cathode as the plasma sheath rounds the anode tip at [40 or [42], the outer electrode [12] should mirror a similar ending profile to that of the anode tip as illustrated by [2012], [2015], and [2013] which are contoured to provide substantially similar distances to [2053], [2052], and [2051] respectively, each pair being substantially parallel but offset normally from each other. A similar situation holds for the dips at [2050] in the anode and [815] in the cathode. Note that fine tuning optimization with detailed plasma, electrodynamics and fluid codes will likely modify these precise relations somewhat.

It should be noted that a material [2054] of ones choosing may be embedded into the bottom of the said recess [2051], wherein said material may then participate with the pinch to provide products of interest to the use of the DPF. Said material could be a plug or a coating on the bottom of recess [2051] at [2054], or a material feed like [2055] as described for FIG. 20E subsequently. For example, if said material is deuterated (i.e. enriched with deuterium) or Titrated (i.e. enriched with Tritium) it can serve as a source of Deuterium or Tritium respectively for enhanced Fusion reactions. Alternatively, if said material has a high Z count (number of electrons in the atomic shells) then it could provide copious X-rays from the expected high fluency of electrons accelerated out of the pinch. Or if said material is of a particular compound of interest it could be employed for ion deposition. In any case, said material can be provided at [2054] for a variety of known or future DPF applications.

Figure 20E:
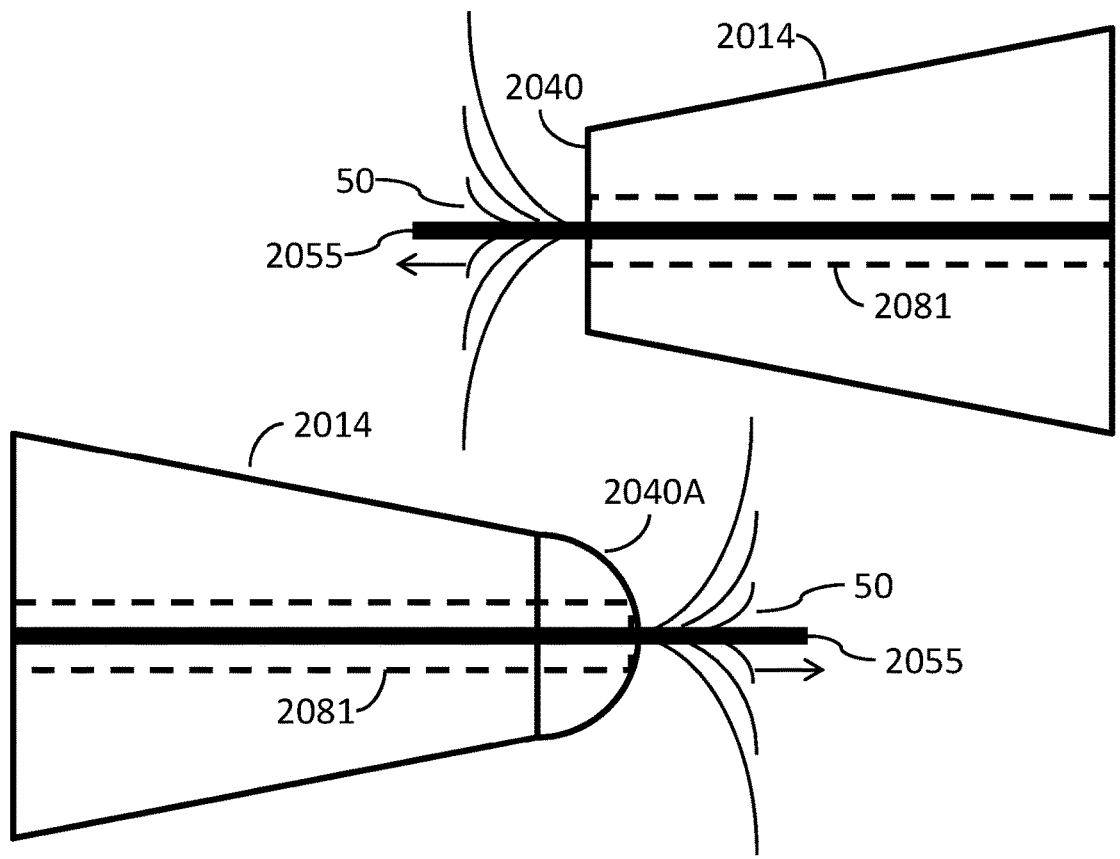
FIG. 20E depicts cross sectional illustration of DPR anode tip embodiments showing means to introduce material into the pinch.

Also due to the potential for noticeably higher pinch performance through the teachings herein, FIG. 20E shows a further refinement of the embodiment that places a small amount of one or more gas, solid or liquid materials [2055] fed or pumped or sprayed or injected through one or more channels [2081] that exit the flat tip [2040] or non-flat (nominally curved or rounded) tip [2041A] of tapered anode [2014], or alternatively the tip of FIG. 20D into the enhanced pinch [50] on the axis. The material (likely in a form or a solid wire or thread, or a high pressure stream of liquid stream or spray or gas) feeds into the device side of the pinch [50] just before the pinch arrives and provides both a reactant as well as a material resistance to the pinch on either axial end of the pinch. The material(s) could be for material deposition, or material processing, or reactive chemistry or it could be Fusion fuel or a damper (backing) to help improve Fusion or other process yields. In such case, it may be protruded minimally so as to only block the device side end of the pinch 50. It could alternatively comprise fission fuel wherein the high pinch environment is used to promote Fission reaction. Or it could comprise a dual Fission and Fusion fuel for a combined thermo-nuclear reaction. This in turn can provide a very localized and controlled generation of Fission products for industrial and medical uses, as well as potentially even for energy production in what would amount to a very safe Fission reactor. A neutron source (not shown) may also be embedded into the tip [2041] or [2041A] of tip of FIG. 20D, or nearby, to help accelerate said Fission reactions. It should be apparent that although FIG. 20E shows the material [2055] fed through the tip and protruding outwards in the direction of the opening of the DPF device in order to engage pinch [50] from the device side, the DPF system may be designed so that the pinch terminates on or very near the surface of the tip at [2041] or [2041A] or at [2054], meaning that material might be slightly recessed into channel [2081] or just barely protruding from it. Similarly, material [2055] might not be fed through the tip [2041] or [2041A] at all, but rather from beyond the anode and fed inward (towards the left in FIG. 1) towards the device, and towards the anode tip [2040] or [2040A] thereby engaging the other (outer, or right side) end of pinch [50]. Finally, material [2055] may be fed both from within the tip [2041] or [2041A] as shown in FIG. 20E outward from the device (to the right in FIG. 1) and also from outside the device inward (towards the left in FIG. 1), thereby bracketing the pinch [50] on both ends with input feedstock. In this arrangement, although the material on each end of the pinch [50] may be the same or may be different, as there is no physical reason for the materials fed into the pinch [50] on each end to be required to be the same, and particularly some materials applications may find favor with such a dual material feedstock arrangement. In some embodiments, a hole—for example a hole [2081]—would serve for example as a feature that positions, feeds, or retains material to be processed and could comprise an axial feed hole transiting an axis from a bottom of an inner electrode to a top of an inner electrode. Additionally or alternatively, in some embodiments, a hole—for example a hole [2081]— would serve for example as a feature that positions, feeds, or retains material to be processed and could comprise a force fed feed stock fed at a prescribed feed rate through an axial feed hole transiting an axis from a bottom of an inner electrode to a top of an inner electrode. Additionally or alternatively, in some embodiments, a hole—for example a hole [2081]—would serve for example as a feature that positions, feeds, or retains material to be processed and could comprise an inner electrode with either a flat or rounded end tip.

In a variety of embodiments, which may for example incorporate any elements or features of the Rundown Phase [2], such features would serve for example as features that support and optimize a plasma sheath supersonic flow and that control shocks. At this point some more divergent but highly beneficial embodiments are disclosed, recalling that every improvement in one part of the DPF operation almost inevitably leads to improved DPF performance. Prior art devices have the discharge [6] in the DPF during the Breakdown Phase [1] in the axial oriented direction across the surface of tubular Insulator [16] and/or the insulator [16] collinear with the anode [14] in the first place.

The prior art DPF configuration incurs detriments and inefficiencies to its ideal and preferred operation when thusly configured and operated, many of which have been mentioned hereto, leading to less performance or at least additional constraints which limit design options for obtaining a given better performance. First, the initiated discharge [6] must lift off the insulator surface of the inductor [16] and rotate a full 90 degrees to retain contact with the cathode. After this rotation, it is usually assumed (in the Lee code for example) that the plasma sheath [7] is subsequently perpendicular to the Z-Axis of the DPF rather than parallel to it, as it is at lift off, so as to propagate down the axis. However, this is seldom (if ever?) the case in actual operation of a traditional DPF. The aforementioned 90 degree rotation is awkward in that it does not contribute optimally to the axial acceleration of the plasma, and it also induces a radially dependent increasing delay, or alternatively a reduced axial velocity, in the outer radial portions of the plasma sheath. This acutely bows the plasma sheath into a convex cone such that the cathode contact point is appreciably axially behind the anode contact point as shown by [7] in FIG. 1. This slanted plasma sheath plows as much, if not more, gas radially outward than forward, through the gaps in the cathode rods or tines [112], significantly reducing the efficiency of the DPF for its intended purpose of providing ample high velocity and high density gas for the pinch. This invariably also leads to a plasma sheath or filament incidence angle opposite from best preferred convergent angle leading into the pinch [50], and instead directs the sheath away from desired convergent angles.

This rotation is also a major contributor to the plasma leakage which escapes out the sides of the device between the rods or tines [112]. This leakage is driven at least in part by the radially outward J×B Loretz force experienced by the plasma sheath during lift off from Insulator [16], and then too by the outward 90 degree rotation of the plasma sheath cathode contact point and thereafter by the fact that the plasma sheath bent in a concave code shape versus the preferred flat disk washer shape perpendicular to the anode. Consequently, other than construction convenience, there are multiple detractors to this particular design and arrangement for initiation of the plasma sheath. About the only advantageous attribute is perhaps that the literature makes mention of reduced insulator erosion from acute angle exposure to the plasma sheath radiation when accelerating up the DPF device electrodes, and the co-axial orientation helps to shield the Insulator from such radiation. However, modern Insulators are potentially more resilient to such erosion and so it's not clear if this is a significant driving design consideration any more, if it ever really was.

Figure 21:
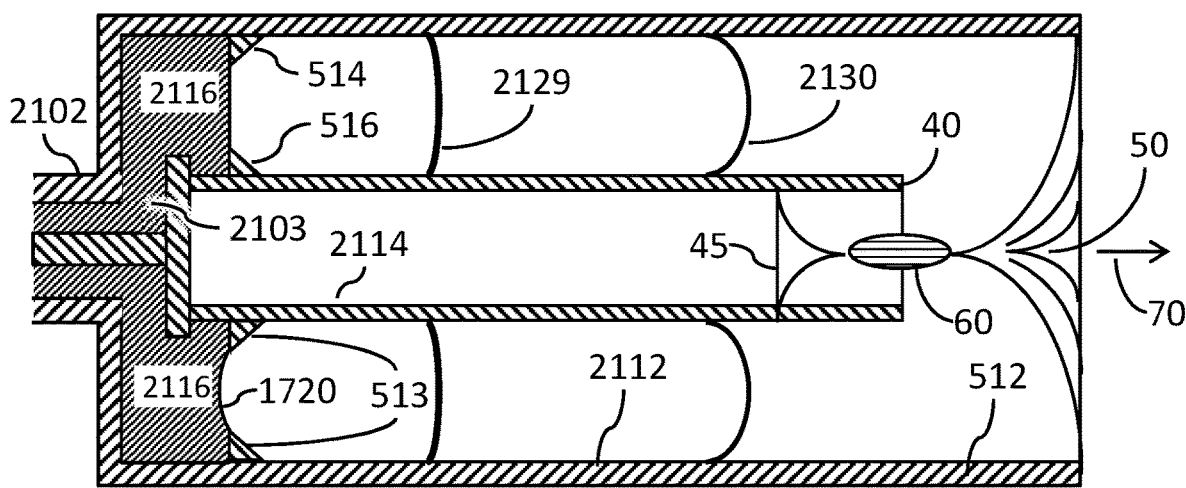
FIG. 21 is a cross section illustration of a DPR embodiment showing an insulator installed in the base of the DPF to flatten and level the plasma sheath before transiting the axis.

An alternate preferred embodiment for discharge initiation in the invention therefore provides a modified Insulator [2116] with slightly modified versions of the anode [2114] and cathode [2112] as shown in FIG. 21, wherein insulator [2116] replaces the bottom [17] or [717] of the cathode [12]. The design does not mandate but does elegantly accommodate a coaxial transmission line [2102] to bring the high voltage into the DPF device. The high voltage transits an RF (Radio Frequency) radial impedance transition or taper [2103] to gracefully convert from the transmission line impedance into the device impedance with minimal power reflections (note that a true ideal transmission taper typically avoids geometric discontinuities and comprises graceful changes in separation between electrodes between the input and output terminals to minimize reflections, which is not overtly shown in the figure, but is well known in the art of RF transmission line design). By bringing the power into the device this way, the transmission line reflections from the DPF device are minimized. As before, the voltage is dropped across the surface [1720] of the insulator [2116], where now radially disposed electrode knife blades and tips selected from [513], [514], and/or [516] and [613], [614], and/or [616], respectively, are used as shown to promote discharge formation across the Insulator [2116] through electron avalanching between the anode and the cathode just above the exposed surface [1720] of Insulator [2116]. As before, the knife or tip electrode corners may be lifted a short distance from the insulator [2116] to minimize insulator erosion and surface [1720] may be depressed slightly into the base (leftward in FIG. 21) to achieve a same purpose. Some care in the electrodynamic design of the conductors is likely required to provide for relatively uniform currents and to ensure a flat and uniform liftoff of the arc plasma sheath upon arc ignition. In such an embodiment, a modified insulator [2116]—possibly in combination with features such as [514] or [516]—would serve for example as a feature that both improves a plasma discharge initiation and improves a plasma sheath liftoff and could: comprise an annular insulator disposed at a back bottom end of a DPF between an inner and an outer electrode; optionally incorporate an annular trough recess; and optionally incorporate at least one sharp edge (annularly or discretely) on an inner or outer radius (or both) of an insulator for high field strength points to aid in discharge initiation.

Upon striking a discharge, a flat donut shaped disk of plasma sheath [2129] forms uniformly between the anode [2114] and cathode [2112], and launches down along and perpendicular (level) to the Z-Axis, substantially perpendicular to the anode [2114]. The plasma sheath remains substantially level as it accelerates down the axis (the aforementioned Hall Effect tilting effect not withstanding), perhaps picking up a slight central radial bow due to higher magnetic field strength and the Hall Effect near the anode, and higher viscous drag at the plasma sheath attachment points on the anode and cathode as shown by [2130]. Compare this with [7] from FIG. 1 which illustrates the difference in plasma sheath tilt. Leveling this tilt in a DPF designed after FIG. 1 may require a longer DPF device which then too places constraints on the parameters such as maximum drive voltage and current. A level arc opens up parameter variations for tuning improved performance. It also reduces plasma leakage if rods or tines [112] are employed, thereby increasing plasma density, losing less plasma upon the sheath exiting the device, and it contributes more mass to the pinch [50] and enhances the uniformity and length of the pinch volume further enhancing DPF performance.

In order to further minimize Insulator [2116] erosion and yet still retain the benefits cited for the embodiment of FIG. 21, the surface [1720] of the insulator may be made annularly concave with a greatest axial distance rearward from a radial disposed about in the middle of the insulator radially between the anode and the cathode. This provides an annular trough in Insulator [2116] the cross section of which is seen at [1720]. In this way then, when the discharge is struck, the discharge will not lay directly on the insulator, thereby offering some mitigation of arc erosion. Again, the aforementioned knife edges [513], [514] and [516] and/or tips [613], [614] may also be lifted slightly off the Insulator to offer some additional protection of the insulator.

Figure 22:
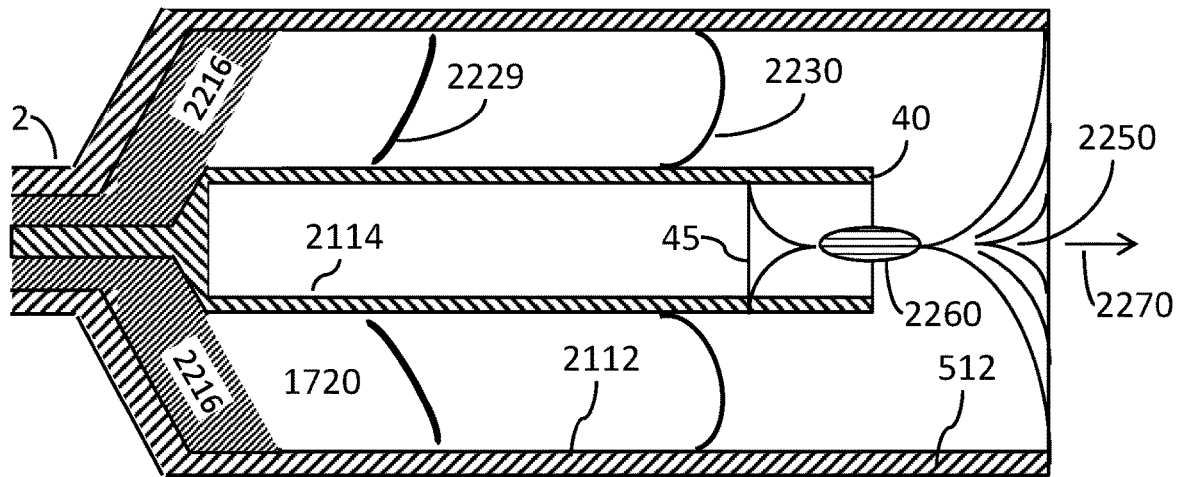
FIG. 22 is a cross section illustration of a DPR embodiment showing a concave conic insulator installed in the base of the DPF to bias the plasma sheath inward before transiting the axis.

Yet further improvement may be achieved by replacing the now substantially flat (perpendicular to the Z-Axis) insulator [2116] below [1720] with a substantially concave conic faced insulator as illustrated by [2216] in FIG. 22. This changes the arc lift-off angle from a convex conic in FIG. 1 to a concave conic tilted in the opposite conic tilt direction from that of the traditional DPF and thereby tilts the plasma sheath [2229] to be now facing inward. Those skilled in the art of Shaped Charges will recognize the new conical tilt of the plasma sheet [2229] as having similarities to the well know Shaped Charge warhead liner, and this analogy is not accidental. By tilting the insulator inner surface into a substantially concave conical shape, the plasma sheet will also be thusly tilted. Some of this tilt [2230] may be lost and defocused traveling down the DPF axis, but with suitable design optimization, enough can be retained to provide a substantial improvement in the angle of the collapsing cone of very high velocity and high density plasma coming into the pinch [2250], instantiating in the plasma sheet the equivalent of a shaped charge liner collapse. The pinch region [2250] thereby becomes both significantly longer in axial length and better compressed. The plasma sheath compresses and collapses into itself along the Z-Axis creating a plasma jet [2270] of reaction products analogous to the shaped charge's central slug, often referred to as the "carrot" (due to its similar shape and size to that vegetable). The energy density, temperature, mass density and effective confinement time are significantly improved over a traditional DPF, particularly when all the other aforementioned teachings of the invention are integrated therein, providing an improved device for all DPF applications, and potentially the above breakeven commercial production of Fusion energy. Note that other potential Fusion phenomenon and means such as creation of Plasmoids [2260] also benefit from the higher energy density, higher mass density as well as the uniformity of the pinch. Note also that there may be applications that can benefit from reversing the tilt of the insulator [2216] from that shown, such as perhaps a more effective way to mimic more traditional DPFs, although the true usefulness of that embodiment is not clear after we have worked so hard to eliminate the launch tilt of the prior art standard DPF. In such embodiments, an insulator [2216] would serve for example as a feature that improves a plasma sheath liftoff and could: comprise a concave annular conic insulator disposed at a back bottom end of a DPF between inner and outer electrodes; optionally incorporate an annular trough recess; and optionally incorporate at least one sharp edge (annularly continuous or discrete) on an inner or outer radius (or both) of an insulator for higher field strength points to aid in discharge initiation.

Figure 23:
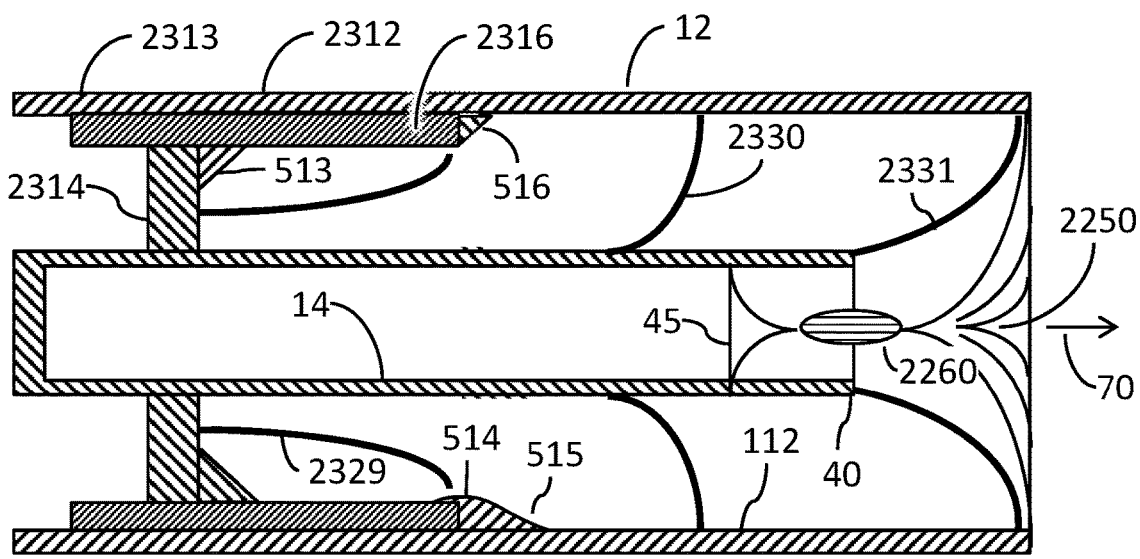
FIG. 23 is a cross section illustration of a DPR embodiment showing the inner electrode (nominally Anode) now further comprising the base of the DPF, and the insulator now disposed on the inner surface of the outer electrode (nominally Cathode) and electrically separating them to provide a plasma discharge and plasma sheath formation from the outer electrode instead of from the inner electrode.

A further alternate embodiment of the insulator is shown in FIG. 23 wherein the tubular Insulator [16] has been enlarged in radius and disposed to the inside surface of the cathode [12] has shown by [2316], said cathode now without a disk baseplate [17], said disk baseplate now comprising a baseplate [2314] connected electrically to the anode [14] instead of to cathode [12], said cathode [12] now comprising a conducting tubular ring [2312] around the tubular insulator [2316] and physically and electrically connecting the rods or tines [112], and said conducting tubular ring [2312] further comprising and extension to the cathode [2313] that provides mechanical support to the Insulator [2316] as well as a means to connect to the negative lead from the high voltage power supply isolated from the anode both electrically and physically.

This geometry essentially reverses the roles of the anode and cathode with respect to the disposition and retention of the Insulator [16] (although the polarity remains the same unless explicitly reversed). The anode [14] now additionally comprises a conducting disk ring base plate [2314] of substantially the same material as the anode, and this disk ring base plate takes on a similar location and mechanical support role as the cathode disk ring base plate [17] did. Additionally, knife edges [514], [515], and [516] and points [614], [615], and [616] fill the same roles as before, but now reside on the cathode inside surface instead of the anode outside surface, in either case to aid in electron avalanche and arc initiation thereby. As such, the discharge and transition to plasma sheath [2329] is struck over the Insulator [2316] on the cathode side radially inside of the insulator, which orients the plasma sheath in an opposite conical concave tilt inclination with respect to the traditional plasma sheath [7]. This now concave conic inclination likely flattens as the arc rides up the axis at [2330], until it arrives at the end of the DPF at [2331], ideally with a notably more convergent angle pointing inwards towards the pinch [2250] than the traditional plasma sheath [39]. The inward orientation provides more inward compressing momentum and supports a longer and more axially aligned geometry to support an axially longer pinch volume with higher temperature, and higher density than the traditional DPF pinch at [50] in FIG. 1. Also, these higher densities and temperatures support a more energetic and practically realizable Fusion Plasmoid at [2260]. In such an embodiment, an insulator [2316] would serve for example as a feature that improves a plasma sheath liftoff and could comprise an insulator disposed on an interior surface of an outer electrode.

The arrangement of FIG. 23 might suffer disadvantage in that the arc tilt could be too much for a particular design, and also that it may be more difficult to strike a uniform symmetric discharge around a larger circumference of the outer electrode than it is to strike a uniform symmetric arc around the smaller circumference of the inner electrode as in FIG. 1. However, using modern circuits, components, designs and the earlier disclosed discharge initiation teachings herein, non-uniform and asymmetric discharge initiation is mitigated. It should also be noted that the Filippov DPF employs a very large radius Insulator, and does not appear to suffer any significant asymmetric discharge initiation issues.

Additionally, since this arrangement has the distinct advantage of tilting the initial plasma sheath inward towards the anode as opposed to outward as in the traditionally DPF discharge initiation design, this both provides the DPF designer another design degree of freedom, and it also will enhance the Z-Pinch plasma density, temperature and energy density by reducing leakage through the cathode rods and tines [112], as well as orienting more of the plasma inward versus outward away from the axis as occurs in the traditional DPF.

Figure 24:
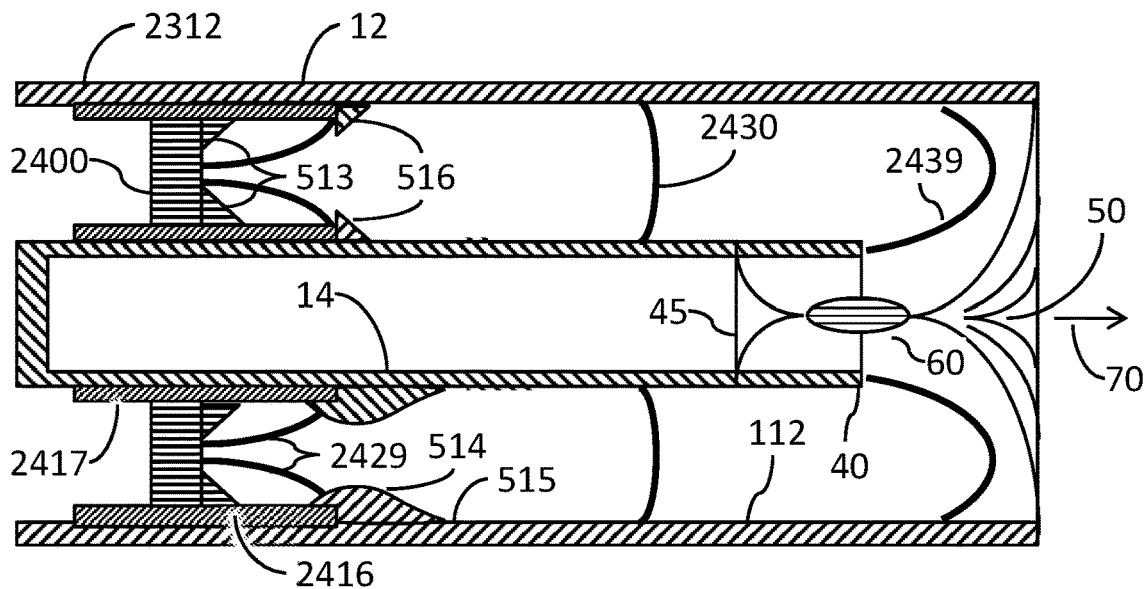
FIG. 24 is a cross section illustration of a DPR embodiment showing an electrically isolated conductor installed in the base of the DPF, and two concentric tubular insulators to isolate it from both the cathode and the anode respectively, to flatten and level the plasma sheath before transiting the axis.

To address any lingering issues with the above discharge formation embodiments, as well as add some further features, FIG. 24 provides an alternate but similar embodiment as FIG. 21, but where there are now two sets of Insulators, a tubular and likely shorter (in axial length) Insulator [2416] disposed about the inside surface circumference of the cathode [2312] as in FIG. 23, and a second tubular and likely shorter (in axial length) Insulator [2417] encircling the anode [14] in very similar fashion as given in FIG. 1. Between them is a new floating neutral voltage conducting disk donut [2400] sandwiched between the two insulators, of similar shape as the annulus of Insulator [2116] shown in FIG. 21. This floating conductor serves to turn the discharge circuitry of the DPF into a differential voltage potential circuit. Because [2400] is floating, the electric field and associated voltage potential from the cathode [12] to the base [2400] is half as much as it was before to the anode [14], and likewise the electric field and associated voltage potential from the anode [14] to the base [2400] is also half of what it was before to the cathode [12]. Consequently the Insulators [2416] and [2417] can be made about half the height of the traditional Insulator of FIG. 1 or FIG. 23 (hence the aforementioned likely shorter), and they can also be made about half as thick without violating any voltage limits (thickness and height may be slightly different to accommodate influence of the specific axial and radial fields in the end geometry). Additionally, since there are now two plasma discharge initiation insulator surfaces, the struck discharges [2429] have a better chance to be more uniform and symmetric. Furthermore, this scheme gives the designer another degree of freedom in the overall design of the DPF to achieve optimum plasma sheath compression at [2439] and into the pinch [50], since the plasma sheath formation can impose limits on operating pressures and dimensions. In such an embodiment, a floating neutral voltage conducting disk donut [2400]—possibly in combination with insulators [2416] and [2417]—would serve for example as a feature that both improves a plasma discharge initiation and improves a plasma sheath liftoff and could comprise: an annular washer-like metallic disk electrode for a base bottom of a DPF not electrically to either an anode or cathode but to a mid, nominally ground, voltage between them; a first insulator disposed on an exterior surface of an inner electrode; and a second insulator disposed on an interior surface of an outer electrode (with the first and second insulators sandwiching the annular washer-like metallic disk electrode between them, mechanically and electrically isolating the outer, inner, and washer-like metallic disk electrodes from each other.

Note that although the conductive base [2400] may indeed be truly electrically floating, in an instantiated embodiment it would likely be tied to ground or chassis ground to help anchor the voltages to a best common voltage and avoid undesirable ground loop currents to other parts of the apparatus.

Note also that although the above description calls for tubular insulators [2416] and [2417], in an optimum instantiation these would be tilted away (not shown) from an axial alignment forming a conical tube shape so as to shade the insulators from direct line of sight of the plasma sheath as it rises up the between the Anode and Cathode. To implement this shading, the inner insulator [2416] would be shaped as a concave up cone (not shown) with a smallest radius axially near conducting base [2400], thereby shielding it from direct line of sight to the plasma sheath running down the DPF device, and then the outer insulator [2417] would be shaped convex up cone (not shown) with largest radius axially near conducting base [2400] thereby likewise shading it from direct line of sight to the plasma sheath running down the DPF device. In this way both insulators are shielded from direct line of sight to the ascending plasma sheath and its deleterious ultraviolet and other emitted radiations.

In other embodiments, where the Anode or Electrode are either both or individually not axially parallel, the conic angles of said conic shaped insulators [2416] and [2417] would have to be more extreme, angling said insulators further back and behind the tangent to their respective electrodes [12] and [14], at a sufficient angle and recess to enforce shading by said respective electrodes of said plasma sheath and its deleterious ultraviolet and other emitted radiations.

The design of FIG. 24 provides one of the flattest plasma sheath profiles [2430], on par with the embodiment of FIG. 21, since the plasma sheath is launched from both inner sides of the DPF electrodes, and again this offers the designer flexibility in achieving a most optimum compression plasma sheath [2439]. Alternatively, the Insulators [2416] and [2417] need not be the same height, and the floating neutral voltage conducting disk donut [2400] need not be neutral, but could be biased to serve other design objectives. Additionally, the Insulator disk base [2400] could be tilted conically concave (as shown in FIG. 22) or convex. Furthermore, Insulator disk base plate [2400] could extend radially only partially inward towards the anode, with the remainder of said distance taken up by a short anode disk baseplate to meet it radially, or alternatively said Insulator disk base plate [2400] could extend radially only partially outward towards the cathode, with the remainder of distance taken up by a short cathode disk baseplate to meet it radially. By suitable combinations of these various embodiments and specification of the associated parameters, the discharges

[2429] may be manipulated in most any manner of flatness and tilt desired with respect to tilt angle and shape, allowing significant flexibility in DPF design and enhanced performance.

In fact, combining elements of the above teachings gives even more flexibility. For example, conducting disk donut [2400] can be made to take on a conical tilt like shown by Insulator [2216]17 in FIG. 22, thereby allowing the arc sheath to be launched at most any conical tilt angle desired (likely between about 30 degrees either convexly or concavely from the axial direction due to practical fabrication and layout limits). This gives great flexibility to tune the DPF as desired.

Figure 25:
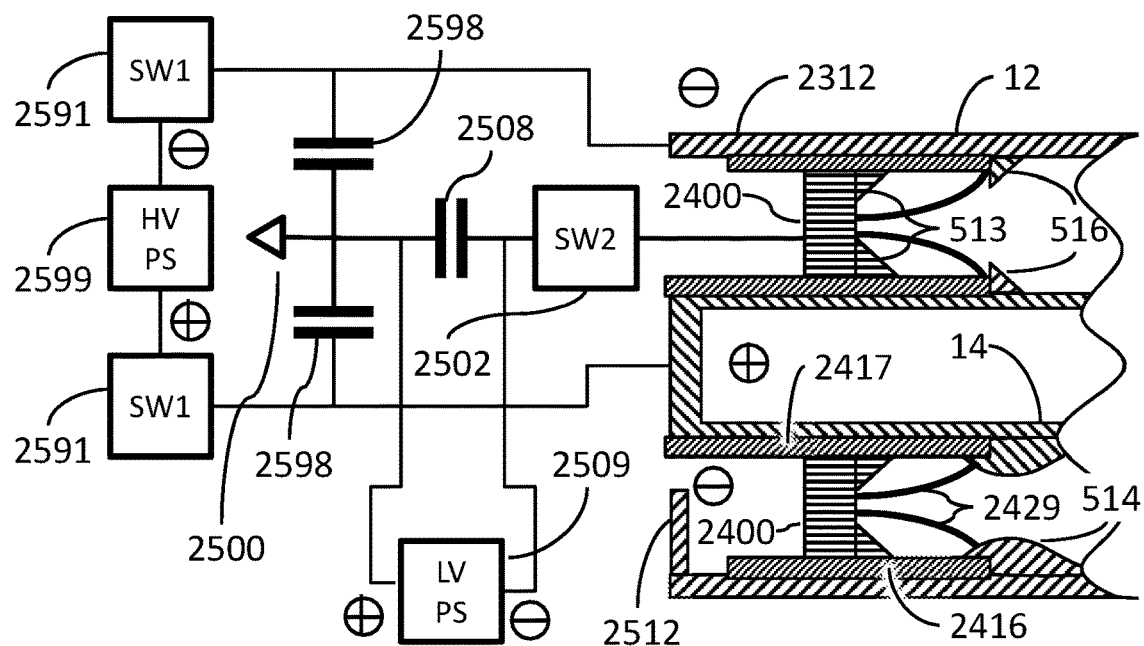
FIG. 25 is a differential power supply circuit schematic embodiment with connections to a cross section illustration of a DPR embodiment showing a conductor installed in the base of the DPF with two isolating insulators, whereby a fast low-voltage trigger may spark the DPF discharge with excellent uniformity and minimum losses in the power supply.

Another feature of the embodiment of FIG. 24 is the ability to employ a potentially much more desirable drive circuit shown in FIG. 25, wherein the back half of the DPF device from FIG. 24 is shown on the right side of FIG. 25 and the charging, drive and trigger circuit is shown on the left side of FIG. 25. First, Low Voltage (LV) Switch 2 (SW2) [2502] is opened, and then High Voltage Switches Pair SW1 [2591] closed in order to connect the differential High Voltage Power Supply (HVPS) [2599] to the differential High Voltage (HV) Capacitors Pair [2598] which would nominally be chosen to be of the same capacitance and voltage rating unless there were motivation for the circuit to provide an output with a preferred (non-ground) bias. Differential High Voltage (HV) Capacitors Pair [2598] will typically comprise a multiplicity of individual capacitors (due to scarce availability of large capacitors with the required traits) and are ideally placed directly under the bottom side of the DPF between the anode [14] and cathode [12](ideally inside of [2312], and under [2400] so as to comprise a set of azimuthally symmetric radially disposed current lines that substantially electrically replace the contiguous disc shaped conductive base [17] of the cathode). This or similar arrangement completes the high current circuit as close to the plasma sheath as possible, so as to not let any magnetic flux escape, as might happen with extended power supply lines, which might then reduce the performance of the device. Alternatively, a washer shaped flange plate such as [2512] may be mechanically and electrically connected to the cathode [12] as shown in FIG. 25 and then fed with the negative terminal of high voltage along the inside (axial side) circumferential edge of said flange as indicated by the negative charge symbol located thereto. This allows the current loop to be substantially closed, entrapping maximum magnetic flux for operation of the DPF. Of course, then too the line from SW2 [2502] would need to pierce through washer shaped disc flange plate [2512] with suitable insulator to prevent short circuiting. Also note that said washer shaped disc flange plate may alternatively be mechanically and electrically connected to the anode [14] and now not the cathode [12], but still connected in a substantially similar way to achieve the same results, wherein electrical connection is now made towards the outer perimeter of the DPF device versus towards the inner axial center as before.

Continuing with the operation of the power supply, differential HVPS [2599] is then turned on and charges HV Capacitors [2598] oppositely as shown by the polarity of HVPS [2599] with Ground (GRND) [2500] between the pair of HV Capacitors [2598] to the Operating Voltage, which can be between about 10 kV to upwards of 200 kV or more in some embodiments. This arrangement charges the capacitors and (in this particular case) the DPF anode and cathode as shown, to an operating voltage but below the discharge sparking voltage either between them or to the neutral conducting disk donut [2400]. Low Voltage Power Supply (LVPS) [2509] then charges up Low Voltage (LV) Capacitor [2508] to a suitable low voltage, said low voltage being a fraction of the high voltage, typically about 1 kV but possibly lower or higher depending on the specific details of the design.

With the system now in the charged state, there is only a comparatively low voltage (compared to the high voltage) across the Switch SW2 [2502]. Therefore, this switch can be a very fast switch and need not be an excessively high voltage or high current switch. This makes the design easier to instantiate. The polarity of the charge on LV Capacitor [2508] can be either positive or negative with respect to ground (negative shown), depending on which electrode one desires to initiate the discharge on. In reality, the discharge will start about simultaneously on both electrodes as soon as one or the other starts to discharge. When desiring to fire the DPF device, fast Switch SW2 [2502] is closed which (in this case) applies the negative voltage of the LV Capacitors [2508] onto the Neutral Electrode [2400], thereby driving its voltage temporarily below zero volts. This will then start a discharge from the positive anode [14] to the now slightly negative Neutral Electrode [2400]. This lasts only an instant until the discharge raises the voltage of the Neutral Electrode [2400] back up and past zero to its high positive voltage, at which time a discharge initiates from the negative cathode [12] to the now positive Neutral Electrode [2400]. After a short period, the Neutral Electrode [2400] becomes substantially neutral again since the balanced capacitors [2598] have Ground between them. In an example circuit the voltage would typically "bounce" which then gives it an opposite polarity which can be made to the initiate the discharge on other positive anode [14]. In this way both positive and negative discharges [2429] may be initiated almost simultaneously. It is recognized that additional circuitry such as safety discharge switches to ground and controls will be needed to function the circuit safely and reliably, but this summarizes the main operational points of the circuit with given new DPF design. In such an embodiment, electrodes could be driven by a common mode type high voltage high current power supply with optional pulse shaping components: providing a floating or middle voltage on an annular washer-like metallic disk electrode between outer and inner electrode voltages; and, upon triggering, further providing a comparatively lower voltage offset pulse from a floating or middle voltage to induce an initiate a discharge between more-biased inner and outer electrodes.

FIG. 26 shows an improved circuit to that shown in FIG. 25, with the addition of serially connected Inductors [2610] and [2611] and parallel connected Capacitors [2620] and [2621]. In a pure differential circuit, the Inductors would both be of the same value and likewise the Capacitors would both be of the same value, but there may be advantages to them being different in order to match with the inductances and capacitances of the cathode and the anode which are inherently different due to their shapes and the manner in which plasma sheath currents attach to them. Such differentiation could be used to realize a true balanced circuit.

In this circuit embodiment the said added inductors and said added capacitors comprise a low pass circuit in the alternating current sense. Additionally, they comprise an additional early source of current in the early evolution of the discharge. When the power supply is fully charged and ready to fire as described in relation to FIG. 25, the capacitors [2620] and [2621] are each charged to the full discharge voltage potential of the circuit albeit of opposite polarity with respect to ground. Upon initiation of the discharge after the Trigger [2600] is fired, capacitors [2620] and [2621] discharge first because Inductors [2610] and [2611] initially inhibit current flow. At about the time that capacitors [2620] and [2621] have expended a substantial fraction of their charge, inductors [2610] and [2611] begin to conduct and continue to then conduct current from main capacitors [2598]. As the plasma sheath traverses the Rundown Phase [2], the DPF inductance from work done on the plasma sheath begins to rise which at first is overcome by the voltage in capacitors [2598]. As the DPF inductance continues to rise from more work done on the plasma sheath, inhibition to rising current imposed by the rising DPF inductance is countered by the inhibition to a decrease in said current by inductors [2610] and [2611] which may be fully inducted with all the current coming from the power supply. Additionally, by now capacitors [2620] and [2621] have partially recharged from the current now flowing through the inductors and connecting them thereto to the main capacitors [2598] and are in substantial voltage equilibrium with the DPF circuit. As the DPF inductance increases attempting to decrease the DPF current, inductors [2610] and [2611] create a countering electromotive force voltage that resists this decrease. The net low pass response of the circuit comprising [2610] and [2611] and [2620] and [2621] resist voltage and current change and thereby hold up the current for an extended period of time determined by the values of these components in their role as a low pass filter. The net result is a forced maintenance of the current past when the peak current would have normally occurred in a traditional DPF device, timed so as to maintain energy density in the plasma sheath into the pinch, resulting in higher pinch and DPF performance. In such an embodiment, electrodes could be driven by a differential mode type high voltage high current power supply with optional pulse shaping components: providing a floating ground or ground voltage on an annular washer-like metallic disk electrode between outer and inner electrode voltages; and, upon triggering, further providing a comparatively lower voltage offset pulse from a floating or ground voltage to induce an initiate a discharge between more-biased inner and outer electrodes. This simple low pass filter embodiment illustrates the use of most any purpose designed filter with transient characteristics desired to meet the desired current and voltage temporal profiles needed for best performance. Such filters are easily designed and developed and integrated into the embodiment by those skilled in the art of electronics and RF electronics and power electronics.

A further improvement of the invention is illustrated in FIGS. 27A and 27B. FIG. 27A shows a solid anode [14] in this case with rounded tip [42], and resistive material [2784] on or embedded in the surface of the tip's area with optionally radially tapered resistivity, tapered so as to have lower resistivity at larger radii from the Z-Axis, transitioning gradually to a maximum resistivity on the Z-Axis.

Also shown is plasma sheath [39] in the later stage of performing its Radial Collapse and Run-In, during which the pinch occurs in front of the anode tip. In accordance with the requirement for reducing Entropy in order to produce plasma instabilities (such as plasmoids) [60], as the contact point [2742] for the plasma sheath or filaments [39] traverse over the resistive material [2784], the resistance in said material reduces the current, which immediately and directly removes ohmic heating to the plasma, which in accordance with the prior discussion on Entropy, reduces the heat input and thence reduces the Entropy of the plasma to induce the formation of said instabilities [60]. Because this approach relies on the physical location of the contact point of the plasma sheath, and because the physical location of the contact point is highly registered with the timing and location of the pinch [50], precise placement and extent and resistive profile of the said resistive material [2784] allows precise control and very fine timing of the current cut off with respect to the pinch [50] and therefore allows the Entropy to be reduced exactly when desired and exactly by the amount desired based on what the requirements are determined to be based on detailed plasma and electrodynamic simulation and modeling. In effect, to the extent that the Entropy reduction creates said instabilities [60] and to the extent that said instabilities are found to provide benefit to the performance of the DPF device, this method allows the current (and hence Entropy) to be very precisely reduced immediately after the pinch by whatever amount desired and with a precision time profile desired for said reduction as desired.

Note too that whereas [2784] in FIG. 27A may represent a resistive material to quench the current as and if desired at a precise time, so too may the same general approach be used to apply a renewed higher voltage and current to the plasma in the form of a second discharge (not shown). In this modified embodiment, resistive material [2784] now becomes a separate insulated secondary level anode (insulated from anode [14]), nominally with a same or further higher voltage than was applied originally to anode [14], nominally connected to a second separate power supply or a portion of the original power supply, and which, upon arrival of the plasma sheath [39] contact point [2742], conductively connects with the contact point of said plasma sheath, and applies a further renewed voltage and current to the plasma sheath, nominally just as the plasma sheath reaches the Pinch Phase [4] at [50]. This process may be described as double pumping or double shocking the plasma sheath, with additional current just as the pinch occurs. This can serve to provide a burst of heating and additional magnetic compression, at just the right time to realize notably higher energy density in the pinch. In some embodiments, a resistive material [2784] or plasma sheath contact point [2742] would serve for example as a feature that enhances reaction-improving instabilities or pinch and could comprise a substantially solid inner electrode with substantially rounded end tip with an integral or applied resistive surface providing a progressively increasing taper of resistance to plasma sheath current flow as a contact point approaches an electrode center axis and located and selected in design to maximize production of reaction-improving instabilities or pinch. Additionally or alternatively, in some embodiments, a resistive material [2784] would serve for example as a feature that enhances reaction-improving instabilities or pinch and could comprise a substantially hollow inner electrode with substantially rounded annular end tip with an integral or applied resistive surface to hollow portion, providing a progressively increasing taper of resistance to plasma sheath current flow as a contact point approaches a bottom end of a hollow portion or an electrode center axis (or both) and located and selected in design to maximize production of reaction-improving instabilities or pinch.

Said secondary anode may be of the same voltage as the original applied high voltage and thereby might serve only to provide renewed current to the plasma sheath right when the main power supply current has peaked. In one embodiment, said secondary anode is also electrically connected to the same main power supply, thereby not offering any higher voltage but providing a second current path than just the anode, thereby reducing the DPF inductance just as the current were otherwise peaking, and thereby providing an extra boost of current and delaying said peak current for enhanced DPF performance.

Said secondary anode could, however, be at a higher voltage than that originally applied to the DPF, thereby providing a notable additional and significant boost to the plasma sheath current just before the pinch. The power supply for this secondary anode could be piggy-backed onto the prime power supply to ease achievement of its higher voltage level and also to more easily offer a return current path from the cathode.

FIG. 27B shows a further developed embodiment after FIG. 27A with a hollow anode [1514], as well as an enhanced cathode [12] with an end cap [2012] like in FIG. 20C which is just a further development and closure of the rounded cathode end [812] of FIGS. 14, 16, 17, 18 and 19B. However, the end cap [2012] now also manifests a prominence [2713] or tip which serves to help close the plasma sheath and filament lines in a second further axially disposed pinch [50B] that brackets the pinch and resultant instabilities [60] with the inboard pinch [50] here denoted as [50A]. Said cathode tip [2713] may be of the same material as cathode cap [2012], or may be of another material, or it too may be made of a resistive material like [2784] and serve a similar purpose in choking off the current at a specific time with the plasma sheath and filaments contact point traverse over the tip [2713], and then resistive tip [2713] may also have a tapered resistivity as a function of radial extent to afford the same flexibility in current control as described for [2784] in FIG. 27A. Alternatively, when tip [2713] is selected to be conductive, it serves to provide a specific boundary condition that terminates the plasma sheath and filaments in orientations conducive to shaping the pinch and forming the most advantageous pinch at [50A] and/or [50B]. In some embodiments, a converging taper, rolled lip, or end cap could: comprise a closed end and an inward and rearward disposed coaxial electrode tip to help complete a plasma sheath current circuit; further comprise an integral or applied resistive surface to a tip; provide a progressively increasing taper of resistance to a plasma sheath current flow approaching a tip or an electrode center axis (or both); and be located and selected in design to maximize production of reaction-improving instabilities or pinch while providing a plasma pinch from two ends.

FIG. 27B also shows how resistive material [2784] may be inserted into the hollow anode [1514], and therein offer the same precision timing of applied current termination or temporal contouring with a tapered resistivity as was provided with the solid anode of FIG. 27A, where in this case the resistivity may be tapered either radially or axially along the hole into the hollow anode [1514]. Note that this current termination scheme may also be combined with the teachings of FIGS. 20B and 20C offering significantly more fine control over the terminal behavior of the DPF than hereto possible. Also note that although resistive material [2784] is shown inside the hole of anode [1514], the physics and timing may require that said resistive material [2784] reside further up and even outside the anode perhaps circa tip [2044] or even further back down the anode outside surface. The exact placement is predicated on the specific results of detailed plasma and MHD modeling and simulation codes for given DPF geometry and parameters.

Note that just as for FIG. 27A, tip [2713] and resistive liner [2784] may alternatively comprise an insulated secondary cathode and a secondary anode respectively, also with circuitry to provide higher current and/or higher voltage to the plasma sheath, nominally at a time in the operation when the main current has peaked or is peaking and just before the pinch. This operates substantially similarly to the manner of operation of the solid anode in FIG. 27A, but now applied to the hollow anode and optionally with a capped cathode, potentially providing enhanced current control and sourcing on both the anode and cathode ends to the circuit.

Figure 28:
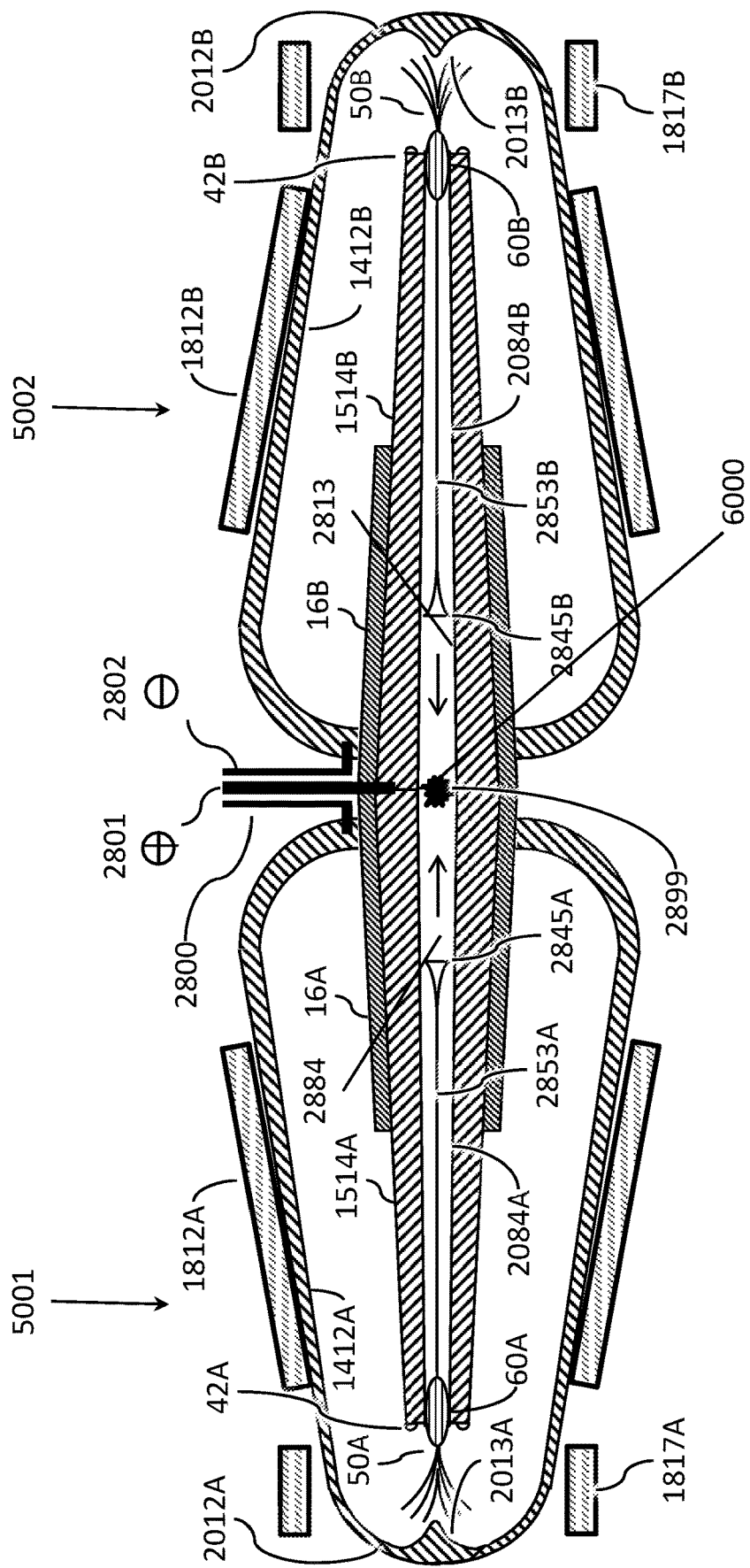
FIG. 28 is a cross section illustration showing how two Mather DPF devices may be combined back to back to provide an enhanced colliding pinch in the middle down the central anode and using some embodiments of the improvements disclosed.

Up to this point in this specification, improvements have been described for individual DPF devices. However, in some embodiments, it may be possible to combine separate DPF devices into a multiple DPF device. As an example, multiple DPF devices may be combined using techniques similar to those used for combining multiple cylinders in a thermodynamic car engine. FIG. 28 illustrates one such embodiment to combine two DPF devices have been combined. In the embodiment of FIG. 28, two DPF devices are combined back to back and coupled together at rear portions of their respective hollow electrodes [1514A], [1514B]. In the embodiment of FIG. 28, the respective DPF devices are coupled at a location corresponding to a location of hollow anodes [1514], where the tubular hole [41] on each of the respective devices (e.g., location of hole [41] of FIG. 1) from FIG. 1 would be. Note that in the following figures, a suffix of "A" shall refer to the left side DPF device and a suffix of "B" shall refer to the right side DPF device unless noted otherwise. The combined device shown in in FIG. 28 may be powered with two synchronized or a joint common power supply (not shown) and connected via power cable or transmission line [2800] comprising a positive terminal [2801] with respect to a negative terminal or coaxial tubular shield [2802]. The positive terminal [2801] passes through insulators [16A] and [16B]. In some embodiments, the insulators [16A] and [16B] may meet in an approximate center location and connect to anodes [1514A] and [1514B]. Negative terminal [2802] connects to the two cathodes [1412A] and [1412B]. In embodiments in which the device is powered via with a high voltage coaxial cable, it is convenient for the positive terminal [2801] to be connected to a center line of the coax, and the negative terminal [2802] to be connected to the outer return shield or braid of the coax as is more explicitly illustrated in cross section in FIG. 28. In some embodiments, a dense plasma focus device system [5000] may comprise two or more DPFs. In some embodiments, power provided to a first DPF [5001] of the two or more DPFs may have a similar polarization as power provided to a second DPF [5002] of the two or more DPFs; in some such embodiments an outer electrode [1412A] may have a charge polarity that is the same as the charge polarity of an outer electrode [1412B]. In some embodiments, power provided to a first DPF [5001] of the two or more DPFs may have an opposite polarization as power provided to a second DPF [5002] of the two or more DPFs; in some such embodiments the an outer electrode [1412A] may have a charge polarity that is opposite the charge polarity of an outer electrode [1412B]. Polarity of power provided to different ones of the two or more DPFs may vary in other combinations in other embodiments.

In some embodiments, the two or more DPFs [5000] may be coupled in a back-to-back orientation (or, alternatively described, bottom-to-bottom orientation), as shown in FIG. 28. In some embodiments of the embodiment of FIG. 28, the two or more DPFs comprise substantially tubularly hollow inner electrodes [2041], which may pass through to form an essentially continuous, hollow, and substantially tubular void or channel [2084] (optionally filled with DPF gas) at or near an approximate axial center of the two or more DPFs. Additionally, in some embodiments of the two or more DPFs, the DPFs may further comprise a substantially singular cusp plasma pinch [6000] within the channel [2084] of the tubularly hollow center electrodes, with a plasma pinch opposingly compressed together at crush pinch region [2899] from each DPF near a center of at least two DPFs. In some embodiments, each DPF of the two or more DPF devices may have a plurality of magnets, such as magnets [1812A] and [1812B] or [1817A] and [1817B] installed circumferentially around them. The magnets [1812A] and [1812B] or [1817A] and [1817B] may be operable to provide angular momentum and focusing as has been described herein earlier with reference to FIGS. 17 and 18. They also include cathode end caps [2012A] and [2012B] with associated tips [2013A] and [2013B] that together help to bend the plasma sheath and filament lines around the end of the anode [1514A] and [1514B] for a better orientation for enhanced radial compression and pinching at [50A] and [50B] for the left-side device and the right-side device, respectively. Similar features are described herein in reference to a singular DPF device.

The individual DPF devices [5001] and [5002] may be operable to receive power essentially simultaneously, and may then operate substantially as has been described herein. The individual DPF devices [5001] and [5002] may be powered such that they are polarized. For instance the inner electrode [1514A] my have an opposite polarity of the outer electrode [1412A]. Additionally or alternatively, the inner electrode [1514B] may have an opposite polarity of the outer electrode [1412B]. Upon pinch (Z-pinch) formation at pinch regions [50A] and [50B], the plasma sheaths refract inwardly to form cusp shaped cones [2845A] and [2945B] interior to the hollow tubes [2084A] and [2084B] of the inner electrodes [1514A] and [1514B] respectively. Under the assumption of formation of instabilities [60A] and [60B], the instabilities follow and may migrate down a portion of the channel [2084] along coaxial current filaments [2853A] and [2853B] respectively, towards the mutual middle of the devices (e.g., a crush pinch region [2899]). Eventually, plasma sheath cusp shaped cone perimeter contact points [2845A] and [2845B] may collide in a center region (e.g., where individual tubes [2084A] and [2084B] meet near a center of the system [5000] at region [2899]).

The collision of the two rapidly ingressing plasma sheaths on a circumference of the tub near crush pinch region [2899] may cause a further collapse and pinch onto region [2899] hereafter referred to as a "cusp" collapse and compression. The cusp collapse and compression occurs because the currents on the contact points [2845A] and [2845B] are traveling in substantially a radial directions (out of the anodes for positive current towards the axis), and also because they are traveling axially at high speed toward each other. The mutual attraction of the like currents near collision point [2899] may cause two open end facing cusp-shaped cones [2845A] and [2945B] to collapse into an annulus disc perpendicular to surfaces of walls of channel [2813] (e.g., the inner walls of tubes [2084A] and [2084B]), which may then be compressed radially inward by the collapsing azimuthal magnetic field onto the Z-Axis at crush pinch region [2899], which may produce a large, higher energy density and higher particle density secondary three-dimensional crushing collapse and compression pinch (cusp pinch) at region [2899] owing to the fact that the pinch is applied from all three dimensions instead of just radially as in a traditional DPF device. This crush pinch produces additional Fusions, neutrons and ions, which due to the cylindrical magnetic field inside the hollow anode tube are preferentially disposed to travel along the length of the Z-Axis. This then may interact with and react with the instabilities and high densities and temperature reactants already on the Z-Axis to provide an enhanced late time Reaction Phase [5](FIG. 1). Notice that the tubular channel [2884] formed by adjacent tubes [2084A] and [2084B] may have a diameter that changes along a length of the channel [2884]. In some embodiments, the channel [2884] may have a diameter that is tapered, with a first, larger diameter at a central portion of the channel [2884], such as near the Cusp crush pinch region [2899], and a second, narrower diameter near respective ends of the channel [2884] (e.g., at ends of tubes [2084A] and [2084B] where instabilities [60A], [60B] may form). As described for FIGS. 20A-E, such tapering of channel [2884] may provide magnetic mirroring to enhance density and duration of a Reaction Phase [5] (FIG. 1) by containing ions and electrons along the Z-Axis. In some embodiments, a DPF may comprise one or more electrodes—for example, one or more of anodes [1514A] or [1514B] or cathodes [1512A] and [1512B]—and may be operable to enhance a pinch. As an example and as noted above with regard to FIGS. 20 and 28, the one or more electrodes may enhance a pinch by providing a substantially concave, convergent conic hollow inner electrode channel [2884]. The channel [2884] may comprise a conductive terminus which may instantiate a magnetic mirror within the DPF. In this regard, a substantially planar axisymmetric plasma sheath may ingress within channel [2884] from an inner electrode tip in a direction towards a bottom back of a DPF (e.g., toward crush pinch region [2899]). In some embodiments, a hollow inner electrode—for example anodes [1514A] or [1514B]—may comprise at least one annular magnet (e.g., magnet [2018]) in an electrode end tip selected to produce one or more electric fields to enhance a pinch and magnetic mirror effect of the DPF.

Figure 29:
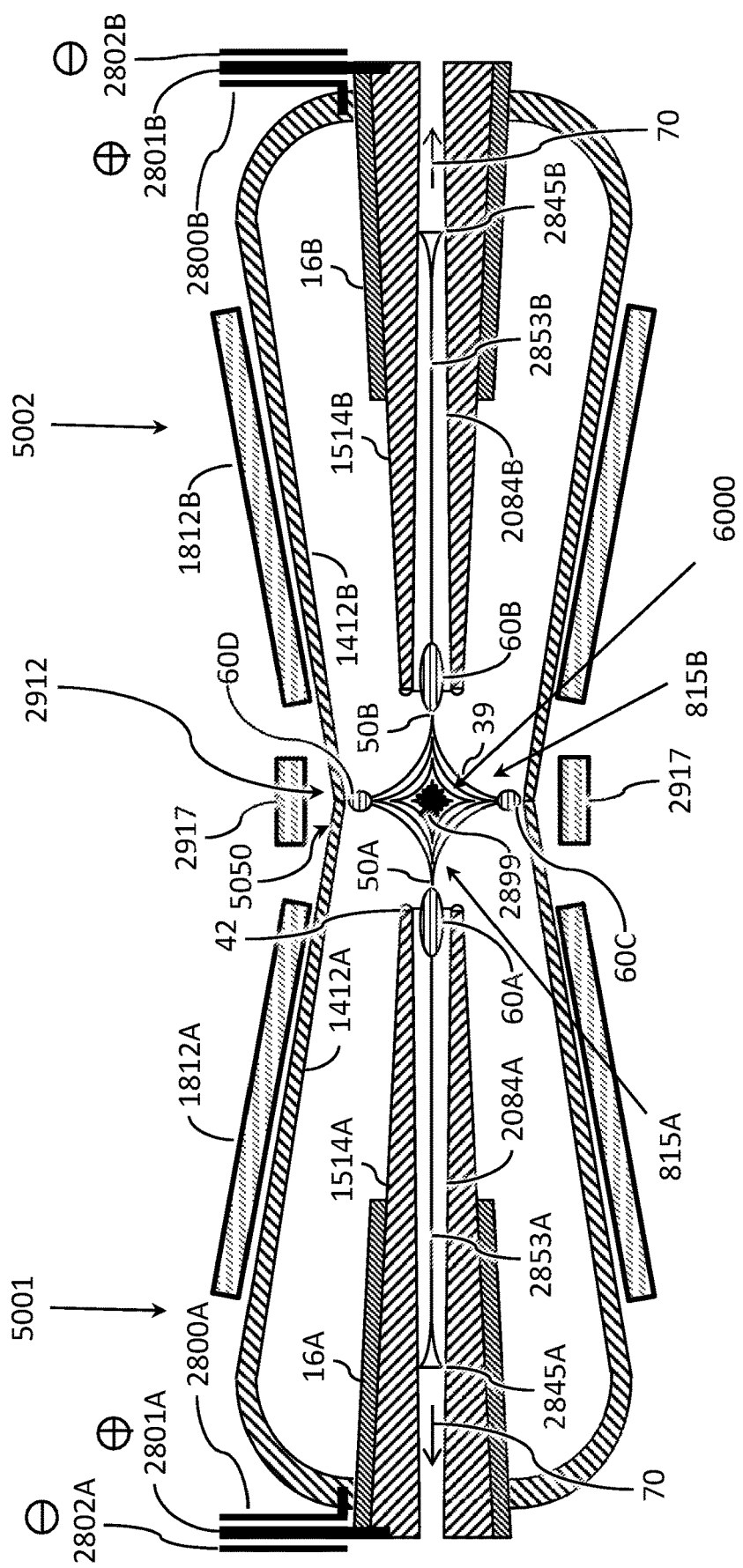
FIG. 29 is a cross section illustration showing how two Mather DPF devices may be combined front to front to provide a significantly enhanced cusp pinch in the middle using some embodiments of the improvements disclosed.

FIG. 29 shows a multiple DPF embodiment. In some embodiments, instead of being connected at their respective bases, individual DPF devices [5001] and [5002] may be connected together essentially at a top or opening portion of the DPF such as near regions in which instabilities such as at their tops or openings near [60C] and [60D] are shown in FIG. 29. The first DPF [5001] may be coupled to the second DPF [5002] at their respective open apertures [815A] and [815B]. In some embodiments, a power supply as may be used for DPFs of FIG. 29 that is similar to the power supply of FIG. 28. However, the embodiment of FIG. 29, comprises left side power cable [2800A] and right side power cable [2800B] for providing power to the two DPFs [5001] and [5002], which may be coaxial cables, along with their respective positive lines [2801A] and [2801B] and negative lines [2802A] and [2802B] for left and right side feed points of the joint device. The individual DPF devices [5001] and [5002] of FIG. 29 are shown as being rotated approximately 1800 from the orientation of the embodiment of FIG. 28. In this regard, the DPF devices [5001] and [5002] may operate substantially the same as described for the individual device operation associated with FIG. 28 in most aspects, with differences in formation of pinches and instabilities occurring based on the orientation of the two DPF devices [5001] and [5002]. In some embodiments-DPF devices [5001] and [5002] are joined front-to-front (or, alternatively described, top-to-top). In some embodiments, DPFs may comprise substantially tubularly hollow inner electrodes, such as anodes [1514A] or [1514B]. The anodes [1514A] or [1514B] respectively may comprise individual channels [2084A] and [2084B] which may be operable to channel the radiation products [70] approximately along an axis of the channels [2084A] and [2084B]. Alternatively, in some embodiments, the DPFs [5001] and [5002] may comprise one or more solid inner electrodes (e.g., anodes [1514A] or [1514B] without channels [2084A] or [2084B] respectively). In some embodiments, the outer electrodes [1412A] and [1412B] may have a resistivity that varies along an inner surface.

Figure 33:
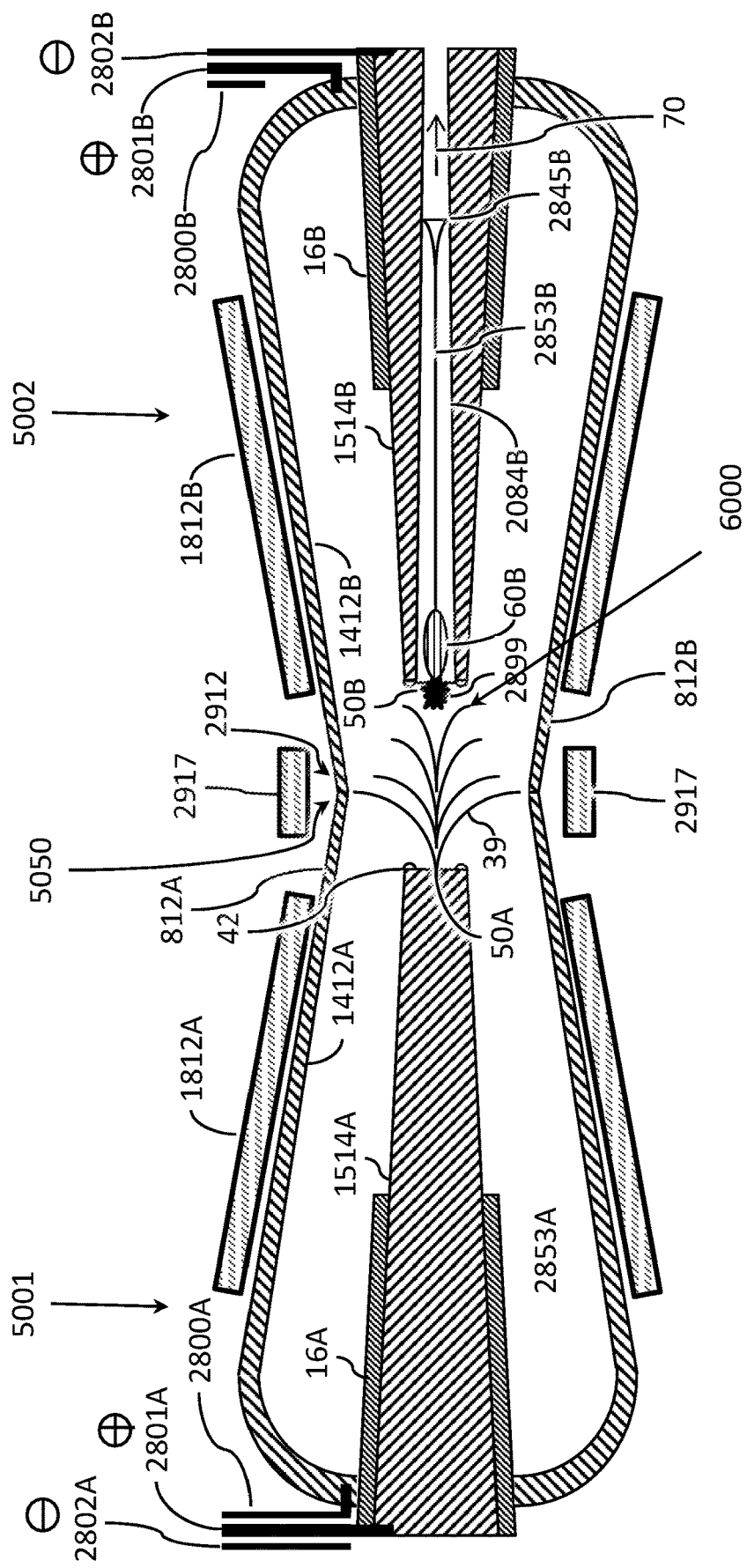
FIG. 33 is a cross section illustration similar to FIG. 32 showing how two Mather DPF devices, one with a positive and solid anode but now one DPF with a negative and hollow anode may be combined front to front with a reducing tapered cap, to provide a significantly enhanced cusp pinch of smaller volume at the entrance to the hollow anode using many of the improvements disclosed.

In some embodiments, as shown for example in FIG. 33, the individual DPF devices [5001] and [5002] may comprise at least one substantially tubularly hollow inner electrode (e.g., one or more of anodes [1514A] or [1514B] having channels [2084A] and [2084B] respectively) and at least one solid inner electrode (e.g., one or more of anodes [1514A] or [1514B] without channels [2084A] or [2084B] respectively). In such an embodiment, the two inner electrodes [1514A] and [1514B] may be configured and spaced from each other a distance and with radial dimensions so that the compressed pinch [50A] may collapse onto the entrance [41] of the channel [2084B] coincident with the pinch generated by the individual DPF device [5002] of opposite polarity. In such embodiments, with the inner electrodes [1541A] and [1514B] of opposite polarity, ions from the shock may be attracted into the core collapsed pinch [50B] possibly further energizing the pinch event.

In some embodiments, some or all electrodes may have a shape or contour to promote a substantially conically shaped axially convergent pinch, such as shown in the arrangement of FIG. 29. In this regard, a pinch collapse may occur near a hole [41] of a channel [2084A] or [2084B] of at the at least one hollow inner electrode (e.g., anodes [1514A] or [1514B]).

Because the DPF devices' ([5001] and [5002]) orientations are reversed in FIG. 29 compared to those in FIG. 28, the plasma sheaths of each device move at fast supersonic speed towards each other and collide with each other along a ring on the inside of the joined outer electrodes (nominally cathode), at a time shortly after the end of the Rundown Phase [2] and nominally no later than about the time of the Pinch Phase [4], the exact timing determined by the details of the device and as dictated by detailed plasma and MHD modeling and simulation. The ring [5050] may be a conductive ring, although other types of rings may be possible as described herein. The ring [5050] may couple one or more DPF devices, such as DPF devices [5001] and [5002]. The ring [5050] may be configured to couple additional DPF devices in other embodiments. Because the currents are flowing in a like direction, upon the plasma sheath reaching the said ring [5050] where the plasma sheaths collide along the inner surface of the cathode, one or more substantially cusp shaped radially symmetrical plasma sheaths [39] from each individual DPF device [5001] and [5002] may collapse and compress into each other under pressure from a Lorentz force on each. Essentially, then a circumferential pinch may initiate at said ring [5050], directed both axially inward and radially inward, the fraction and speed of each may be determined by geometry and respective speeds of the plasma sheaths. Objectively, circumferential contact of the two plasma sheaths form circumferential pinches at [60C] and [60D] that is designed to be timed in relation to axial pinches at [50A] and [50B] such that, in one embodiment both plasma sheaths migrate at a high speed into a small central crush pinch region [2899]. The crush pinch region [2899] may comprise an approximately maximal pinch applied from all three directions (e.g., x, y and z direction) as opposed to application of such pinch forces in a radial direction, as in a traditional DPF device. Note that by appropriate sizing, shaping and spacing of the electrodes, one or more resultant cusp-shaped compressions pinch may be made to comprise a circumferential pinch (e.g., [60C], [60D]) starting first along the said ring [5050] with subsequent axial pinching at a selectable time later, or it may be made to comprise an axial pinching first with a subsequent circumferential pinching at a selectable time later, or both pinch types occurring at the same time but at selectable different or same distances from the cusp pinch region [2899] or any combination of these. This offers great flexibility in crafting the cusp compression in most any way desired to achieve desired outcomes. Such outcomes could include the preferential creation of instabilities, including toroidal plasmoids which may manifest favorable lifetimes for achieving practical Fusion. In one embodiment, the ring pinches [60C] and [60D] and axial pinches [50A] and [50B] may be initiated so as to collide energetically at cusp pinch center region [2899]. This may occur essentially simultaneously for approximately maximum energy density pinching. In another preferred embodiment, the devices are designed so that axial pinch points [50A] and [50B] may be positioned as nearly coincident as possible, and too, all the points of the ring pinch may be positioned as nearly coincident as possible, and then finally both axial pinch points [50A] and [50B] and ring pinch points [60C], [60D] are made as nearly coincident as possible. Achievement of such coincidences may be limited by geometry and/or some physical limitation as must be determined by detailed plasma and MHD modeling and simulation, but achieving such coincidences may significantly enhance DPF performance.

In some embodiments, as shown for example in FIG. 29, individual DPF devices [5001] and [5002] may have outer electrodes [1512A] and [1512B] comprising open electrode tips [812A] and [812B], which may be essentially contiguously and conductively coupled about a front top terminal circumference (e.g. a "waist" [2912]) of at least one outer electrode (e.g., cathodes [1512A] and [1512B]) between two individual DPF devices [5001] and [5002]. In some embodiments, an inner electrode—for example [1514A] or [1514B]—comprises a thin skin shell corresponding to all exposed electrode surfaces without any filled interior material between any of the shell portions. In some embodiments, such outer electrodes [1512A] and [1512B] may further comprise a progressively smaller radius towards the electrode tips [812A] and [812B] of each singular electrode [1512A] and [1512B] near to a coupling, resulting in a narrower waist [2912] near a center of at least one outer electrode, with the resulting annular curvilinear shell formed to bend a plasma sheath towards and terminally parallel to a mutual DPF axis (e.g., a longitudinal axis in the Z-direction) as a plasma sheath progresses. In some embodiments, such a narrower waist [2912] could further comprise its construction of a progressively increasing or decreasing surface and optionally volume resistance to moderate and by design intentionally manage current flow and entropy of a plasma sheath as a function of a plasma sheath contact point into a plasma pinch. Additionally or alternatively, in some embodiments, individual DPFs could be joined with a shorting ring—for example a shorting ring [1412]—about the waist [2912]; for example a shorting ring could be positioned between the front end of outer electrode [1412A] and the front end of outer electrode [1412B]. Additionally or alternatively, in some embodiments, the DPF system could further comprise an axial spacing gap between opposing electrode tips [812A] and [812B] of outer electrodes [1512A] and [1512B]; in some such embodiments an axial spacing gap separates a front end of electrode [1512A] from a front end of outer electrode [1512B]

Note that magnet [2917] mimics the features described for [1817] in FIG. 18. But in FIG. [2917] may represent a magnet with either an azimuthal magnetic field, in which case it helps tune a Lorentz force and thus velocity of a plasma sheath traversing the inner face [2813] of the cathodes [1512A] or [1512B] to achieve the geometry and operation desired, or it may represent a magnet with an axial magnetic field, in which case it can provide same-sense axial angular momentum to the plasma sheaths centrally converging from both directions. A plurality of plasma sheaths from each of the DPF devices [5001] and [5002] may interact and form portions of a cusp pinch. As an example, a first plasma sheath from the first DPF accelerator [5001] and a second plasma sheath from the second DPF accelerator [5002] may interact to form a first portion of the cusp pinches shown in FIGS. 29-32. The plasma sheaths from each DPF may interact with plasma sheaths from one or more other DPFs via an aperture of the outer electrode (e.g., apertures [815A], [815B] of electrodes [1412A], [1412B]). The apertures [815A] and [815B] may be disposed within circumferential front ends of electrodes [1412A], [1412B], respectively. In addition, a radius of the circumferential front end of each of the electrodes [1412A], [1412B] may be less than a radius of a circumferential back end of the electrodes [1412A], [1412B].

It can also provide an axial magnetic field which, when combined with the polarity of the electrodes [1412A], [1412B], [1514A], and [1514B] of the individual DPF devices [5001] and [5002] so arranged, presents the design of a Penning Trap. Note that the positive anodes and the negative cathodes provide the required quadrupole field for a Penning Trap and the applied axial magnetic field completes the basic requirements for a Penning Trap. The Penning Trap feature of this embodiment helps to confine the plasma ions to the axis of the device which will further enhance the pinch duration. Note too that since the magnet [2917] is geometrically located only at the terminus for the cusp pinch, its field need not be applied until nearer the end of the Pinch Phase [4], and due to the geometric positioning, operates very precisely without need for timing controls.

At some short time during or after the pinch events, instabilities [60A], [60B] and [60C] and [60D] may appear, and as described previously may be advantageous for the practical production of Fusion energy. They are afforded the opportunity to travel down the hollow anodes [1514A] and [1514B] wherein-due, for instance, to the taper in the holes-magnetic mirroring similar to that described for FIGS. 20A-E may help to hold in ions and electrons for enhanced longer duration and higher density Reaction Phase [5]. In such and similar embodiments, the at least two DPFs could have electrode dimensions and separations laid out to create and promote a singular cusp plasma pinch within joined outer electrodes [1512A] and [1512B] and between top front ends [812A] and [812B] of inner electrodes of DPFs, such that a plasma pinch opposingly compressed together from each individual DPF device [5001] and [5002] near a center of the DPF system [5000].

Figure 30:
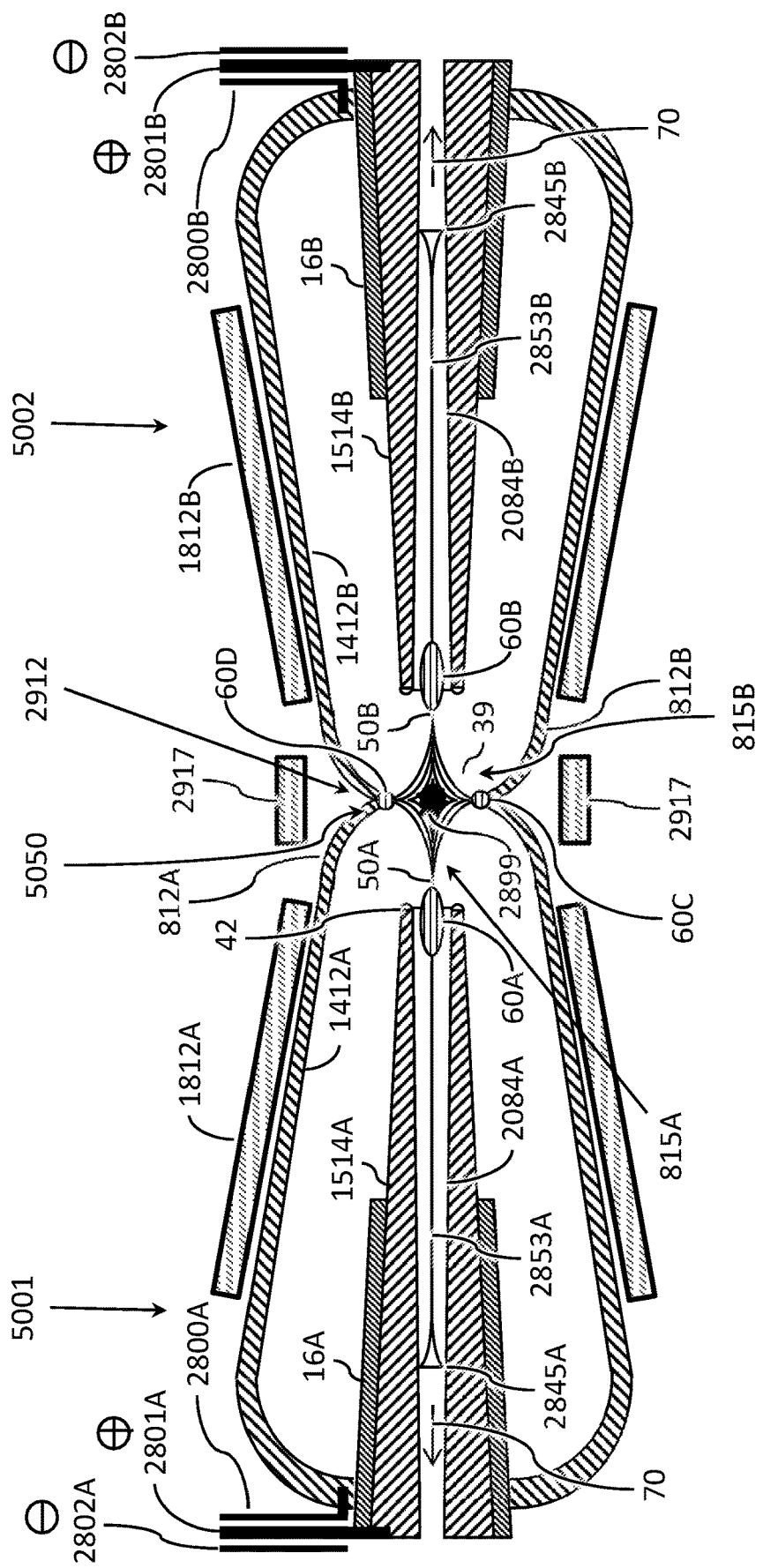
FIG. 30 is a cross section illustration showing how two Mather DPF devices may be combined front to front with a reducing tapered cap to provide a significantly enhanced cusp pinch of smaller volume in the middle using some embodiments of the improvements disclosed.

FIG. 30 shows a similar embodiment to FIG. 29, except now rounded end caps [812A] and [812B] have been added to the DPF devices during assembly in a manner similar to the addition of [812] in FIG. 8. These modifications serve to help direct and orient the plasma sheath better for a pinch along the Z-Axis, reduce the distance needed for the plasma to traverse radial to reach the Z-axis, and generally reduce the geometric dimensions of the cusp compression volume to make it tighter at the outset of pinching, which will aid in higher energy density pinch and cusp pinch at cusp pinch region [2899] between the inner electrodes [1514A] and [1514B]. In some embodiments, the portions of the cusp crush pinch are formed at the crush pinch region [2899] by the cusp pinches of each of the individual DPF devices [5001] and [5002].

Figure 31:
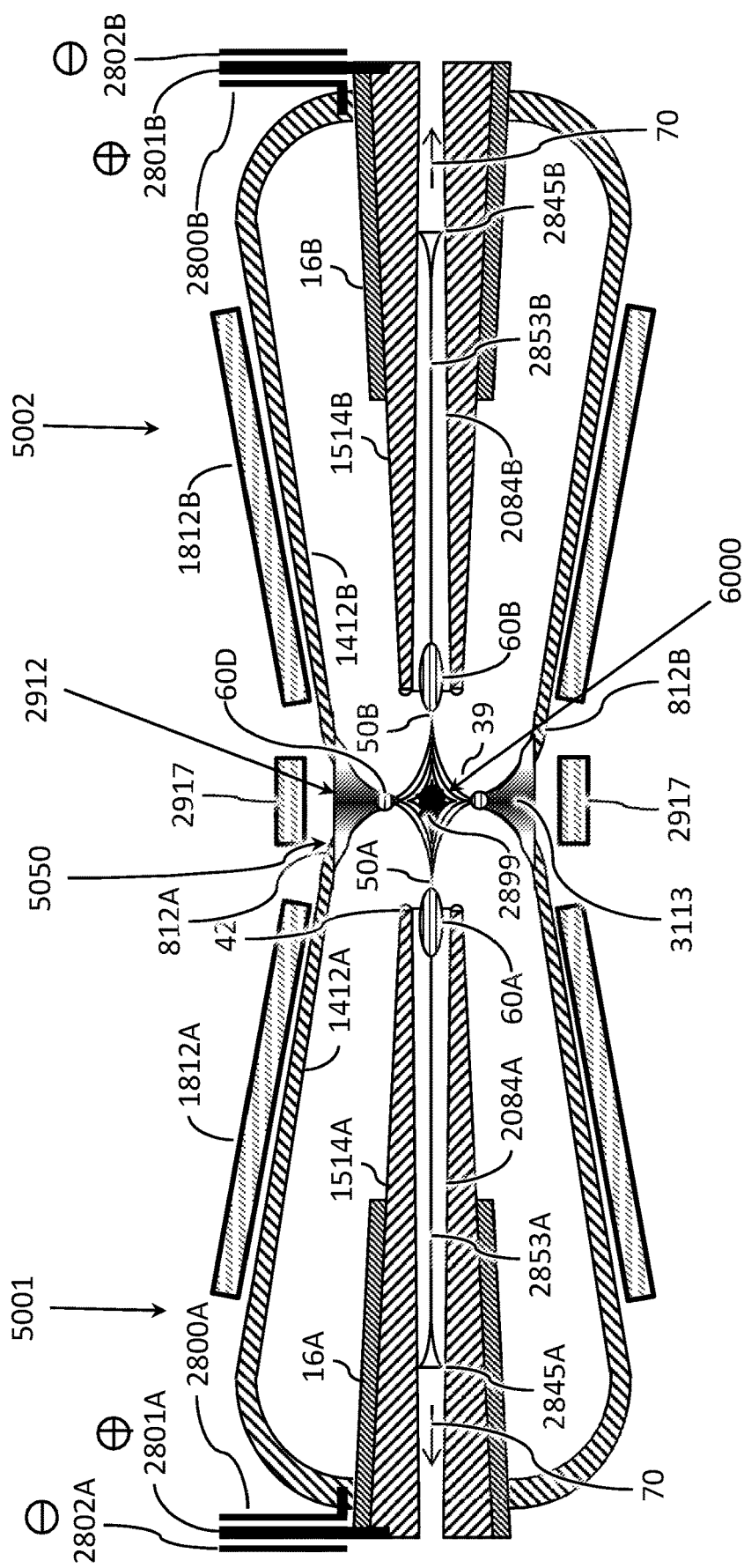
FIG. 31 is a cross section illustration showing how two Mather DPF devices may be combined front to front with a reducing tapered resistively tapered cap to provide a significantly enhanced cusp pinch of smaller volume in the middle, while also quenching the current right after the pinch with a resistivity tip to produce plasma instabilities using the improvements disclosed.

FIG. 31 shows a similar embodiment to FIG. 30, except now resistive taper tip [3113] has been added to the tips of [812A] and [812B] in order to provide the same features and benefits as described for [2713] in FIG. 27B, to wit, providing a deterministic current cut off to reduce ohmic heating to the plasma, thereby increasing the net heat loss (by not adding ohmic heating to compensate for other heat loss mechanisms) and in so doing increase the Entropy of the plasma, fostering formation of desired plasma instabilities.

Figure 32:
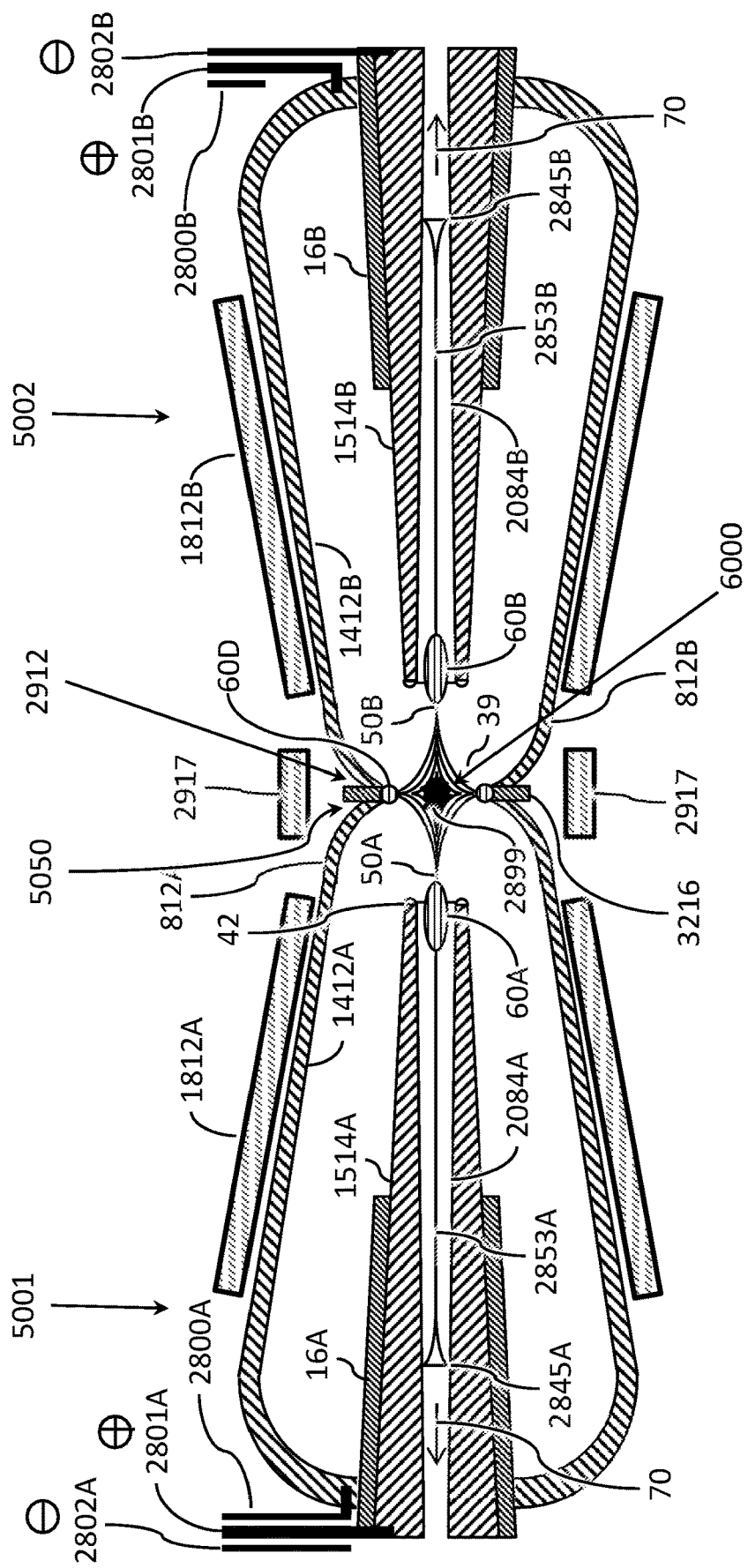
FIG. 32 is a cross section illustration showing how two Mather DPF devices may be combined front to front with a reducing tapered cap, and with reversed polarity on one of the two DPF devices to provide a significantly enhanced cusp pinch of smaller volume in the middle using the improvements disclosed.

FIG. 32 shows a further similar embodiment to FIG. 31, except with some changes. Specifically, note that the polarity has been changed on the right hand side individual DPF device [5002], with the positive terminal of the high voltage [2801B] now connected to the outer electrode [1412B], and the negative terminal of the high voltage [2802B] now connected to the center electrode [1514B], thereby reversing the polarity of the right hand DPF device, but not the left side. To prevent a direct short across the outer electrodes [1412A] and [1412B], Insulator disc [3216] is inserted between the two outer electrodes where they join in the center. Insulator disc [3216] is made approximately flush to the inside surface of the outer electrodes [1412A] and [1412B] without allowing said short circuit to occur.

This application provides a DPF system [5000] operated with a flipped polarity. When the Z-pinch occurs, due to the confluence of the impinging fields, positive ions are ejected from the Z-pinch outward away from the individual DPF device [5002], whereas negative ions and electrons are ejected towards the individual DPF device [5002]. Traditional experiments with a positive charged center solid electrode therefore placed neutron targets on the Z-axis in front of the Z-pinch so as to be hit by the positive ions (for example Deuterons) which then convert to other species (in particular neutrons), whereas the backward moving electrons struck the top of the anode, which, being metal, produced a preponderance of X-rays. Note that when the polarity is reversed as shown in FIG. 32, so are the directions of the positive and negative (largely electrons) pinched streams. In such a case, the electron stream hits the nominally high Z target intended for the positive ions, which converts less of the energy into X-rays, and the target itself may screen the X-rays, and similarly, the positive ions strike into the center of the metal anode, mostly sputtering or eroding the surface, but not converting to any neutrons. This explains why the predicted DPF products disappear when the polarity is reversed from the standard positive anode. Ideally, one should expect to achieve substantially similar products if one but places the positive ion target on the tip of the center electrode, and a suitable X-ray target in front of the DPF on its axis.

The two cases where reverse polarity may make a difference—e.g., if one operates with a very rarefied gas (very low pressure and density) that causes the plasma to no longer be in thermodynamic equilibrium. This would run counter to a general desire to operate at highest possible pressure in order to obtain highest density and products in the reaction. Alternatively, in in the case of a MHD non-ideal Hall Effect which can cause plasma sheath creep on the anode from electron migration due to the Hall Effect, although this effect can introduce asymmetries in the plasma sheath as a function of polarization, these effects may be countered in large part with the teachings herein, and therefore, do not by themselves invalidate the approach of FIG. 32.

Note that by reversing the polarity of one individual DPF device [5002], the dynamics of the cusp pinch may change. When the polarities of one individual DPF device [5002] in a DPF system [5000] is reversed, then one outer circumferential electrode [1512A] is negatively charged (the normal cathode situation) and the other outer electrode [1512B] is positively charged. In this case a thin insulator [3216] must be inserted between [812A] and [812B] where they join near the waist [2912] to keep them from shorting, if shorting is not desired. When the plasma sheaths from each individual DPF devices [5001] and [5002] arrive near the waist [2912] or shorting ring [1412], they will arc over the insulator and thereby complete a circuit from one inner central electrode [1514A] to the other inner electrode [1514B], which are oppositely charged. In so doing, the prior seen cusp shape of the plasma sheath becomes an axisymmetric tubular cylindrical plasma sheath now driven with a large radially inward Lorentz force focused proximate the Z-Axis, driving the plasma sheath radially inward. If timed correctly, this collapsing cylinder of plasma sheath can be made to coincide with the axial pinches [50A] and [50B] to again create a very intense crunch pinch in the crush pinch region [2899], substantially similar in concept to two shaped charges going off facing each other. In this configuration, since the currents are moving in opposite directions radially near the waist [2912] or shorting ring [1412], a magnet [2917] may still cause charged particles to rotate about the Z-Axis thus providing a degree of containment not unlike the Penning Trap, but the opposite polarity of the center electrodes loses the axial trapping feature. Still, the magnet [2917] may induce counter rotation in the radially moving ions and electrons which will serve to increase collision velocities by a factor of two within the crush plasma region [2899] which will be advantageous for increasing the Fusion cross section.

Another interesting feature of this embodiment derives from the recognition that for a given polarization of the center and outer electrodes, like-charged reaction products are channeled in opposite directions approximately along an axis of the DPF system [5000], which makes for convenient isolation of said constituents for either power harvesting or application use. As may be appreciated from the understanding of standard DPF operation, this is not the case for any joining of same-polarized individual DPF devices [5001] and [5002] as described above in FIGS. 28-31, and in fact these embodiments will produce a mixture of charged particle products down their Z-Axis in both directions. Some embodiments include the application of a separation magnet downstream of the reaction volume in both directions. Such a separation magnet may be integrated into the anodes but due to the potential to influence the plasma sheath propagation may be disposed outside of the device where the anode hole opens to the vacuum chamber [0].

Conversely, if the polarities are reversed as they are in FIG. 32, then all the reactant products of one charge will flow in one direction along the Z-Axis and all the reactant products of the other charge will flow in the opposite direction along the Z-Axis. This later situation is likely desirable and if detailed design and modeling with detailed plasma and MHD codes bears out a favorable reaction rate, then a device patterned after FIG. 32 is one exemplary embodiment of the invention, particularly after incorporating other enhancement aspects of the other improvements disclosed herein.

The embodiment of FIG. 32 may be taken in a hybrid direction as illustrated in FIG. 33 wherein the left DPF is given a solid Anode of positive polarity and the right DPF is given a hollow Anode of negative polarity (technically this makes it the cathode). The two central electrodes are configured and spaced from each other a distance and with radial dimensions so that the compressed pinch [50A] is arranged to collapse onto the entrance of the hollow tube [2084B] coincident with the pinch generated by the right side DPF of opposite polarity. Given the central electrodes are of opposite polarity, the ions of the shock are attracted into the core collapsed pinch [50B] further energizing the pinch event.

Note that although only two individual DPF devices [5001] and [5002] have been combined in the manner disclosed herein, additional DPFs might be combined together in a similar manner in a DPF system [5000]. For example, whereas FIG. 32 shows combining two individual DPF devices [5001] and [5002], one on the left [5001] and one on the right [5002], one skilled in the art may readily add a third DPF into the page and a forth coming from out of the page, all converged on the crush pinch region [2899]. A similar argument holds for adding even more DPFs in the same plane, as well as others from above and below, and also applies for configurations such as illustrated in FIG. 28.

Some embodiments may include elements of all or at least most of the subordinate embodiments described hereto. Each of these improvements may provide additional degrees of freedom which may be optimized with the aid of suitable electromagnetic and plasma codes since there are so many degrees of freedom with all the additional parameters defining a DPF. Example codes that could be used to perform such optimization include the Lee code (e.g. RADPFV5.15 (2014)), the ALEGRA code (from Sandia National Laboratories, 2014) (multiple references to both easily found with internet search) and other codes such as a commercial code such as Vsim 10.0.1 (2019) and Usim 2.0 (2019) from Tech-X (formerly txcorp).

Several examples have been used to describe the invention but the invention is not intended to be limited to the examples provided. It is to be understood that the invention applies to any DPF or DPF-like device operating under the basic principles of the DPF device.

What is claimed is:

1. A system for performing plasma acceleration using one or more dense plasma fusion (DPF) accelerators, comprising:
   a first DPF accelerator, wherein the first DPF accelerator comprises:
      a first electrode; and
      a second electrode positioned within a volume defined by the first electrode;
   a second DPF accelerator, wherein the second DPF accelerator comprises:
      a third electrode; and
      a fourth electrode positioned within a volume defined by the third electrode;
   a power supply to provide power to the first and second DPF accelerators; and
   a conductive ring coupling the first electrode to the third electrode, wherein a first plasma sheath from the first DPF accelerator and a second plasma sheath from the second DPF accelerator interact to form a portion of a cusp pinch, wherein the first plasma sheath interacts to form the portion of the cusp pinch via an aperture of the first electrode, and wherein the second plasma sheath interacts to form the portion of the cusp pinch via an aperture of the third electrode.

2. The system of claim 1, wherein the first electrode has a charge polarity that is opposite a charge polarity of the second electrode.

3. The system of claim 1, wherein the first electrode and the third electrode have a like charge polarity.

4. The system of claim 1, wherein the first electrode and the third electrode have an opposite charge polarity.

5. The system of claim 1, wherein the second electrode is hollow, and wherein the second electrode comprises a supersonic channel for channeling a plasma sheath.

6. The system of claim 1, wherein one or more of the second electrode or fourth electrode is solid.

7. The system of claim 1, wherein one of the second electrode or fourth electrode is hollow, and another one of the second electrode or fourth electrode is solid.

8. The system of claim 1, wherein one or more of the second electrode or fourth electrode comprises a thin skin shell.

9. The system of claim 1, further comprising one or more magnets positioned adjacent to an outer surface of the first electrode, wherein a magnetic field of the one or more magnets is incident on the first plasma sheath of the first DPF.

10. The system of claim 1, wherein a third plasma sheath from the first DPF accelerator and a fourth plasma sheath from the second DPF accelerator interact to form a second portion of the cusp pinch.

11. The system of claim 10, wherein the cusp pinch is formed between the second and fourth electrodes.

12. The system of claim 10, wherein the cusp pinch comprises a Penning Trap.

13. The system of claim 1, wherein the aperture of the first electrode is disposed within a circumferential front end of the first electrode, wherein the aperture of the third electrode is disposed within a circumferential front end of the third electrode.

14. The system of claim 13, wherein the conductive ring couples the front end of the first electrode to the front end of the third electrode.

15. The system of claim 13, wherein a radius of the circumferential front end of the first electrode is less than a radius of a circumferential back end of the first electrode.

16. The system of claim 13, wherein a shorting ring is positioned between the front end of the first electrode to the front end of the third electrode.

17. The system of claim 1, wherein a resistivity of the first electrode varies along an inner surface of the first electrode.

18. The system of claim 13, wherein the front end of the first electrode and front end of the third electrode are separated by a gap.

19. A system for performing plasma acceleration using one or more dense plasma fusion (DPF) accelerators, comprising:
a first DPF accelerator, wherein the first DPF accelerator comprises:
a first electrode; and
a second electrode positioned within a volume defined by the first electrode;
a second DPF accelerator, wherein the second DPF accelerator comprises:
a third electrode; and
a fourth electrode positioned within a volume defined by the third electrode;
a power supply to provide power to the first and second DPF accelerators; and
a resistive element positioned between the first electrode to the third electrode,
wherein a first plasma sheath from the first DPF accelerator and a second plasma sheath from the second DPF accelerator interact to form a portion of a cusp pinch, wherein the first plasma sheath interacts to form the portion of the cusp pinch via an aperture of the first electrode, and wherein the second plasma sheath interacts to form the portion of the cusp pinch via an aperture of the third electrode.

20. A system for performing plasma acceleration using one or more dense plasma fusion (DPF) accelerators, comprising:
a first DPF accelerator, wherein the first DPF accelerator comprises:
a first electrode; and
a second electrode positioned within a volume defined by the first electrode;
a second DPF accelerator, wherein the second DPF accelerator comprises:
a third electrode; and
a fourth electrode positioned within a volume defined by the third electrode;
a power supply to provide power to the first and second DPF accelerators; and
an insulator disc positioned between the first electrode to the third electrode, wherein a first plasma sheath from the first DPF accelerator and a second plasma sheath from the second DPF accelerator interact to form a portion of a cusp pinch, wherein the first plasma sheath interacts to form the portion of the cusp pinch via an aperture of the first electrode, and wherein the second plasma sheath interacts to form the portion of the cusp pinch via an aperture of the third electrode.

* * * * *